United States Patent
Cui

(10) Patent No.: US 11,832,022 B2
(45) Date of Patent: Nov. 28, 2023

(54) FRAMING METHOD FOR MULTI-CHANNEL VIDEO RECORDING, GRAPHICAL USER INTERFACE, AND ELECTRONIC DEVICE

(71) Applicant: Huawei Technologies Co., Ltd., Shenzhen (CN)

(72) Inventor: Hantao Cui, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/920,601

(22) PCT Filed: Apr. 22, 2021

(86) PCT No.: PCT/CN2021/089075
§ 371 (c)(1),
(2) Date: Oct. 21, 2022

(87) PCT Pub. No.: WO2021/213477
PCT Pub. Date: Oct. 28, 2021

(65) Prior Publication Data
US 2023/0156144 A1    May 18, 2023

(30) Foreign Application Priority Data
Apr. 22, 2020 (CN) .......................... 202010324919.1

(51) Int. Cl.
| | | |
|---|---|---|
| H04N 5/76 | (2006.01) | |
| G06F 3/04883 | (2022.01) | |
| G06T 7/20 | (2017.01) | |
| H04N 23/69 | (2023.01) | |
| H04N 23/63 | (2023.01) | |
| H04N 21/472 | (2011.01) | |

(52) U.S. Cl.
CPC ........... *H04N 5/76* (2013.01); *G06F 3/04883* (2013.01); *G06T 7/20* (2013.01);
(Continued)

(58) Field of Classification Search
CPC ........ H04N 5/76; H04N 23/69; H04N 23/632; H04N 21/47217; G06F 3/04883;
(Continued)

(56) References Cited

U.S. PATENT DOCUMENTS

| | | |
|---|---|---|
| 8,922,695 B2 | 12/2014 | He et al. |
| 9,497,380 B1 | 11/2016 | Jannard et al. |

(Continued)

FOREIGN PATENT DOCUMENTS

| | | |
|---|---|---|
| CN | 104349063 A | 2/2015 |
| CN | 105282441 A | 1/2016 |

(Continued)

*Primary Examiner* — Thai Q Tran
*Assistant Examiner* — Jose M Mesa
(74) *Attorney, Agent, or Firm* — Slater Matsil, LLP

(57) ABSTRACT

In a multi-channel video mode, an electronic device may separately display a plurality of images from different cameras in a plurality of areas of a viewfinder frame. An image from one camera is displayed in one area, and a user operation such as a leftward sliding operation or a rightward sliding operation of a user in an area may be detected, to change framing presented by a corresponding camera in the area, without changing framing of another camera in a corresponding area. In this way, during multi-channel video recording, the user can separately adjust framing presented by each working camera in a preview frame, so that framing of each working camera in the preview frame does not affect each other, to avoid a problem that a change of framing of a working camera in the preview frame causes a change of framing of another working camera in the preview frame.

20 Claims, 44 Drawing Sheets

(52) U.S. Cl.
CPC ..... *H04N 21/47217* (2013.01); *H04N 23/632* (2023.01); *H04N 23/69* (2023.01); *G06T 2207/20132* (2013.01); *G06T 2207/30201* (2013.01)

(58) Field of Classification Search
CPC ............. G06T 7/20; G06T 2207/20132; G06T 2207/30201
See application file for complete search history.

(56) References Cited

U.S. PATENT DOCUMENTS

| | | | |
|---|---|---|---|
| 9,824,723 | B1 | 11/2017 | Bentley et al. |
| 10,616,490 | B2 | 4/2020 | Bernstein et al. |
| 2006/0238617 | A1 | 10/2006 | Tamir |
| 2015/0103222 | A1 | 4/2015 | Choi et al. |
| 2021/0014413 | A1* | 1/2021 | Yang ................. H04N 23/69 |
| 2021/0266447 | A1* | 8/2021 | Ding ................. H04N 23/64 |
| 2022/0159183 | A1 | 5/2022 | Li et al. |
| 2022/0294992 | A1* | 9/2022 | Manzari ............... H04N 23/633 |

FOREIGN PATENT DOCUMENTS

| | | |
|---|---|---|
| CN | 107509029 A | 12/2017 |
| CN | 107786812 A | 3/2018 |
| CN | 107809581 A | 3/2018 |
| CN | 110012223 A | 7/2019 |
| CN | 110072070 A | 7/2019 |
| EP | 3346694 A1 | 7/2018 |
| KR | 20190107897 A | 9/2019 |
| RU | 2452033 C2 | 5/2012 |

\* cited by examiner

Zoom ratio: 2X

FRAMING METHOD FOR MULTI-CHANNEL VIDEO RECORDING, GRAPHICAL USER INTERFACE, AND ELECTRONIC DEVICE

CROSS-REFERENCE TO RELATED APPLICATIONS

This application is a national stage of International Application No. PCT/CN2021/089075, filed on Apr. 22, 2021, which claims priority to Chinese Patent Application No. 202010324919.1, filed on Apr. 22, 2020. Both of the aforementioned applications are hereby incorporated by reference in their entireties.

TECHNICAL FIELD

The present invention relates to the field of electronic technologies, and in particular, to a framing method applied to multi-channel video recording, a graphical user interface, and an electronic device.

BACKGROUND

Currently, a portable electronic device (such as a mobile phone or a tablet computer) is generally configured with a plurality of cameras, such as a front-facing camera, a wide-angle camera, and a long-focus camera. To bring further image shooting creation experience, an increasing quantity of electronic devices may support simultaneous image shooting of a plurality of cameras.

SUMMARY

An objective of this application is to provide a framing method for multi-channel video recording, a graphical user interface (graphical user interface, GUI), and an electronic device, so that a user can separately adjust framing of each working camera in a preview frame during multi-channel shooting, and framing of each working camera in the preview frame does not affect each other, to avoid a problem that a change of framing of a working camera in the preview frame causes a change of framing of another working camera in the preview frame.

The foregoing objective and other objectives are achieved by using features in the independent claims. Further implementations are embodied in the dependent claims, the specification, and the accompanying drawings.

According to a first aspect, a framing method for multi-channel video recording is provided. The method is applied to an electronic device having a display and M cameras, where M≥2, and M is a positive integer. The method includes: The electronic device enables N cameras, where N≤M, and N is a positive integer. The electronic device captures images by using the N cameras. The electronic device displays a preview interface and a part or all of an image captured by each of the N cameras. The preview interface includes N areas, and the part or all of the image captured by each of the N cameras is displayed in one of the N areas. The electronic device detects a first user operation in a first area. The first area is one of the N areas, a first preview image is displayed in the first area, and the first preview image is obtained by cropping an entire image captured by the first camera. The electronic device displays a second preview image in the first area. The second preview image is also obtained by cropping the entire image captured by the first camera, and in the entire image captured by the first camera, a location of the second preview image is different from a location of the first preview image. The electronic device detects a second user operation. The electronic device starts to record a video, and displays an image shooting interface. The image shooting interface includes the N areas.

According to the method provided in the first aspect, in a multi-channel video recording preview process, a user can adjust framing of each working camera in a preview frame by performing a user operation, so that framing of each working camera in the preview frame does not affect each other.

With reference to the first aspect, in a possible implementation, the first camera may be a rear-facing camera, or may be a front-facing camera. Specifically, a central location of the first preview image may coincide with a central location of the entire image captured by the first camera. In this case, the first preview image is obtained in a center cropping manner.

With reference to the first aspect, in a possible implementation, at a 1×rate of the first camera, a size of the first preview image may be the same as a size of the first area.

With reference to the first aspect, in a possible implementation, the first user operation includes a sliding operation, for example, a leftward sliding operation or a rightward sliding operation. In the entire image captured by the first camera, a direction in which a central location of the first preview image points to a central location of the second preview image is opposite to a sliding direction of the sliding operation. In this way, the user may change, by using the sliding operation, a framing range presented by the first camera in the first area.

Specifically, if the first user operation is a leftward sliding operation, the second preview image is closer to a right boundary of the entire image captured by the first camera than the first preview image.

Specifically, if the first user operation is a rightward sliding operation, the second preview image is closer to a left boundary of the entire image captured by the first camera than the first preview image.

With reference to the first aspect, in a possible implementation, the central location of the first preview image coincides with the central location of the entire image captured by the first camera. In other words, the electronic device may crop, in the center cropping manner, the entire image captured by the first camera, to obtain the first preview image.

With reference to the first aspect, in a possible implementation, the second preview image may be the same size as the first preview image. In other words, before and after the user adjusts the framing of the camera by using the sliding operation, the electronic device does not change a size of a cropping area in the entire image captured by the first camera.

With reference to the first aspect, in a possible implementation, the electronic device further detects a third user operation before detecting the first user operation. The electronic device zooms in the first preview image, and displays a zoomed-in first preview image in the first area. Herein, the first user operation may be a sliding operation, and the third user operation may be a two-finger zoom-in operation. In this way, the electronic device may separately adjust, in a zoom scenario, a framing range presented by a camera on the preview interface, without affecting a framing range presented by another camera on the preview interface.

With reference to the first aspect, in a possible implementation, the second user operation is a user operation indicating to start to record a video, for example, a tap operation on an image shooting control.

With reference to the first aspect, in a possible implementation, the electronic device may further detect a fourth user operation in the first area on the image shooting interface. The electronic device displays a third preview image of the first camera in the first area on the image shooting interface. The third preview image is obtained by cropping the entire image captured by the first camera, and in the entire image captured by the first camera, a location of the third preview image is different from the location of the second preview image.

In this way, after adjusting framing of a camera on the preview interface, the user may further adjust, by using a user operation, a framing range presented by the camera on the image shooting interface.

Specifically, the fourth user operation may be a sliding operation.

With reference to the first aspect, in a possible implementation, when the electronic device detects the first user operation, if a posture of the electronic device does not change, the electronic device displays the second preview image of the first camera in the first area. When the electronic device detects the first user operation, if the posture of the electronic device changes, the electronic device displays a fourth preview image of the first camera in the first area. The fourth preview image is obtained by cropping the entire image captured by the first camera, and a central location of the fourth preview image coincides with a central location of the entire framed image of the first camera.

In other words, the electronic device adjusts the framing range of the camera on the preview interface based on the first user operation only when the posture of the electronic device does not change. When the first user operation is detected, if the posture of the electronic device changes, the electronic device may not adjust the framing range of the camera on the preview interface based on the first user operation detected at this time, so that the user changes optical framing by adjusting the posture of the electronic device.

With reference to the first aspect, in a possible implementation, the electronic device may detect that the entire image captured by the first camera includes an image of a first face. The electronic device displays a fifth preview image in the first area. The fifth preview image is obtained by cropping the entire image captured by the first camera, and the fifth preview image includes the image of the first face. The electronic device detects that a location of the image of the first face in the entire image captured by the first camera changes. The electronic device displays a sixth preview image in the first area. The sixth preview image is obtained by cropping the entire image captured by the first camera, and the sixth preview image includes the image of the first face. In other words, the framing method for multi-channel video recording provided in this embodiment of this application may further provide a face tracking function, so that a preview image including a face is always displayed in an area on the preview interface.

In some embodiments, a location of the image of the first face in the sixth preview image is the same as a location of the image of the first face in the fifth preview image.

In some embodiments, the image of the first face is in a central area of the fifth preview image.

With reference to the first aspect, in a possible implementation, the electronic device may further detect that the entire image captured by the first camera includes an image of a first face; and enables a second camera. A framing range of the second camera is greater than a framing range of the first camera, and the first face is within the framing range of the second camera. The electronic device displays a seventh preview image in the first area. The seventh preview image is obtained by cropping an entire image captured by the second camera, and the seventh preview image includes the image of the first face. The electronic device detects that a location of the image of the first face in the entire image captured by the second camera changes. The electronic device displays an eighth preview image in the first area. The eighth preview image is obtained by cropping the entire image captured by the second camera, and the eighth preview image includes the image of the first face. In this way, a framing range corresponding to a preview area can be expanded during face tracking.

In some embodiments, a location of the image of the first face in the seventh preview image is the same as a location of the image of the first face in the eighth preview image.

In some embodiments, the image of the first face is in a central area of the seventh preview image.

With reference to the first aspect, in a possible implementation, the first camera is a front-facing camera or a rear-facing camera. In other words, functions such as the face tracking function and adjusting a framing range of a camera by sliding provided in this embodiment of this application is applicable to a front-facing image shooting scenario, or is applicable to a rear-facing image shooting scenario.

With reference to the first aspect, in a possible implementation, the electronic device may further detect a fifth user operation. The electronic device stops recording a video, and generates a video file. The electronic device detects a sixth user operation for the video file. The electronic device displays a playback interface. The playback interface includes the N areas. In this way, after adjusting a preview image of each area based on a requirement of the user, the user can save a desired preview image, so that the user can obtain more flexible and convenient video recording experience.

The fifth user operation is a user operation indicating to stop recording a video, for example, may be a tap operation performed on an image shooting control.

According to a second aspect, an embodiment of this application provides a framing method for multi-channel video recording. The method is applied to an electronic device having a display and M cameras, where M≥2, and M is a positive integer. The method includes: The electronic device enables N cameras, where N≤M, and N is a positive integer. The electronic device captures images by using the N cameras. The electronic device displays a preview interface and a part or all of an image captured by each of the N cameras. The preview interface includes N areas, and the part or all of the image captured by each of the N cameras is displayed in one of the N areas. The electronic device detects a seventh user operation in a first area. The electronic device detects that a posture of the electronic device changes. The electronic device displays a ninth preview image in the first area. A framing range of the ninth preview image is the same as a framing range of a tenth preview image, the tenth preview image is an image displayed in the first area before the posture of the electronic device changes, the ninth preview image is obtained by cropping an entire image captured by the first camera after the posture of the electronic device changes, and the tenth preview image is obtained by cropping the entire image captured by the first camera before the posture of the electronic device changes. The electronic device detects an eighth user operation. The electronic device starts to record a video, and displays an image shooting interface. The image shooting interface includes the N areas.

The seventh user operation may be a user operation of selecting the first area, for example, a double-tap operation or a touch-and-hold operation performed on the first area.

According to the method provided in the second aspect, when the posture of the electronic device changes, a framing range of a selected preview area is not affected.

According to a third aspect, an embodiment of this application provides a framing method for multi-channel photographing. The method is applied to an electronic device having a display and M cameras, where M≥2, and M is a positive integer. The method includes: The electronic device enables N cameras, where N≤M, and N is a positive integer. The electronic device captures images by using the N cameras. The electronic device displays a preview interface and a part or all of an image captured by each of the N cameras. The preview interface includes N areas, and the part or all of the image captured by each of the N cameras is displayed in one of the N areas. The electronic device detects a first user operation in a first area. The first area is one of the N areas, a first preview image is displayed in the first area, and the first preview image is obtained by cropping an entire image captured by the first camera. The electronic device displays a second preview image in the first area. The second preview image is also obtained by cropping the entire image captured by the first camera, and in the entire image captured by the first camera, a location of the second preview image is different from a location of the first preview image.

According to the method provided in the second aspect, in a multi-channel photographing preview process, a user can adjust framing of each working camera in a preview frame by performing a user operation, so that framing of each working camera in the preview frame does not affect each other.

According to a third aspect, an electronic device is further provided. The electronic device may include M cameras, a display, a touch sensor, a wireless communication module, a memory, and one or more processors. The one or more processors are configured to execute one or more computer programs stored in the memory. M≥2, and M is a positive integer.

N cameras are configured to capture images.

The display may be configured to display a preview interface and a part or all of an image captured by each of the N cameras. The preview interface includes N areas, and the part or all of the image captured by each of the N cameras is displayed in one of the N areas.

The touch sensor may be configured to detect a first user operation in a first area. The first area is one of the N areas, a first preview image is displayed in the first area, and the first preview image is obtained by cropping an entire image captured by the first camera.

The display may be configured to display a second preview image in the first area in response to the first user operation. The second preview image is also obtained by cropping the entire image captured by the first camera, and in the entire image captured by the first camera, a location of the second preview image is different from a location of the first preview image.

The touch sensor may be further configured to detect a second user operation.

The N cameras may be configured to start to record a video in response to the second user operation. The display may be configured to display an image shooting interface in response to the second user operation. The image shooting interface includes the N areas.

For a specific implementation of each component included in the electronic device in the third aspect, refer to the method described in the first aspect. Details are not described herein again.

According to a fourth aspect, an electronic device is further provided. The electronic device may include an apparatus, and the apparatus may implement any possible implementation of the first aspect or any possible implementation of the second aspect.

According to a fifth aspect, a video recording apparatus is further provided. The apparatus has a function of implementing behavior of the electronic device in the foregoing method implementation. The function may be implemented by using hardware, or may be implemented by using hardware executing corresponding software. The hardware or software includes one or more modules corresponding to the foregoing functions.

According to a sixth aspect, a computer device is provided, including a memory, a processor, and a computer program that is stored in the memory and that can be run on the processor. When the processor executes the computer program, the computer device is enabled to implement any possible implementation of the first aspect or any possible implementation of the second aspect.

According to a seventh aspect, a computer program product including instructions is provided. When the computer program product runs on an electronic device, the electronic device is enabled to perform any possible implementation of the first aspect or any possible implementation of the second aspect.

According to an eighth aspect, a computer-readable storage medium including instructions is provided. When the instructions are run on an electronic device, the electronic device is enabled to perform any possible implementation of the first aspect or any possible implementation of the second aspect.

BRIEF DESCRIPTION OF THE DRAWINGS

To describe the technical solutions in embodiments of this application more clearly, the following describes the accompanying drawings used in embodiments of this application.

FIG. 10A-1 to FIG. 10B-2 are schematic diagrams of UIs that prompt a user of a location of a preview image displayed in each area in a multi-channel video recording preview process according to an embodiment;

DETAILED DESCRIPTION OF ILLUSTRATIVE EMBODIMENTS

Figure 1:
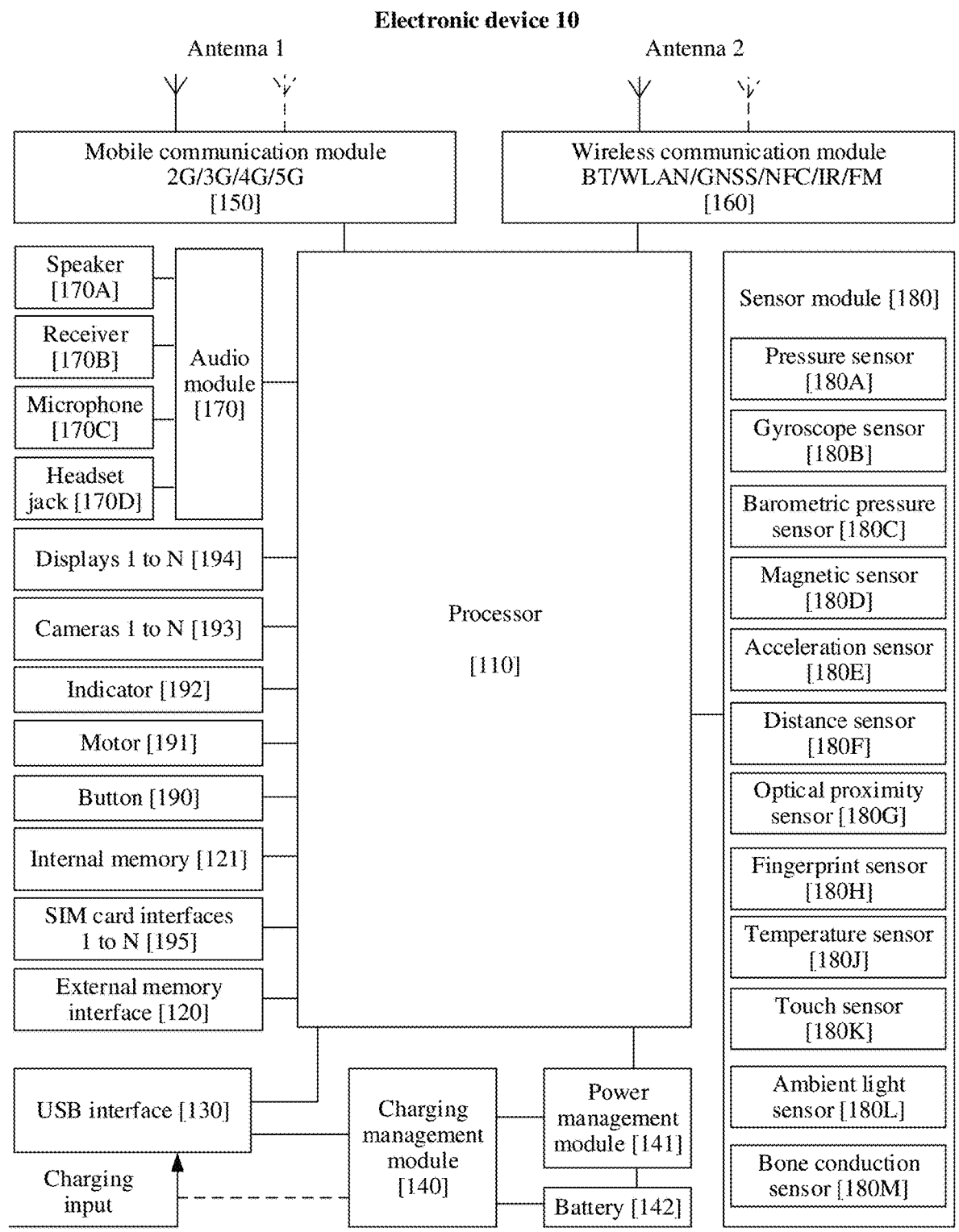
FIG. 1 is a schematic diagram of a structure of an electronic device according to an embodiment.

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that, a term "and/or" used in this application indicates and includes any one or all of possible combinations of one or more listed items.

This application provides a framing method for multi-channel video recording, which may be applied to an electronic device including a plurality of cameras. The electronic device may simultaneously use the plurality of cameras to perform photographing or video recording, to obtain a plurality of channels of images and more abundant picture information. In addition, the electronic device may further support a user in separately adjusting framing of each working camera in a preview area corresponding to the working camera during multi-channel photographing or video recording, so that framing of each working camera in the preview area corresponding to the operating camera does not affect each other, to avoid a problem that a change of framing of a working camera in a corresponding preview area causes a change of framing of another working camera in a corresponding preview area.

A framing range (also referred to as a field of view, FOV) of a camera is determined by design of an optical system of the camera. For example, a wide-angle camera has a large framing range. The user may adjust framing of the camera by moving the electronic device. In embodiments of this application, framing of a camera in a corresponding preview area of the camera may be adjusted by using a user operation (for example, a leftward or rightward sliding operation) performed on the preview area. Framing of a camera in a corresponding preview area of the camera is content displayed in the corresponding preview area.

A camera is used to display a part or all of an image from the camera in a corresponding preview area. A preview image displayed by a camera in a corresponding preview area is specifically an image in a cropping area in an image captured by the camera, that is, the preview image displayed in the preview area is obtained by cropping the image captured by the camera.

In embodiments of this application, multi-channel image shooting may include multi-channel video recording and multi-channel photographing. The electronic device may provide two multi-channel image shooting modes: a multi-channel video mode and a multi-channel photo mode.

The multi-channel video mode may mean that the plurality of cameras in the electronic device, for example, a front-facing camera and a rear-facing camera, may simultaneously record multi-channel videos. In the multi-channel video mode, in a video recording preview or video recording process or in a recorded video playing process, a display may simultaneously display, on a same interface, a plurality of images from the plurality of cameras. The plurality of images may be stitched and displayed on a same interface, or displayed in a picture-in-picture manner. The display manner is described in detail in subsequent embodiments. In addition, in the multi-channel video mode, the plurality of images may be saved as a plurality of videos in Gallery (which may also be referred to as Album), or a synthesized video formed by stitching the plurality of videos.

The "video recording" may also be referred to as "recording a video". In the following embodiments of this application, "video recording" and "recording a video" have a same meaning.

The multi-channel photo mode may mean that the plurality of cameras in the electronic device, for example, a front-facing camera and a rear-facing camera, may simultaneously shoot a plurality of pictures. In the multi-channel photo mode, during photographing preview, the display may simultaneously display, in a viewfinder frame (which may also be referred to as a preview frame), a plurality of frames of images from the plurality of cameras. The plurality of frames of images may be stitched and displayed in the viewfinder frame, or displayed in a picture-in-picture manner. In addition, in the multi-channel photo mode, the plurality of frames of images may be saved as a plurality of pictures in Gallery (which may also be referred to as Album), or a composite image formed by stitching the plurality of frames of images.

In embodiments of this application, an image displayed in the preview frame from a camera is obtained by cropping an image captured by the camera. For a cropping manner, refer to descriptions in subsequent embodiments.

The "multi-channel photo mode" and the "multi-channel video mode" are merely some names used in embodiments of this application, meanings represented by the names have been recorded in embodiments of this application, and the names should not constitute any limitation on embodiments.

First, an electronic device provided in embodiments of this application is described.

The electronic device may be a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a dedicated camera (for example, a single-lens reflex camera or a card camera). A specific type of the electronic device is not limited in this application.

FIG. 1 shows an example of a structure of the electronic device. As shown in FIG. 1, the electronic device 100 may have a plurality of cameras 193, for example, a front-facing camera, a wide-angle camera, an ultra-wide-angle camera, and a long-focus camera. In addition, the electronic device 100 may further include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application constitutes no specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

In some embodiments, the processor 110 such as the controller or the GPU may be configured to: in a multi-channel image shooting scenario, synthesize, in a manner of stitching, partial superposition, or the like, a plurality of frames of images simultaneously captured by a plurality of cameras 193 into a preview image displayed in a viewfinder frame, so that the electronic device 100 can simultaneously display the images captured by the plurality of cameras 193.

In some other embodiments, the processor 110 such as the controller or the GPU may be further configured to: in a multi-channel image shooting scenario, perform image stabilization processing on an image captured by each camera 193, and then synthesize images that are obtained after the image stabilization processing and that correspond to the plurality of cameras 193.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance).

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and videos are stored in the external storage card.

The internal memory 121 may be configured to store computer-executable program code, where the executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during image shooting. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in an image shooting scenario, the electronic device 100 may measure a distance through the distance sensor 180F to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 18W. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed in the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or more SIM card interfaces. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The electronic device 100 may implement an image shooting function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. Not limited to being integrated into the processor 110, the ISP may also be disposed in the camera 193.

In this embodiment of this application, there may be M cameras 193, M≥2, and M is a positive integer. The electronic device 100 may enable N cameras during multi-channel image shooting, N≤M, and N is a positive integer. A camera enabled by the electronic device 100 during multi-channel image shooting may also be referred to as a working camera.

The camera 193 includes a lens and a photosensitive element (which may also be referred to as an image sensor), and is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal, for example, an image signal in a standard RGB or YUV format.

Hardware configurations and physical locations of the cameras 193 may be different. Therefore, sizes, ranges, content, definition, or the like of images captured by different cameras may be different.

Image output sizes of the cameras 193 may be different, or may be the same. An image output size of a camera refers to a length and a width of an image captured by the camera. Both the length and the width of the image may be measured by using a quantity of pixels. The image output size of the camera may also be referred to as an image size, an image dimension, a pixel size, or image resolution. A common image output ratio of a camera may include 4:3, 16:9, 3:2, or the like. An image output size ratio refers to an approximate ratio of a quantity of pixels in a length to a quantity of pixels in a width of an image captured by a camera.

The camera 193 may correspond to a same focal length, or may correspond to different focal lengths. The focal length may include but is not limited to: a first focal length less than a preset value 1 (for example, 20 mm), a second focal length greater than or equal to the preset value 1 and less than or equal to a preset value 2 (for example, 50 mm), and a third focal length greater than the preset value 2. A camera corresponding to the first focal length may be referred to as an ultra-wide-angle camera, a camera corresponding to the second focal length may be referred to as a wide-angle camera, and a camera corresponding to the third focal length may be referred to as a long-focus camera. A larger focal length corresponding to a camera indicates a smaller field of view (field of view, FOV) of the camera. The field of view refers to an angle range in which an optical system can perform imaging.

The camera 193 may be disposed on two sides of the electronic device. A camera that is located on a same plane as the display 194 of the electronic device may be referred to as a front-facing camera, and a camera that is located on a plane on which a rear cover of the electronic device is located may be referred to as a rear-facing camera. The front-facing camera may be configured to capture an image of a photographer facing the display 194, and the rear-facing camera may be configured to capture an image of a photographed object (such as a person or a scenery) facing the photographer.

In some embodiments, the camera 193 may be configured to collect depth data. For example, the camera 193 may have a time of flight (TOF) 3D sensing module or a structured light (structured light) 3D sensing module, configured to obtain depth information. The camera configured to collect depth data may be the front-facing camera, or may be the rear-facing camera.

The video codec is configured to compress or decompress a digital image. The electronic device 100 may support one or more image codecs. In this way, the electronic device 100 may open or store pictures or videos in a plurality of encoding formats.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), and the like. In some embodiments, the electronic device 100 may include one or more displays 194.

In some embodiments, in the multi-channel image shooting scenario, the display 194 may display multi-channel images from the plurality of cameras 193 in a manner such as stitching or picture-in-picture, so that the multi-channel images from the plurality of cameras 193 can be simultaneously presented to the user.

In some embodiments, in the multi-channel image shooting mode, the processor 110 (for example, the controller or the GPU) may synthesize the plurality of frames of images from the plurality of cameras 193. For example, multi-channel video streams from the plurality of cameras 193 are combined into one video stream, and a video encoder in the processor 110 may encode data of the synthesized video stream, to generate a video file. In this way, each frame of image in the video file may include a plurality of images from the plurality of cameras 193. When a frame of image of the video file is played, the display 194 may display multi-channel images from the plurality of cameras 193, so as to present, to the user, a plurality of image pictures with different ranges, different definitions, or different detail information at a same moment or in a same scenario.

In some embodiments, in the multi-channel image shooting mode, the processor 110 may separately associate image frames from different cameras 193, so that when a shot picture or video is played, the display 194 may simultaneously display the associated image frame in the viewfinder frame. In this case, videos simultaneously recorded by different cameras 193 may be separately stored as different videos, and pictures simultaneously captured by different cameras 193 may be separately stored as different pictures.

In some embodiments, in the multi-channel video mode, the plurality of cameras 193 may separately capture images at a same frame rate. In other words, the plurality of cameras 193 capture a same quantity of image frames within same time. Videos from different cameras 193 may be separately stored as different video files, and the different video files are associated with each other. In the video files, image frames are stored in a sequence of capturing the image frames, and the different video files include a same quantity of image frames. When the recorded videos are played, the display 194 may perform display based on a preset layout manner or a layout manner specified by the user and in sequences of image frames included in associated video files, to display, on a same interface, a plurality of frames of images that correspond to a same sequence and that are in different video files.

In some embodiments, in the multi-channel video mode, the plurality of cameras 193 may separately capture images at a same frame rate. In other words, the plurality of cameras 193 capture a same quantity of image frames within same time. The processor 110 may separately add a timestamp to each frame of image from different cameras 193, so that when a recorded video is played, the display 194 may simultaneously display, on a same interface according to the timestamp, a plurality of frames of images from the plurality of cameras 193.

An image displayed by the electronic device in the preview frame from a camera is obtained by cropping an image captured by the camera. For a manner in which the electronic device crops the image captured by the camera, refer to descriptions in subsequent embodiments.

For ease of use, the electronic device usually performs image shooting in a handheld mode of the user. However, a picture shot in the handheld mode of the user usually jitters. In some embodiments, in the multi-channel image shooting mode, the processor 110 may separately perform image stabilization processing on image frames captured by different cameras 193. Then, the display 194 displays an image obtained after the image stabilization processing.

The following describes an example user interface that is on the electronic device 100 and that is used for an application menu.

Figure 2A:
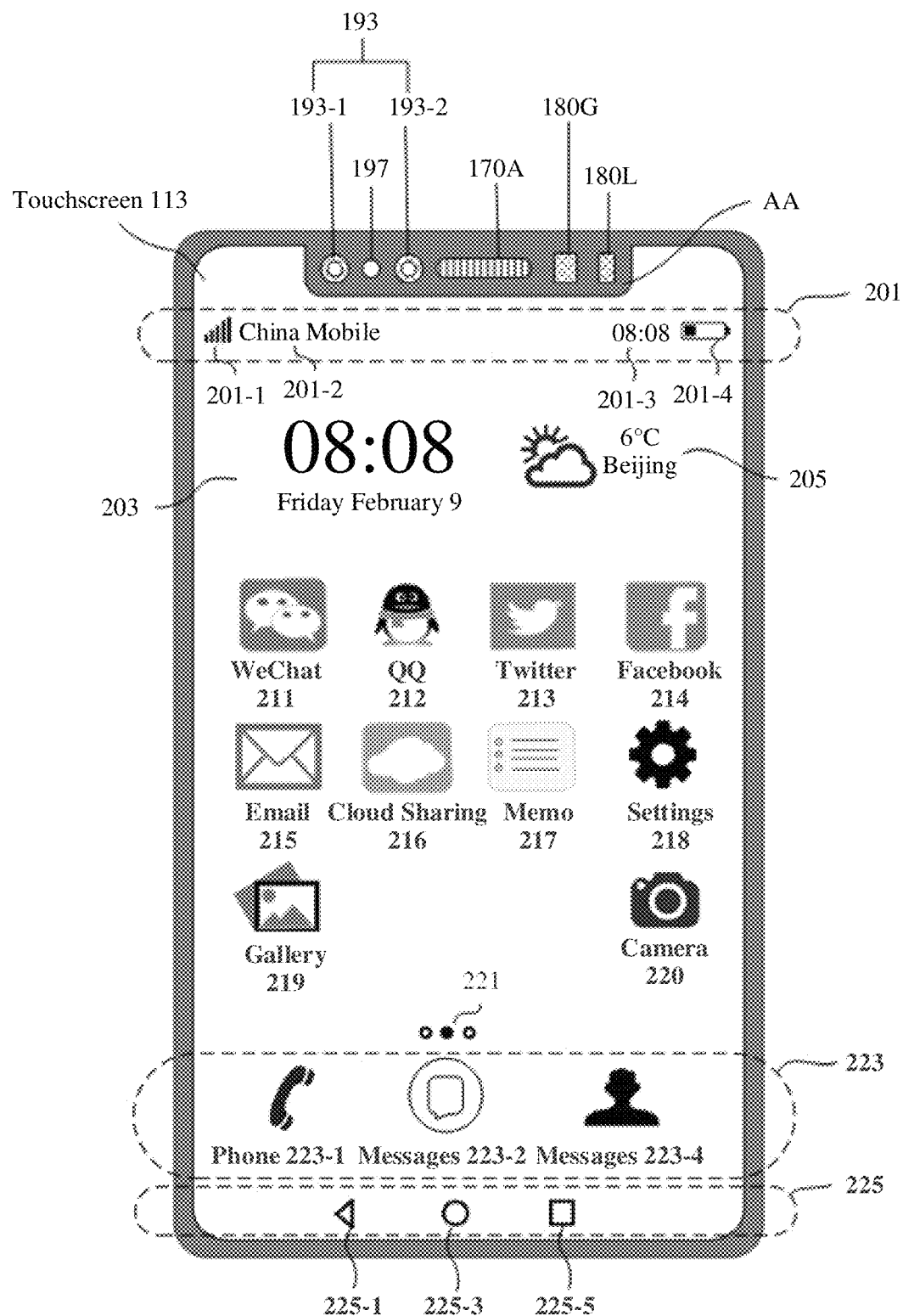
FIG. 2A is a schematic diagram of a user interface that is on an electronic device and that is used for an application menu according to an embodiment.
Figure 2B:
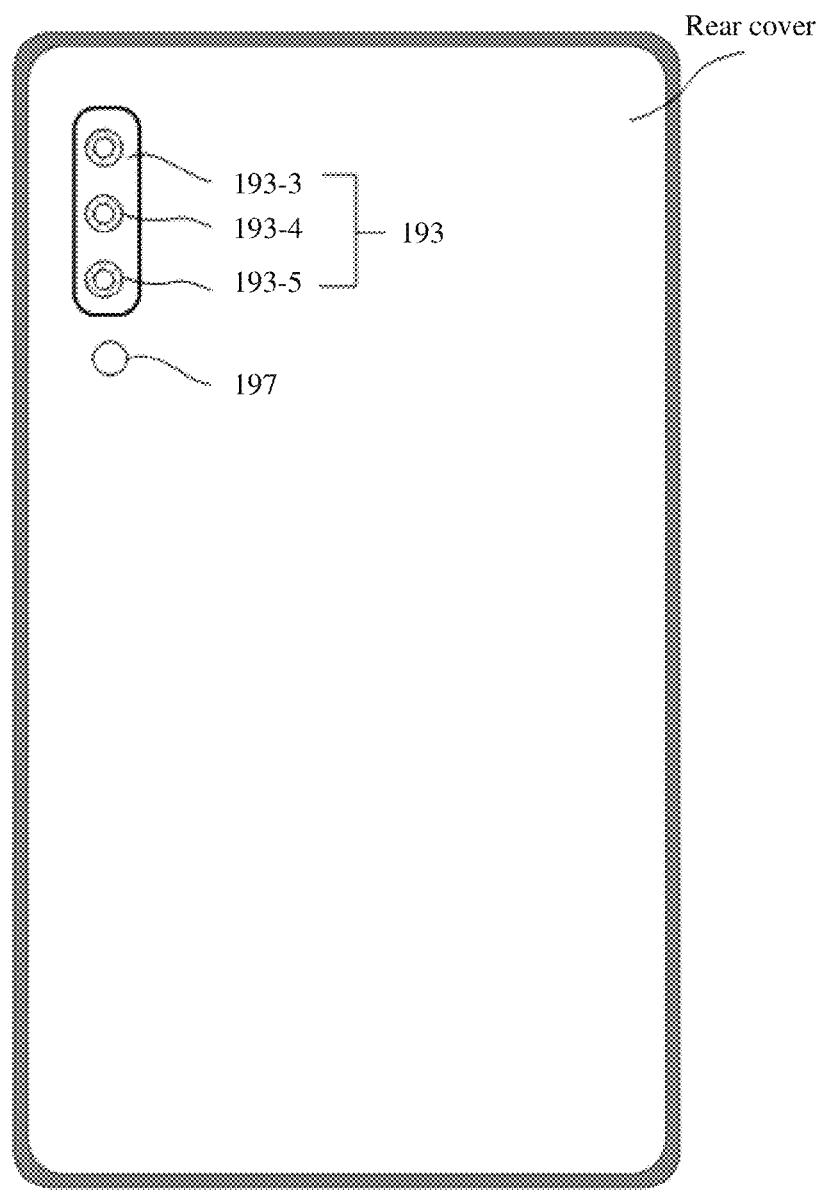
FIG. 2B is a schematic diagram of a rear-facing camera on an electronic device according to an embodiment.

FIG. 2A shows an example of a user interface 21 that is on the electronic device 100 and that is used for an application menu. As shown in FIG. 2A, the electronic device 100 may be provided with a plurality of cameras 193, and the plurality of cameras 193 may include a front-facing camera and a rear-facing camera. There may be a plurality of front-facing cameras, for example, a front-facing camera 193-1 and a front-facing camera 193-2. As shown in FIG. 2A, the front-facing camera 193-1 and the front-facing camera 193-2 may be disposed on the top of the electronic device 100, for example, at a "notch" position of the electronic device 100 (that is, an area AA shown in FIG. 2A). It may be learned that, in addition to the camera 193, the area AA may further include an illuminator 197 (not shown in FIG. 1), the speaker 170A, the optical proximity sensor 180G, the ambient light sensor 180L, and the like. In some embodiments, as shown in FIG. 2B, a rear-facing camera 193 and the illuminator 197 may also be disposed on a rear side of the electronic device 100. There may be a plurality of rear-facing cameras 193, for example, a rear-facing wide-angle camera 193-3, a rear-facing ultra-wide-angle camera 193-4, and a rear-facing long-focus camera 193-5.

As shown in FIG. 2A, the user interface 21 may include a status bar 201, a tray 223 having a common application icon, a calendar indicator 203, a weather indicator 205, a navigation bar 225, and another application icon.

The status bar 201 may include one or more signal strength indicators 201-1 of a mobile communication signal (which may also be referred to as a cellular signal), an operator indicator 201-2 of the mobile communication signal, a time indicator 201-3, a battery status indicator 201-4, and the like.

The calendar indicator 203 may be used to indicate current time, for example, a date, a day of the week, and hour and minute information.

The weather indicator 205 may be used to indicate a weather type such as cloudy to clear or light rain, and may be further used to indicate information such as a temperature.

The tray 223 having a common application icon may display a Phone icon 223-1, a Messages icon 223-2, a Contacts icon 221-4, and the like.

The navigation bar 225 may include system navigation buttons such as a back button 225-1, a home screen (Gome screen) button 225-3, and a callout history button 225-5. When detecting that a user taps the back button 225-1, the electronic device 100 may display a previous page of a current page. When detecting that the user taps the home screen button 225-3, the electronic device 100 may display a home screen. When detecting that the user taps the callout history button 225-5, the electronic device 100 may display a task recently opened by the user. Names of the navigation buttons may alternatively be other names. This is not limited in this application. Not limited to a virtual button, each navigation button in the navigation bar 225 may alternatively be implemented as a physical button.

Other application icons may be, for example, a WeChat (WeChat) icon 211, a QQ icon 212, a Twitter (Twitter) icon 213, a Facebook (Facebook) icon 214, an Email icon 215, a Cloud Sharing icon 216, a Memo icon 217, a Settings icon 218, a Gallery icon 219, and a Camera icon 220. The user interface 21 may further include a page indicator 221. Other application icons may be distributed on a plurality of pages, and the page indicator 221 may be used to indicate a specific page on which an application is currently browsed by the user. The user may slide leftward or rightward in an area including the other application icons, to browse an application icon on another page. When detecting that the user taps these application icons, the electronic device 100 may display a user interface of the application.

In some embodiments, the user interface 21 shown in FIG. 2A may be a home screen (Gome screen).

In some other embodiments, the electronic device 100 may further include a home screen button. The home screen button may be a physical button, or may be a virtual button (for example, the button 225-3). The home screen button may be used to receive an instruction of the user, and return a currently displayed UI to the home screen, so that the user can view the home screen at any time.

It may be understood that FIG. 2A merely shows the example of the user interface on the electronic device 100, and should not constitute a limitation on this embodiment of this application.

The following separately describes a typical image shooting scenario in this application: a dual-channel video recording scenario.

Figure 3A:
FIG. 3A to FIG. 3D are schematic diagrams of a dual-channel video recording scenario according to this application.

As shown in FIG. 3A, the electronic device may detect a touch operation performed on the Camera icon 220 (for example, a tap operation on the icon 220). In response to the operation, the electronic device may display a user interface 31 shown in FIG. 3B. The user interface 31 may be a user interface of a default photo mode of "Camera", and may be used by a user to perform photographing by using a default rear-facing camera. "Camera" is an image shooting application on an electronic device such as a smartphone or a tablet computer. A name of the application is not limited in this application. In other words, the user may tap the icon 220 to open the user interface 31 of "Camera". This is not limited thereto. The user may further open the user interface 31 in another application. For example, the user taps an image shooting control in "WeChat" to open the user interface 31. "WeChat" is a social application that allows the user to share a shot picture with others.

Figure 3B:
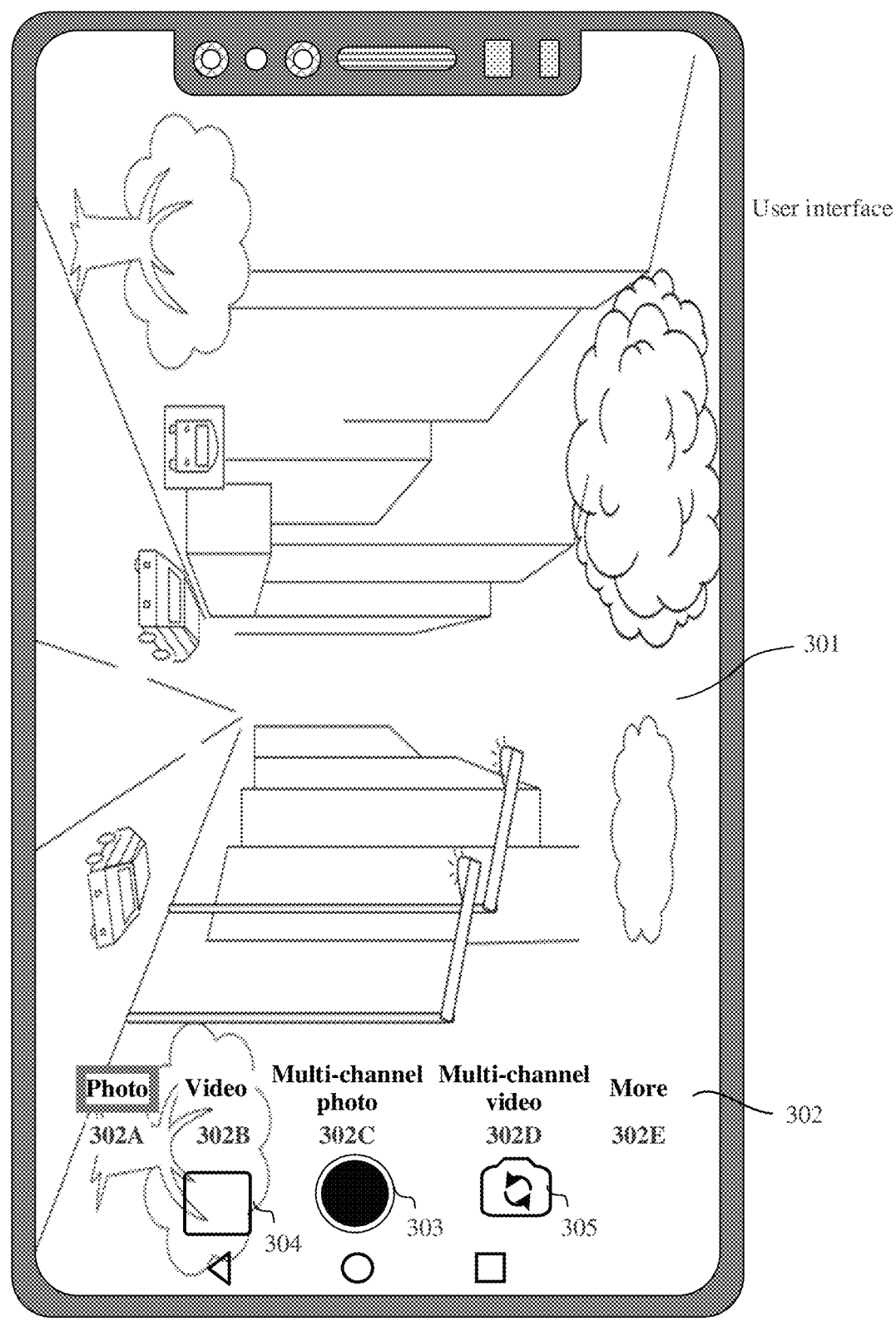

FIG. 3B shows an example of a user interface 31 of "Camera" on an electronic device such as a smartphone. As shown in FIG. 3B, the user interface 31 may include an area 301, an image shooting mode list 302, a control 303, a control 304, and a control 305.

The area 301 may be referred to as a preview frame 301 or a viewfinder frame 301. The preview frame 301 may be used to display an image captured by the camera 193 in real time. The electronic device may refresh display content in the area 301 in real time, so that a user previews an image currently captured by the camera 193.

One or more image shooting mode options may be displayed in the image shooting mode list 302. The one or more image shooting options may include: a photo mode option 302A, a video mode option 302B, a multi-channel photo mode option 302C, a multi-channel video mode option 302D, and a more option 302E. The one or more image shooting options may be represented as text information on the interface, for example, "photo", "video", "multi-channel photo", "multi-channel video", and "more". This is not limited thereto. The one or more image shooting options may alternatively be represented as icons or other forms of interactive elements (interactive elements, IEs) on the interface.

The control 303 may be configured to listen to a user operation that triggers image shooting (photographing or video recording). The electronic device may detect a user operation on the control 303 (for example, a tap operation on the control 303), and in response to the operation, the electronic device 100 may save an image in the preview frame 301 as a picture in "Gallery". When the user switches to the video mode, the control 303 may be changed to a control 901. The electronic device may detect a user operation on the control 901 (for example, a tap operation on the control 901). In response to the operation, the electronic device 100 may save the image in the preview frame 301 as a video in "Gallery". Herein, "Gallery" is a picture management application in an electronic device such as a smartphone or a tablet computer, and may also be referred to as "Album". A name of the application is not limited in this embodiment. "Gallery" may support the user in performing various operations on a picture stored in the electronic device, for example, operations such as browsing, editing, deleting, and selecting. In addition, the electronic device 100 may further display a thumbnail of the stored image in the control 304. In other words, the user may tap the control 303 or the control 901 to trigger image shooting. The control 303 or the control 901 may be a button or a control in another form. In this application, the control 303 may be referred to as a photographing control, and the control 901 may be referred to as a video recording control. The control 303 and the control 901 may be collectively referred to as an image shooting control.

Figure 3C:
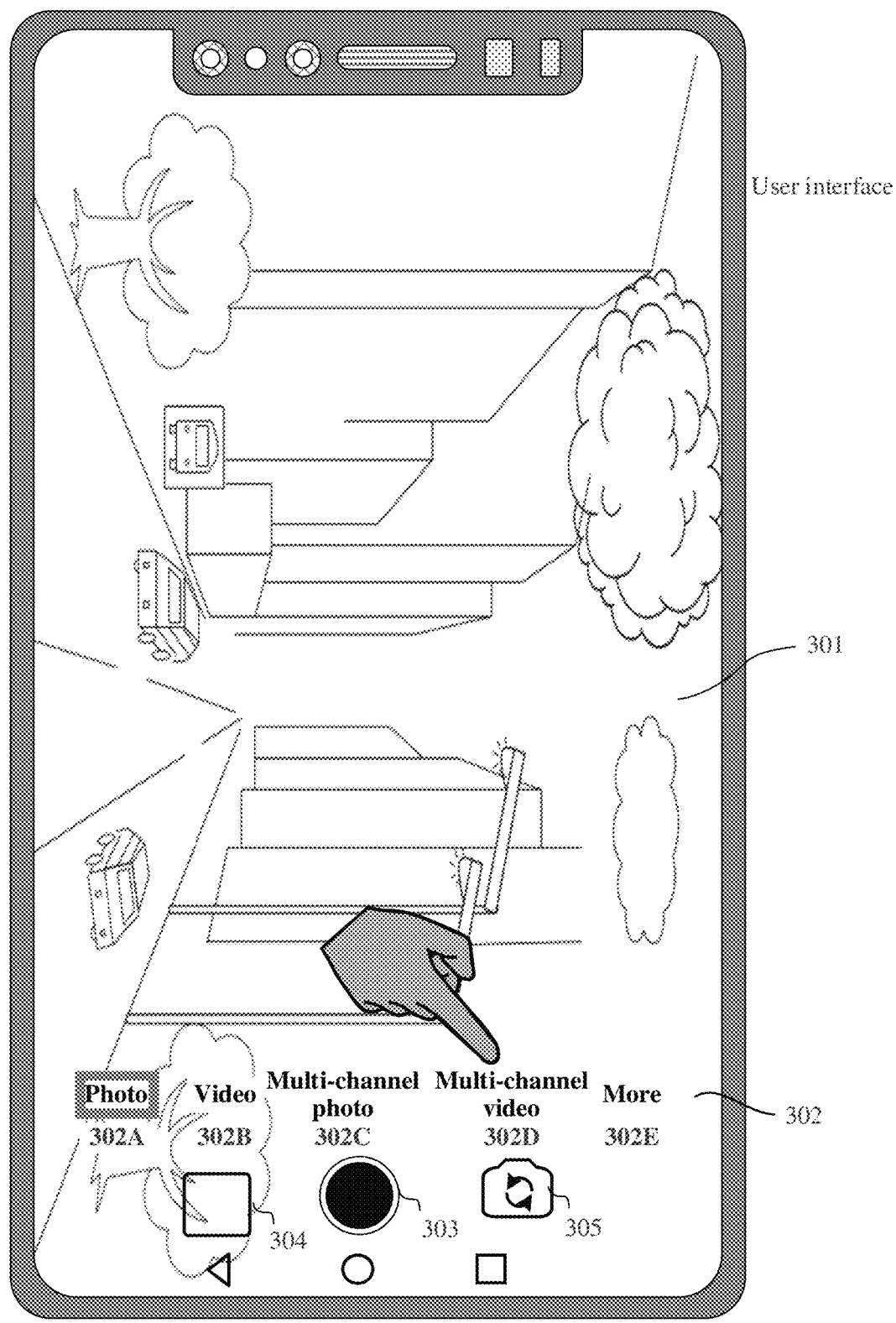

The control 305 may be configured to listen to a user operation that triggers camera flipping. The electronic device 100 may detect a user operation on the control 305 (for example, a tap operation on the control 305), and in response to the operation, the electronic device 100 may flip the camera, for example, switch a rear-facing camera to a front-facing camera. In this case, as shown in FIG. 3C, an image captured by the front-facing camera is displayed in the preview frame 301.

The electronic device 100 may detect a user operation performed on the image shooting mode option, and the user operation may be used to select an image shooting mode. In response to the operation, the electronic device 100 may enable the image shooting mode selected by the user. Particularly, when the user operation is performed on the more image shooting mode option 302E, the electronic device 100 may further display more other image shooting mode options such as a slow-motion image shooting mode option, to present more abundant image shooting functions to the user. Not limited to that shown in FIG. 3B, the more image shooting mode option 302E may not be displayed in the image shooting mode list 302, and the user may browse other image shooting mode options by sliding leftward/rightward in the image shooting mode list 302.

It can be learned that the user interface 31 may display, to the user, a plurality of image shooting functions (modes) provided by "Camera", and the user may select to enable an image shooting mode by tapping a corresponding image shooting mode option.

Figure 3D:
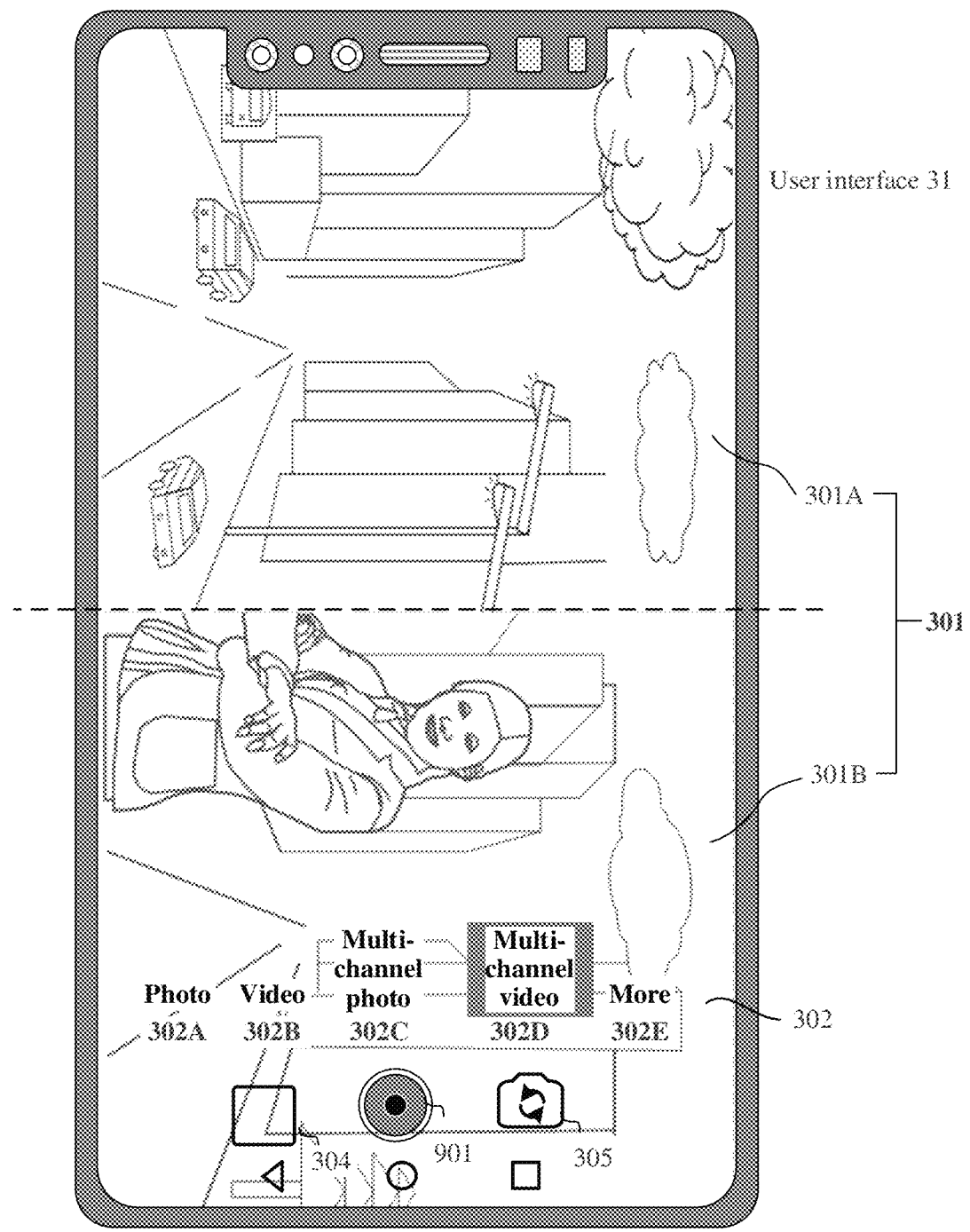

For example, when a user operation (for example, a tap operation) of selecting the multi-channel video mode 302D is detected, the electronic device 100 may display a user interface shown in FIG. 3D. The preview frame 301 displays images from both the front-facing camera and the rear-facing camera. In some embodiments, the electronic device

100 may enable the multi-channel video mode by default after "Camera" is started. This is not limited thereto. The electronic device 100 may further enable the multi-channel video mode in another manner. For example, the electronic device 100 may further enable the multi-channel video mode according to a voice instruction of the user. This is not limited in this embodiment of this application.

It can be learned that, compared with the photo mode or the video mode, images from a plurality of cameras are simultaneously displayed in the preview frame 301 in the multi-channel video mode. The preview frame 301 includes two preview areas: 301A and 301B. An image from the rear-facing camera is displayed in 301A, and an image from the front-facing camera is displayed in 301B.

Figure 4A:
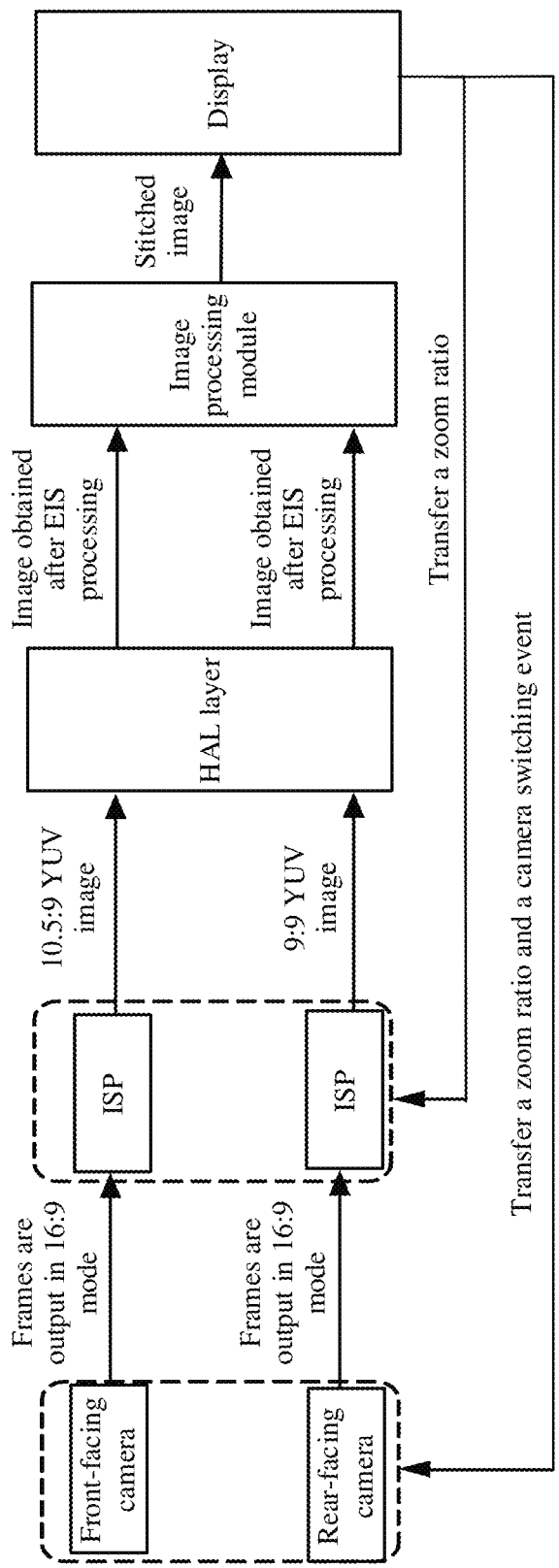
FIG. 4A is a schematic diagram of a working principle of dual-channel video recording.

Dual-channel video recording is used as an example. The following describes a principle of dual-channel video recording with reference to FIG. 4A. As shown in FIG. 4A, it is assumed that both a front-facing camera and a rear-facing camera that participate in dual-channel video recording perform frame output at a ratio of 16:9 (a frame output specification is consistent with that in a common photo mode). An ISP processes an image frame output by a camera into an image in a standard format (for example, YUV), crops an image frame output by the front-facing camera to a ratio (for example, 10.5:9) required by the area 301A, and crops an image frame output by the rear-facing camera to a ratio (for example, 9:9) required by the area 301B. Then, the ISP transmits the output image to an HAL layer. After the HAL layer performs electronic image stabilization (electronic image stabilization, EIS) processing on the image, an image processing module stitches the two channels of images. Then, a display may display a stitched image. The image processing module may include the image processor, the video codec, the digital signal processor, and the like in the electronic device 100.

In this process, the display may further listen to a zoom event, and transfer a zoom ratio to the ISP and a corresponding camera. The display may further listen to a camera switching event, and transfer the event to a corresponding camera.

Figure 4B:
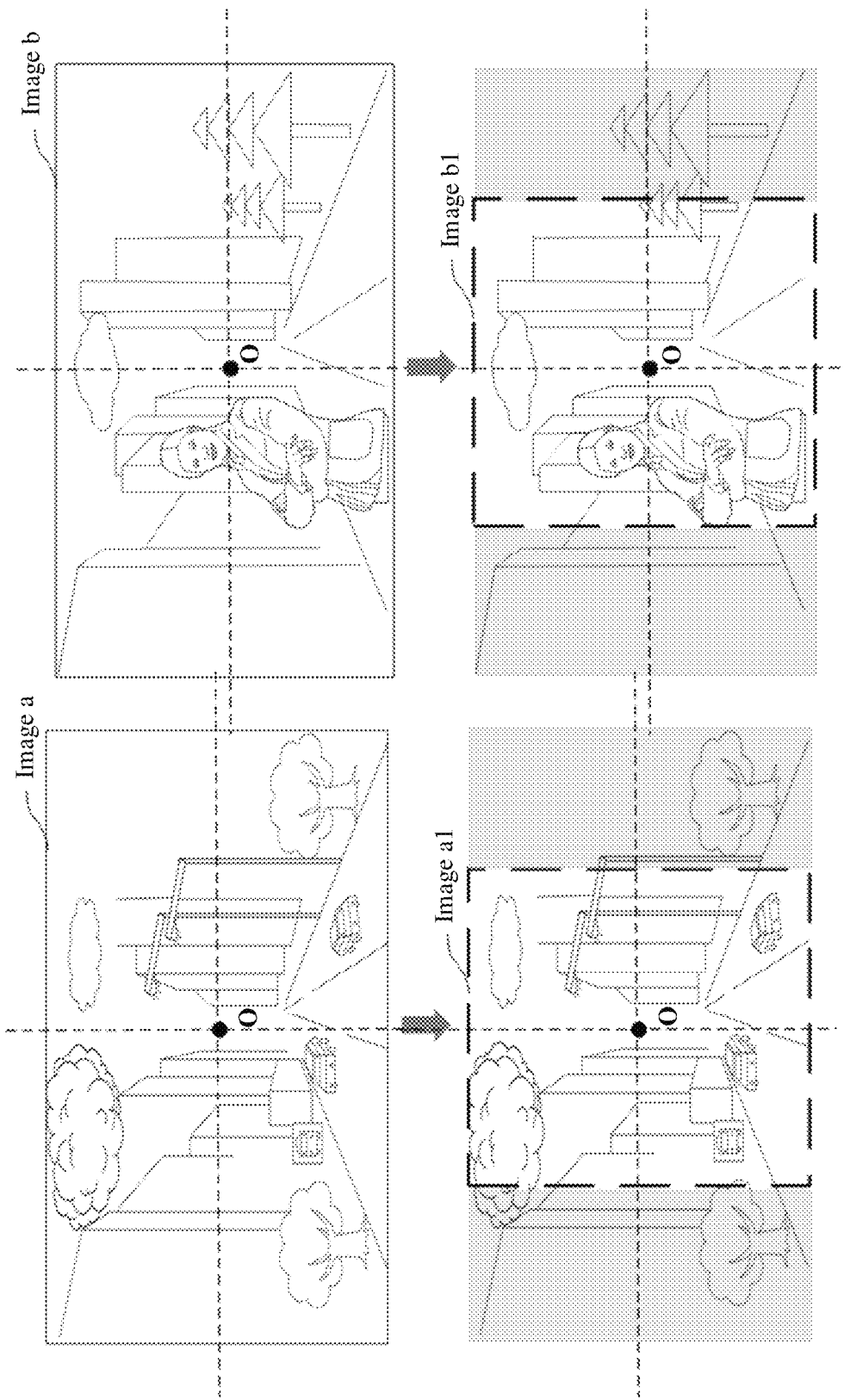
FIG. 4B is a schematic diagram of image cropping of existing dual-channel video recording.

FIG. 4B is a schematic diagram of processing, by an ISP in a center cropping manner, an image output by a camera. As shown in FIG. 4B, a rear-facing camera of an electronic device captures an image a. The electronic device crops the image a to obtain an image a1 in a cropping area. The cropping area uses a center point O of the image a as a center, and has a same ratio and size as the area 301A. In other words, the cropping area is an area in which a dashed box is located in the image. The image a is displayed in the area 301A, that is, the image a is a preview image in the area 301A.

Similarly, a front-facing camera of the electronic device captures an image b. The electronic device crops the image b to obtain an image b1 in a cropping area. The cropping area uses a center point O of the image b as a center, and has a same ratio and size as the area 301B. In other words, the cropping area is an area in which a dashed box is located in the image. The image b is displayed in the area 301B, that is, the image b is a preview image in the area 301B.

When performing multi-channel image shooting by using the electronic device, the user may change, by moving the electronic device, framing of one of the cameras in a preview area corresponding to the camera. However, in this case, moving of the electronic device, that is, a change in a posture of the electronic device, causes a change of framing of a remaining camera in a corresponding preview area. This change may be unnecessary or unexpected by the user.

When the electronic device is moved to change framing of one of the cameras in a preview area corresponding to the camera, it cannot be ensured that framing of another camera in a corresponding preview area remains unchanged. In other words, the user cannot consider framing of each camera in a corresponding preview area during multi-channel image shooting.

This is not limited to the dual-channel image shooting shown in the foregoing UI embodiments as an example, and the electronic device may alternatively enter a more-channel image shooting mode.

Figure 5:
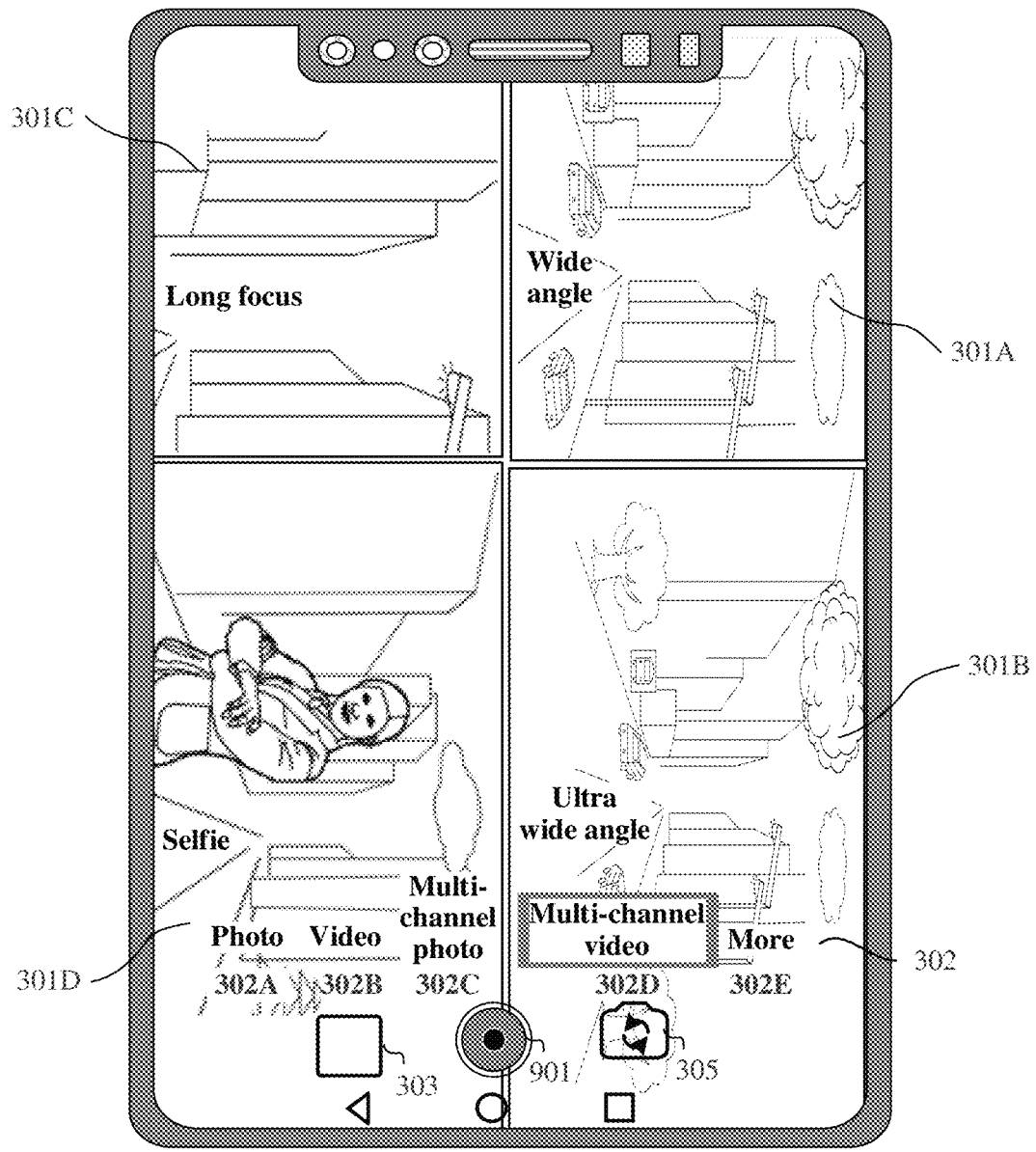
FIG. 5 is a schematic diagram of a multi-channel video recording scenario.

FIG. 5 shows an example of a user interface displayed during four-channel video recording after the electronic device 100 enables the "multi-channel video mode". As shown in FIG. 5, a preview frame of the user interface may be divided into four areas: an area 301A to an area 301D. Each area may be used to display images from different cameras. For example, the area 301A may be used to display an image from the rear-facing wide-angle camera 193-3, the area 301B may be used to display an image from the rear-facing ultra-wide-angle camera 193-4, the area 301C may be used to display an image from the rear-facing long-focus camera 193-5, and the area 301D may be used to display an image from the front-facing camera 193-1.

Based on the foregoing image shooting scenario, the following describes some embodiments of a user interface (user interface, UI) implemented on the electronic device 100 by using dual-channel image shooting as an example.

First, a user interface of the "multi-channel video mode" is described.

In some embodiments, the electronic device 100 may automatically enter the "multi-channel video mode" by default after "Camera" is started. In some other embodiments, after starting "Camera", if the electronic device 100 does not enter the "multi-channel video mode", the electronic device 100 may enter the "multi-channel video mode" in response to a detected user operation. For example, the electronic device 100 may detect a touch operation (for example, a tap operation) performed on the multi-channel video mode option 302D on the user interface 31 shown in FIG. 3B or FIG. 3C, and enter the "multi-channel video mode" in response to the operation. This is not limited thereto. The electronic device 100 may further enter the "multi-channel video mode" in another manner. For example, the electronic device 100 may further enter the "multi-channel video mode" according to a voice instruction of the user. This is not limited in this embodiment of this application.

Figure 6A:
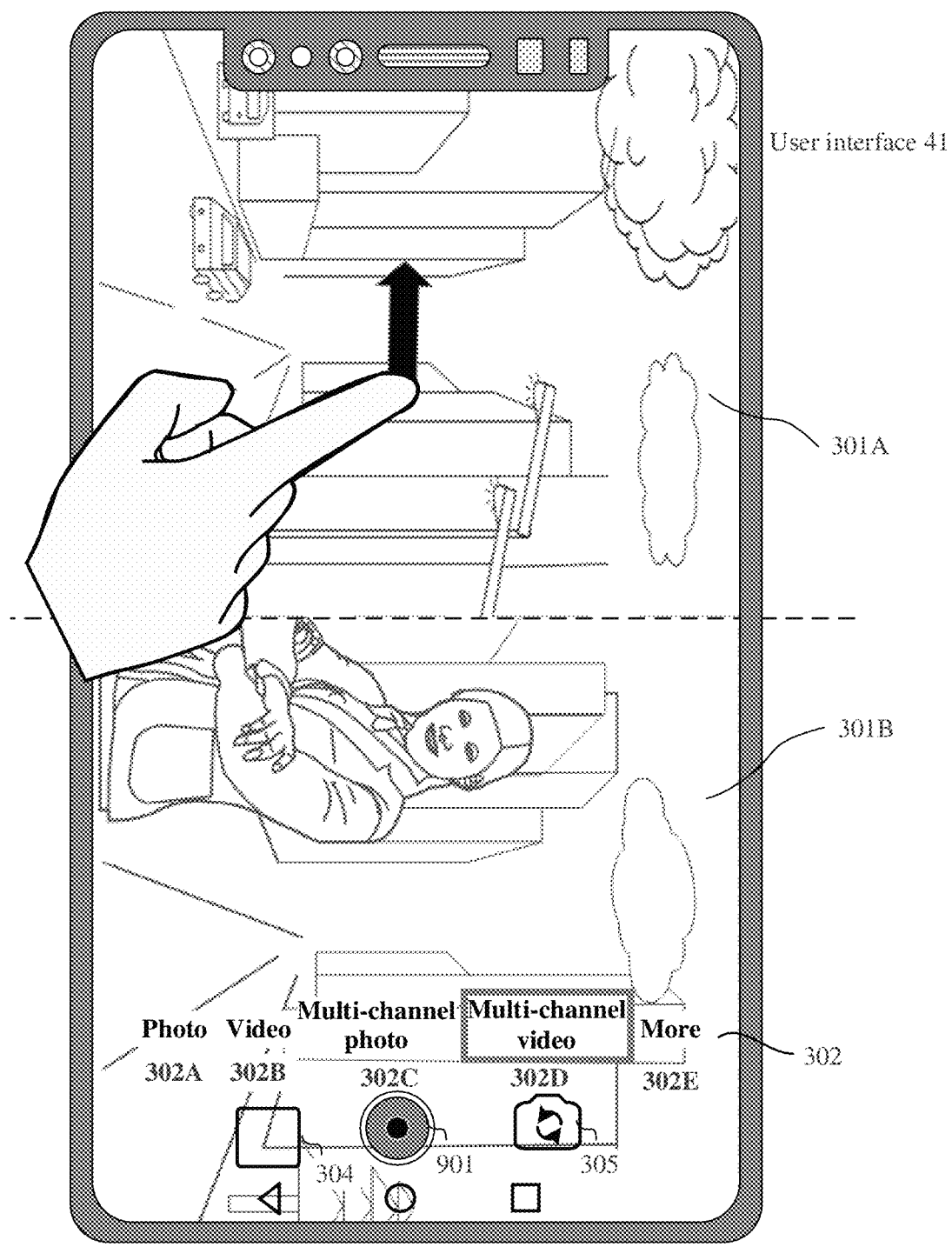
FIG. 6A, FIG. 6B, FIG. 6D, and FIG. 6E are schematic diagrams of UIs in which a preview image displayed in each area is adjusted in a multi-channel video recording preview process according to an embodiment.

FIG. 6A shows an example of a preview interface 41 displayed after the electronic device 100 enters the "multi-channel video mode". As shown in FIG. 6A, the preview interface 41 includes a preview frame 301, an image shooting mode list 302, a control 901, a control 304, and a control 305. For the image shooting mode list 302, the control 304, and the control 305, refer to related descriptions of the user interface 31. Details are not described herein again. As shown in FIG. 6A, the multi-channel video mode option 302C is selected. The control 901 may be configured to listen to a user operation that triggers video recording.

After entering the "multi-channel video mode", the electronic device 100 may capture images by using N (for example, 2) cameras, and display a preview interface on a display. A part or all of an image of each of the N cameras is displayed on the preview interface.

After the electronic device 100 enters the "multi-channel video mode", the preview frame 301 may include N areas, and one area corresponds to one of the N cameras. Each of different areas is used to display a part or all of an image from a corresponding camera.

A location, in the preview frame 301, of each area included in the preview frame 301, a size/dimension occupied by each area in the preview frame 301, and a camera corresponding to each area may be collectively referred to as a layout manner during multi-channel video recording. In some embodiments, areas included in the preview frame 301 do not overlap each other and are stitched together into the preview frame 301. In other words, the electronic device 100 may display images from the N cameras in a stitching manner. In some other embodiments, areas included in the preview frame 301 may overlap. In other words, the electronic device 100 may display images from the N cameras in a floating or superimposition manner.

For example, when N is 2, refer to FIG. 6A. A layout manner during multi-channel video recording shown in FIG. 6A may be as follows: The preview frame 301 is equally divided into areas 301A and 301B on the left and right, the area 301A correspondingly displays an image from the rear-facing wide-angle camera 193-3, and the area 301B correspondingly displays an image from the front-facing camera 193-1. For example, assuming that a size (that is, a screen resolution) of the display of the electronic device is 2340*1080, and a ratio is 19.5:9, a size of the area 301A may be 1248*1080, and a ratio is 10.5:9, where 1248 and 1080 are respectively quantities of pixels of the area 301A in terms of a length and a width. A size of the area 301B may be 1088*1080, and a ratio is 10.5:9, where 1088 and 1080 are respectively quantities of pixels of the area 301A in terms of a length and a width. It can be learned that a ratio of a total area obtained after the area 301A and the area 302A are stitched is 19.5:9, which is the same as a ratio of the preview frame 301. That is, an area formed by stitching the area 301A and the area 302A fills a display area of the display. As shown in FIG. 6A, an image in the area 301A is an image of a photographed object (such as a person or a scenery) facing a photographer, and an image in the area 301B is an image of the photographer facing the display 194.

For another example, when N is 2, a layout manner during multi-channel video recording may be as follows: The preview frame 301 includes an area 1 and an area 2, the area 1 occupies all of the preview frame 301, the area 2 is located in a lower right corner of the preview frame 301 and occupies a quarter of the preview frame 301, the area 1 correspondingly displays an image from the rear-facing ultra-wide-angle camera 193-4, and the area 2 correspondingly displays an image from the rear-facing wide-angle camera 193-3.

For another example, when N is 3, a layout manner during multi-channel video recording may be as follows: The preview frame 301 is equally divided into three areas on the left, middle, and right. One area correspondingly displays an image from the rear-facing long-focus camera 193-5, one area correspondingly displays an image from the rear-facing ultra-wide-angle camera 193-4, and one area correspondingly displays an image from the front-facing camera 193-1.

It may be understood that, combination is performed based on different situations such as a shape, a size, and a location of each area in the preview frame 301, and there may be a plurality of layout manners for multi-channel video recording, which are not listed one by one herein.

After the electronic device 100 enters the "multi-channel video mode", a quantity N of cameras and a layout manner that are used by default for multi-channel video recording may be preset by the electronic device 100, or may be autonomously set by the user, or may be a quantity of cameras and a layout manner that are recently used by the user in the "multi-channel video mode".

In some embodiments, after entering the "multi-channel video mode", the electronic device 100 may further display, on the preview interface, a control used by the user to change a quantity of cameras and a layout manner. The electronic device 100 may display, in response to a touch operation (for example, a tap operation) performed on the control, a setting interface used to set or change a quantity of cameras and a layout manner used in the "multi-channel video mode". The user can set or change, on the setting interface, the quantity of cameras and the layout manner used in the "multi-channel video mode". A specific implementation of the setting interface is not limited in this embodiment of this application.

In some other embodiments, after entering the "multi-channel video mode", the electronic device 100 may further change, in response to a touch operation (for example, a tap operation) on a control that is on the preview interface and that is used to switch cameras, a camera corresponding to an area in the layout manner. For example, the user may tap the control 304 in FIG. 6A, to change the camera corresponding to the area 301A from the rear-facing wide-angle camera 193-3 to the rear-facing ultra-wide-angle camera 193-4. In some embodiments, each area on the preview interface may include a corresponding control used for camera switching, and the electronic device 100 may change, in response to a touch operation on the control used for camera switching in a preview area, a camera corresponding to the preview area.

In some embodiments, after entering the "multi-channel video mode", the electronic device 100 may further display, in each area on the preview interface, an identifier of a camera corresponding to the area, to prompt the user of a source of an image displayed in each area. The identifier of the camera may be implemented as a text, an icon, or another form.

After the electronic device 100 enters the "multi-channel video mode", a preview image displayed in each area of the preview frame 301 is a part or all of an image of each of the N cameras.

In some embodiments, after the electronic device 100 enables the "multi-channel video mode", a preview image displayed in each area of the preview frame 301 may be obtained after the electronic device 100 crops an image captured by a corresponding camera. That is, the preview area displays a part of the preview image of the corresponding camera. The cropping manner may be, for example, center cropping or another cropping manner. This is not limited in this application. The electronic device may crop images captured by different cameras in different manners. A manner in which the electronic device crops the images captured by the N cameras may be preset by the electronic device, or may be autonomously set by the user, or may be a cropping manner recently used by the user in the "multi-channel video mode".

Center cropping means that the electronic device 100 crops, from an image by using a center of the image captured by a camera as a center, a part that is of the image and that has a same size as a corresponding area.

For example, refer to FIG. 4B. An image captured by the rear-facing wide-angle camera 193-3 is a, and a preview image displayed in the area 301A is a part that is cropped by the electronic device 100 by using a center of the image a as a center and that has a same size as the area 301A. Similarly, refer to FIG. 6F. An image captured by the front-facing camera 193-1 is b, and an image displayed in the area 301B is a part that is cropped by the electronic device 100 by using a center of the image b as a center and that has a same size as the area 301B.

In some other embodiments, if a size of an image captured by a camera is the same as a size of a preview area corresponding to the camera, the electronic device 100 may directly display the image in the area without cropping. That is, the preview area displays the image captured by the camera.

In the following embodiments of this application, it is assumed that after the electronic device 100 enables the "multi-channel video mode", the preview image in the area 301A is an image obtained by the electronic device by cropping, in a cropping area centered a point O and having a first size, an image captured by a camera corresponding to the area 301A. That is, after the electronic device 100 enables the "multi-channel video mode", the cropping area in the image captured by the camera corresponding to the area 301A uses the point O as the center, and is the first size.

FIG. 6A to FIG. 6F, FIG. 7A to FIG. 7F, FIG. 8A and FIG. 8B, and FIG. 9A to FIG. 9E show examples of embodiments of adjusting a preview image displayed in each area on a preview interface after the electronic device 100 enters the "multi-channel video mode".

It should be noted that in embodiments shown in FIG. 6A to FIG. 6F, FIG. 7A to FIG. 7F, FIG. 8A and FIG. 8B, and FIG. 9A to FIG. 9E, a posture of the electronic device 100 does not change. In other words, when adjusting the preview image displayed in each area on the preview interface of the electronic device, the user does not move the electronic device 100. In this way, when the user adjusts framing of one camera in a preview area corresponding to the camera, it can be ensured that framing of another camera in a corresponding preview area remains unchanged. In other words, the user can consider framing of each camera in a corresponding preview area during multi-channel image shooting.

In addition, although the posture of the electronic device 100 does not change, an external environment may change. In other words, the camera of the electronic device 100 may collect an image updated in real time.

In some embodiments, after entering the "multi-channel video mode", the electronic device 100 may adjust framing of a working camera in a preview area in a non-zoom scenario.

FIG. 6A to FIG. 6F show an example of a manner in which the electronic device 100 adjusts framing of a working camera in a preview area in a non-zoom scenario.

Figure 6B:
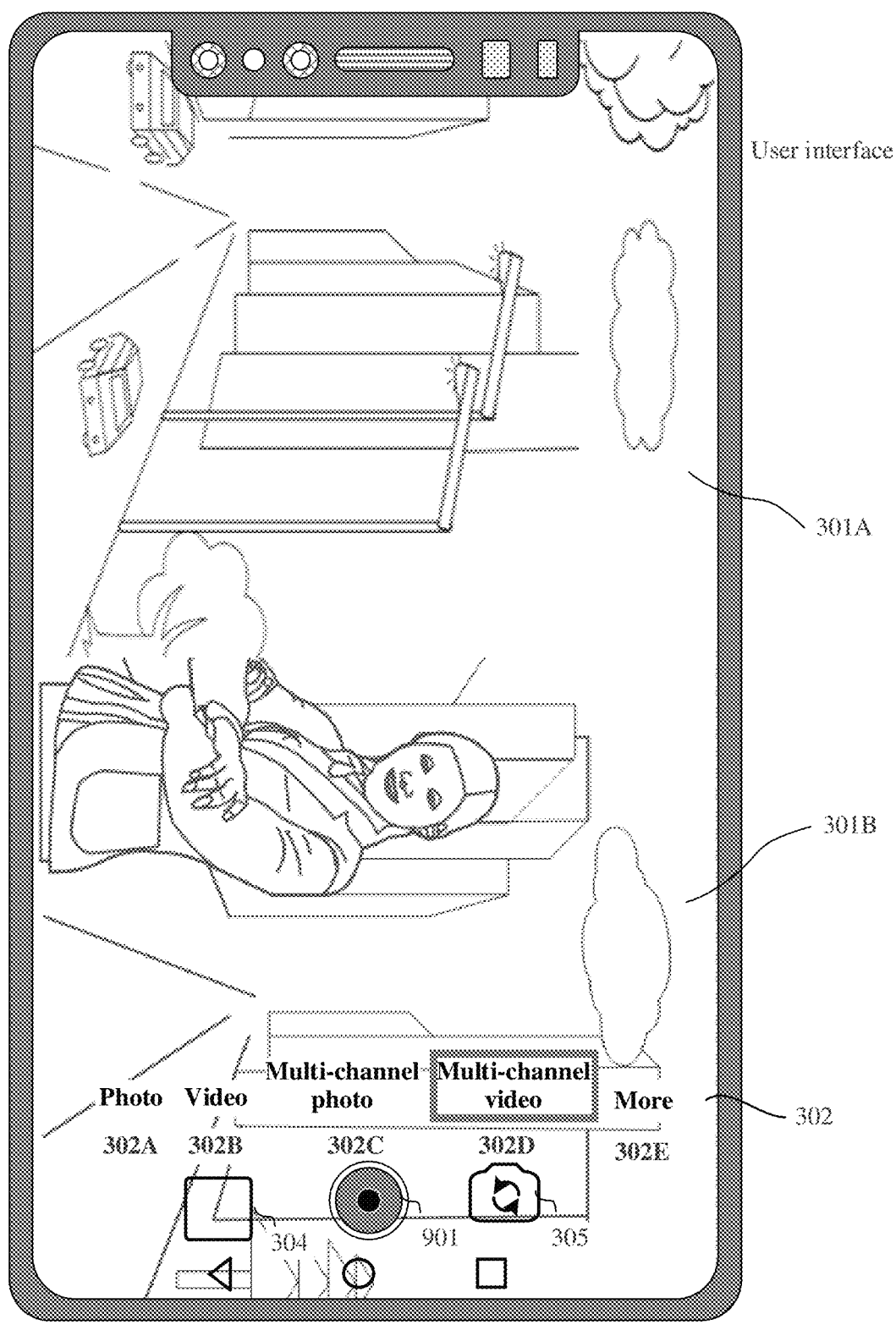

Refer to FIG. 6A. The electronic device 100 may detect a sliding operation (for example, a horizontal leftward sliding operation) performed on the area 301A. Refer to FIG. 6B. The electronic device 100 may update a cropping area in the image a in response to the sliding operation, to refresh a preview image displayed in the area 301A. The image a is an image captured by a camera corresponding to the area 301A.

A center of the cropping area in the updated image a is a point O1 of the image a, and a size of the cropping area is a second size. The second size is equal to the first size.

If an area that uses O1' as a center and that is of the second size does not exceed an edge of the image a, O1 is located at O1'. If the area that uses O1' as a center and that is of the second size exceeds the edge of the image a, O1 is located at a center of an area that coincides with the edge of the image a and that is of the second size.

O1' is determined by the point O of the image a and a sliding track corresponding to the sliding operation. Specifically, O1 is located in a first direction of O, and the first direction is a reverse direction of the sliding track. A distance between O1' and the point O is positively correlated to a length of the sliding track. In some embodiments, the distance between O1' and the point O is the same as the length of the sliding track. O is a center of the cropping area before the update, and the first size is a size of the cropping area before the update.

Figure 6C:
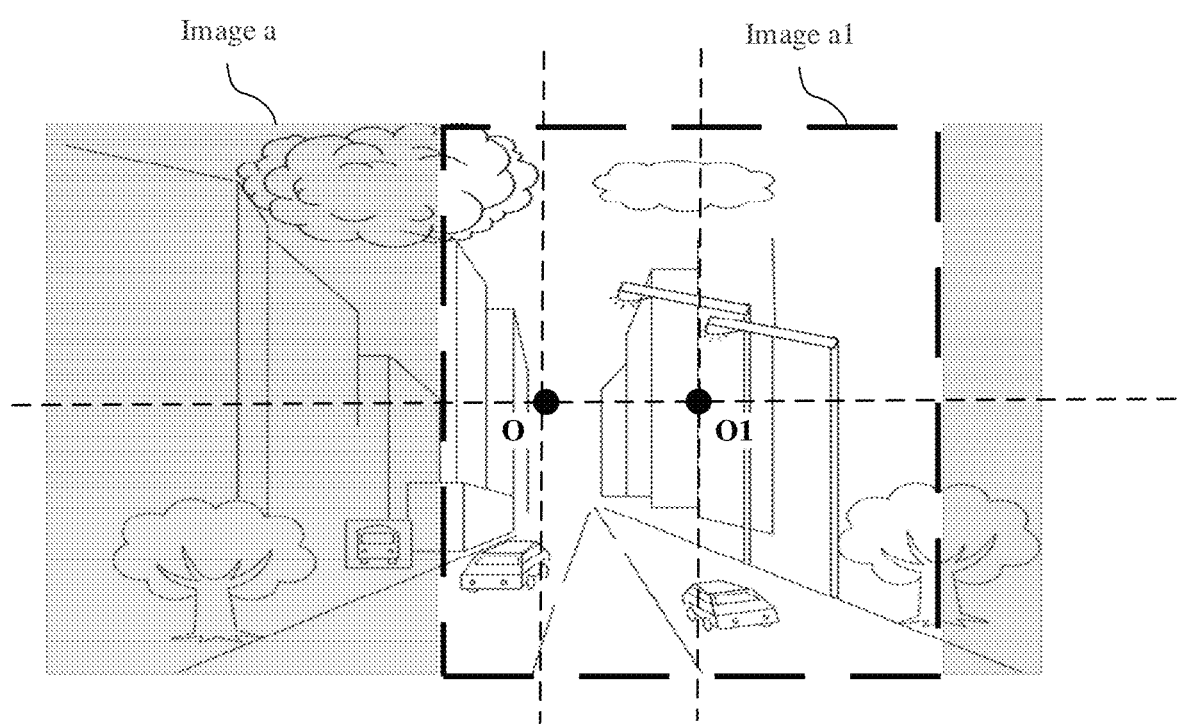
FIG. 6C and FIG. 6F are schematic diagrams of cropping an image when a preview image displayed in each area is adjusted in a multi-channel video recording preview process according to an embodiment.

FIG. 6C shows an example of an updated cropping area of the electronic device 100. The updated cropping area is an area in which a dashed box is located. A preview image displayed in the refreshed area 301A is an image a1.

In some embodiments, if a speed at which the user enters the sliding operation exceeds a threshold, a distance between O1 and the point O may be a default distance. In other words, when the user quickly slides, the electronic device determines O1 based on the default distance.

Figure 6D:
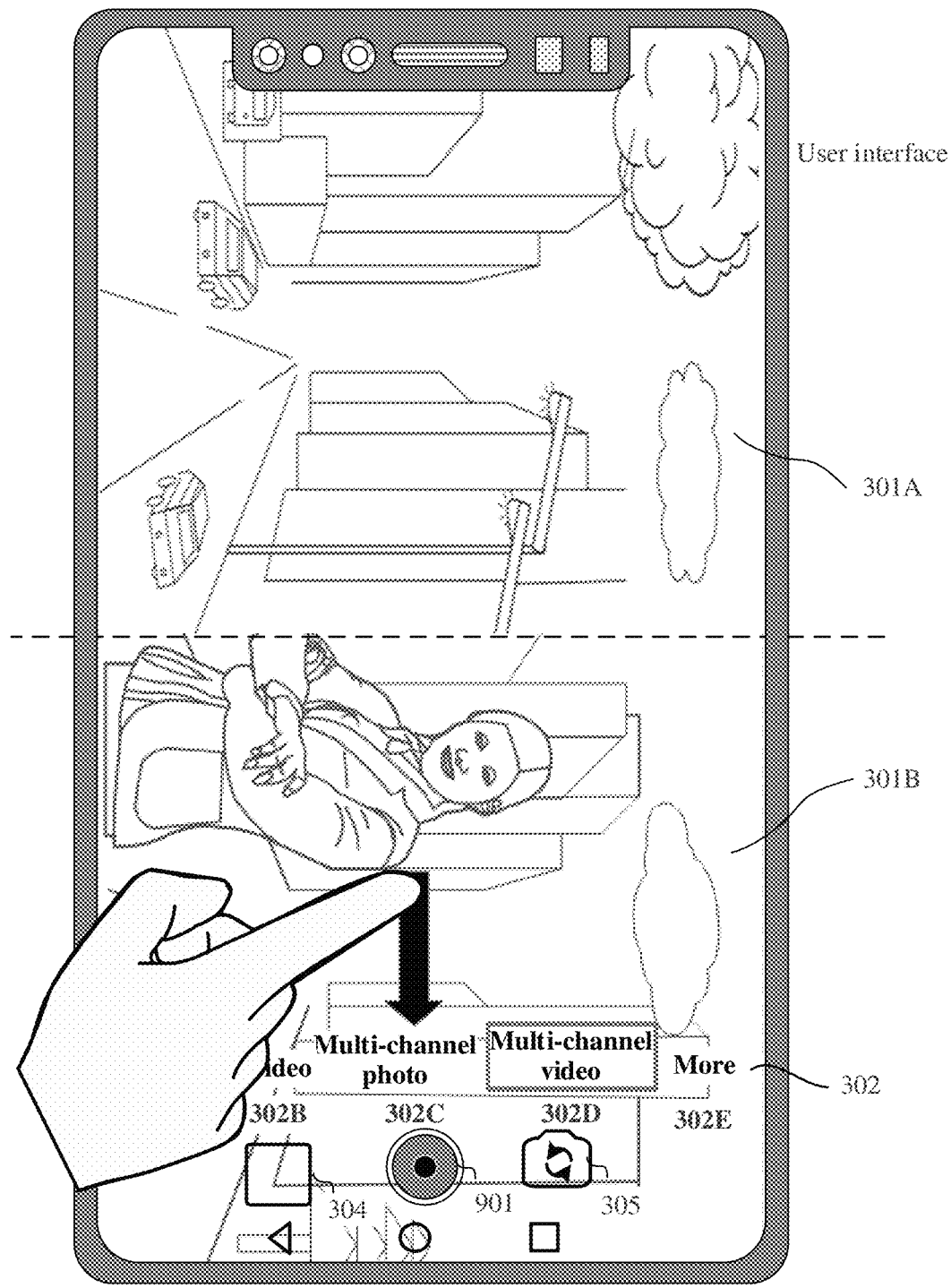
Figure 6E:
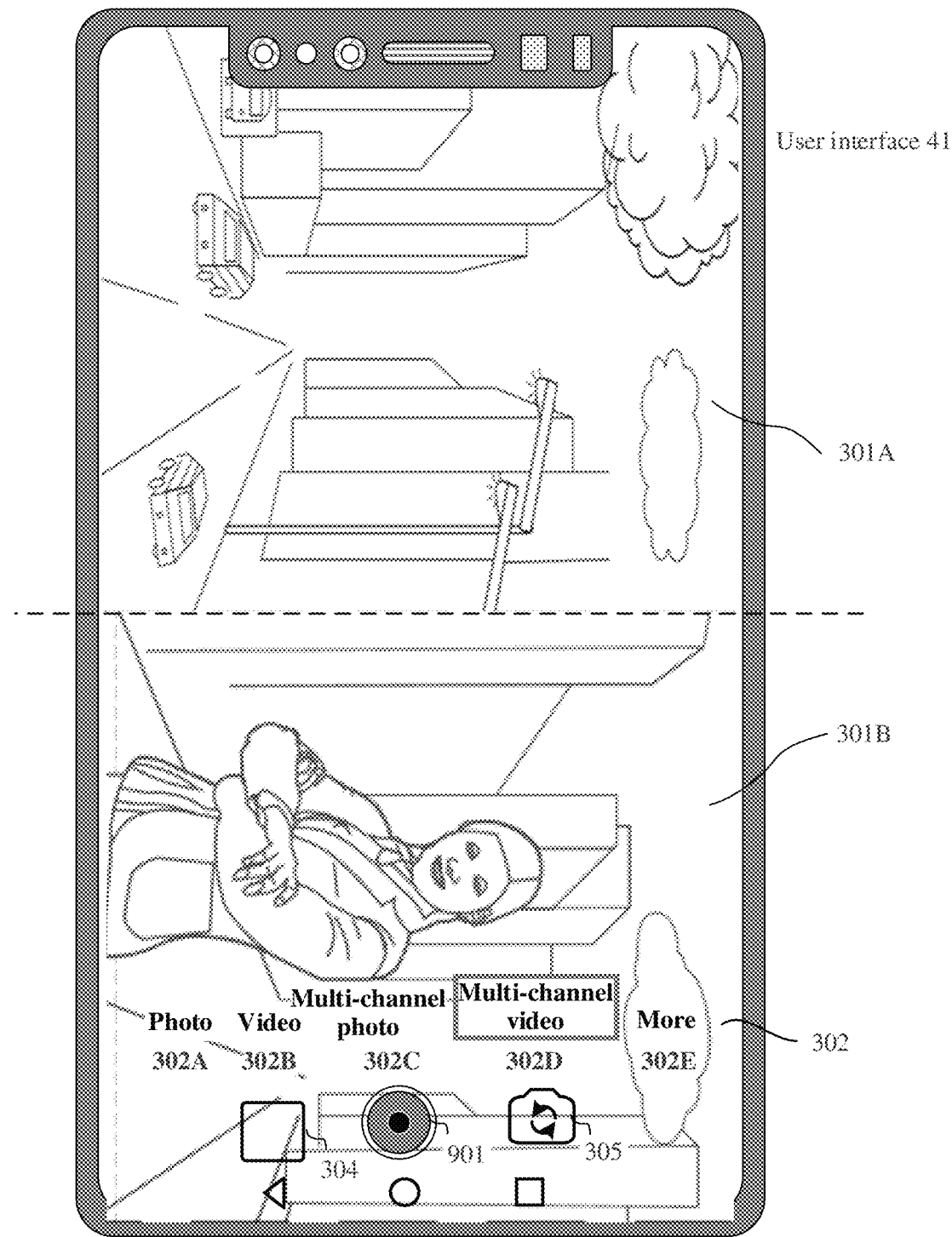
Figure 6F:
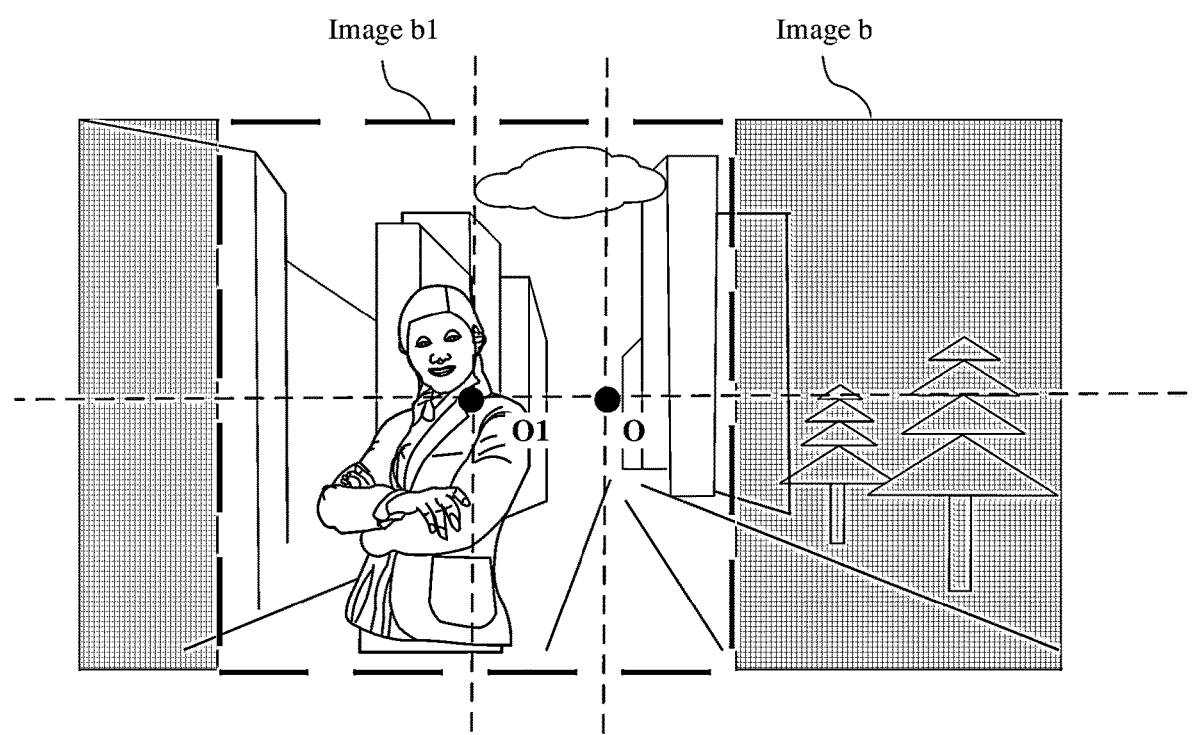

Similarly, refer to FIG. 6D. The electronic device 100 may further detect a sliding operation (for example, a horizontal rightward sliding operation) performed on the area 301B. The user interfaces shown in FIG. 6D and FIG. 6B are the same. Refer to related descriptions. Refer to FIG. 6E. The electronic device 100 may update a cropping area in the image b in response to the sliding operation, to refresh a preview image displayed in the area 301B. For a manner in which the electronic device updates the cropping area in the image b, refer to the manner in which the electronic device updates the cropping area in the image a. FIG. 6F shows an example of an updated cropping area in the image b of the electronic device 100. The updated cropping area is an area in which a dashed box is located. A preview image displayed in the refreshed area 301B is an image b1.

According to embodiments shown in FIG. 6A to FIG. 6F, after the electronic device 100 enters the "multi-channel video mode", the user may be supported in separately adjusting framing of each working camera in a preview area corresponding to the working camera during multi-channel video recording, so that framing of each working camera in the preview area corresponding to the working camera does not affect each other, to avoid a problem that a change of framing of a working camera in a corresponding preview area causes a change of framing of another working camera in a corresponding preview area. Such a framing manner during multi-channel video recording is more flexible and convenient, and user experience can be improved.

It can be learned from embodiments shown in FIG. 6A to FIG. 6F that the electronic device may display the preview interface and the part or all of the image captured by each of the N (for example, 2) cameras. The preview interface includes N areas, and the part or all of the image captured by each of the N cameras is displayed in one of the N areas.

Herein, a preview area generally displays a part of an image captured by a corresponding camera. However, when the user reduces a zoom ratio (for example, 0.7×), a preview area may display an entire image captured by a corresponding camera.

A first area (for example, the area 301A) may be one of the N areas, and a camera corresponding to the first area may be referred to as a first camera (for example, the camera corresponding to the area 301A). The first area may display an image obtained by the electronic device by cropping an entire image captured by the first camera before the cropping manner is changed based on a user operation. Before the cropping manner is changed, a manner in which the electronic device crops the entire image captured by the first camera is not limited in embodiments of this application. In a specific embodiment, before the cropping manner is changed, in this embodiment of this application, the electronic device crops, in a center cropping manner, the entire image captured by the first camera.

If the electronic device detects a sliding operation in a first area, the electronic device may change, based on the sliding operation, a manner of cropping the entire image captured by the first camera, to refresh a preview image displayed in the first area. Before and after the refreshing, the electronic device crops the entire image captured by the first camera in different manners. In the entire image captured by the first camera, locations of preview images before and after the refreshing in the entire image captured by the first camera are different.

For example, a location of the preview image displayed in the first area before the refreshing may be, for example, a location of the cropping area before the update in FIG. 6A to FIG. 6F, or a location of the preview image displayed in the first area before the refreshing may be, for example, a location of the cropping area after the update in FIG. 6A to FIG. 6F.

For a relationship between a location of a second preview image and a location of a first preview image, refer to the foregoing descriptions.

In some embodiments, in the entire image captured by the first camera, a direction in which a central location of the preview image displayed in the first area before the refreshing points to a central location of the preview image displayed in the first area after the refreshing is opposite to a sliding direction of the sliding operation.

If the user sliding operation is a leftward sliding operation, the preview image displayed in the first area after the refreshing is closer to a right boundary of the entire image captured by the first camera than the preview image displayed in the first area before the refreshing.

If the sliding user operation is a rightward sliding operation, the preview image displayed in the first area after the refreshing is closer to a left boundary of the entire image captured by the first camera than the preview image displayed in the first area before the refreshing.

In some embodiments, a central location of the preview image displayed in the first area before the refreshing coincides with a central location of the entire image captured by the first camera.

In some embodiments, the preview images displayed in the first area before and after the refreshing are of a same size.

In some embodiments, after entering the "multi-channel video mode", the electronic device 100 may adjust framing of a working camera in a preview area in a zoom scenario. Zooming means that a preview image displayed in each area on a preview interface is zoomed in or zoomed out.

FIG. 7A to FIG. 7F show an example of a manner in which the electronic device 100 adjusts framing of a working camera in a preview area in a zoom scenario.

Figure 7A:
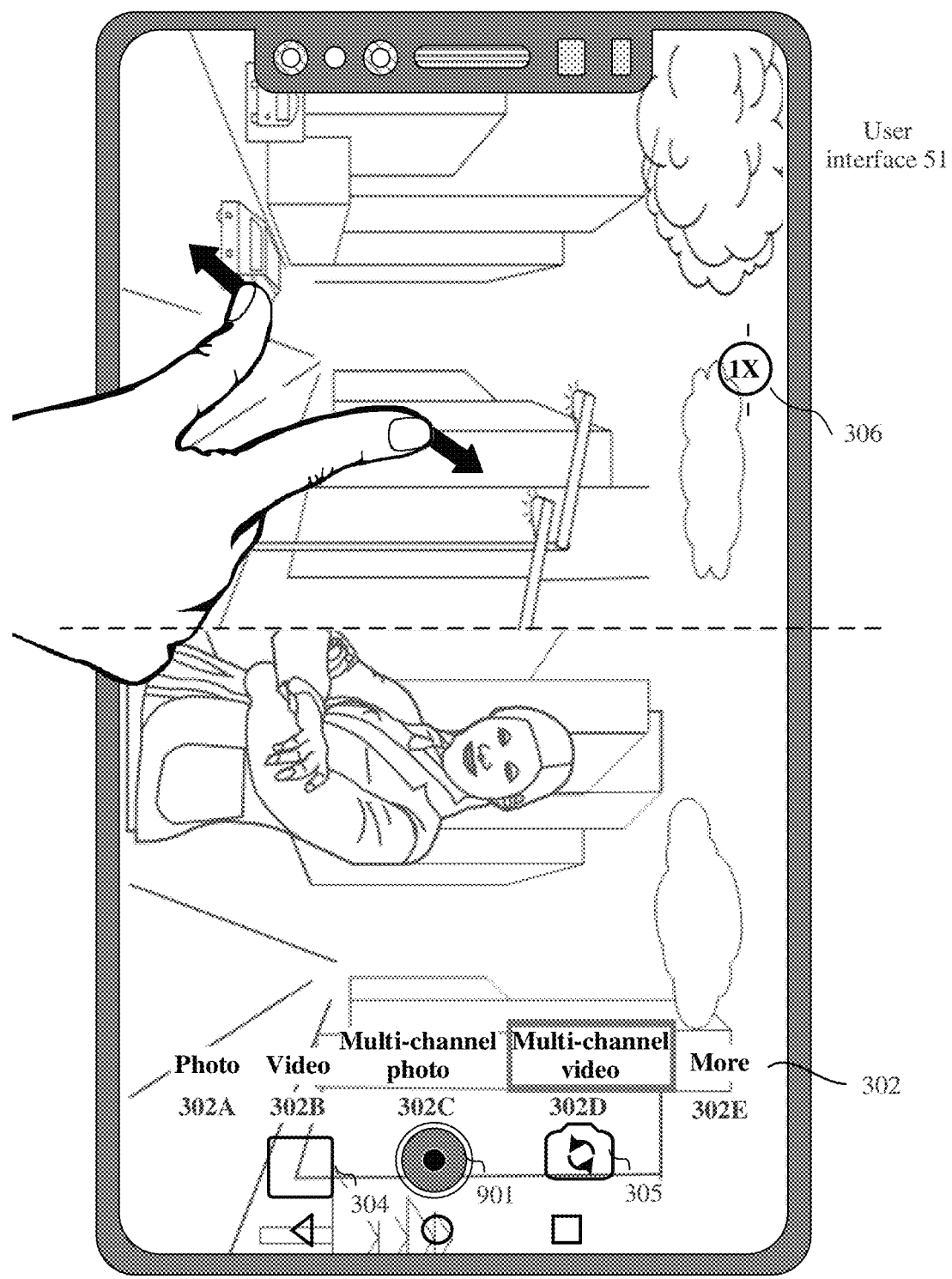
FIG. 7A, FIG. 7B, FIG. 7D, and FIG. 7E are schematic diagrams of UIs in which a preview image displayed in each area is adjusted in a multi-channel video recording preview process according to another embodiment.

Refer to FIG. 7A. A user interface 51 shown in FIG. 7A is a preview interface displayed after the electronic device 100 enters the "multi-channel video mode". The user interface 51 includes a preview frame 301, an image shooting mode list 302, a control 901, a control 304, and a control 305. The preview frame 301 includes an area 301A and an area 301B. For a function of each control and a preview image displayed in each area on the user interface 51, refer to related descriptions of the user interface 41 shown in FIG. 6A. Details are not described herein again.

Figure 7B:
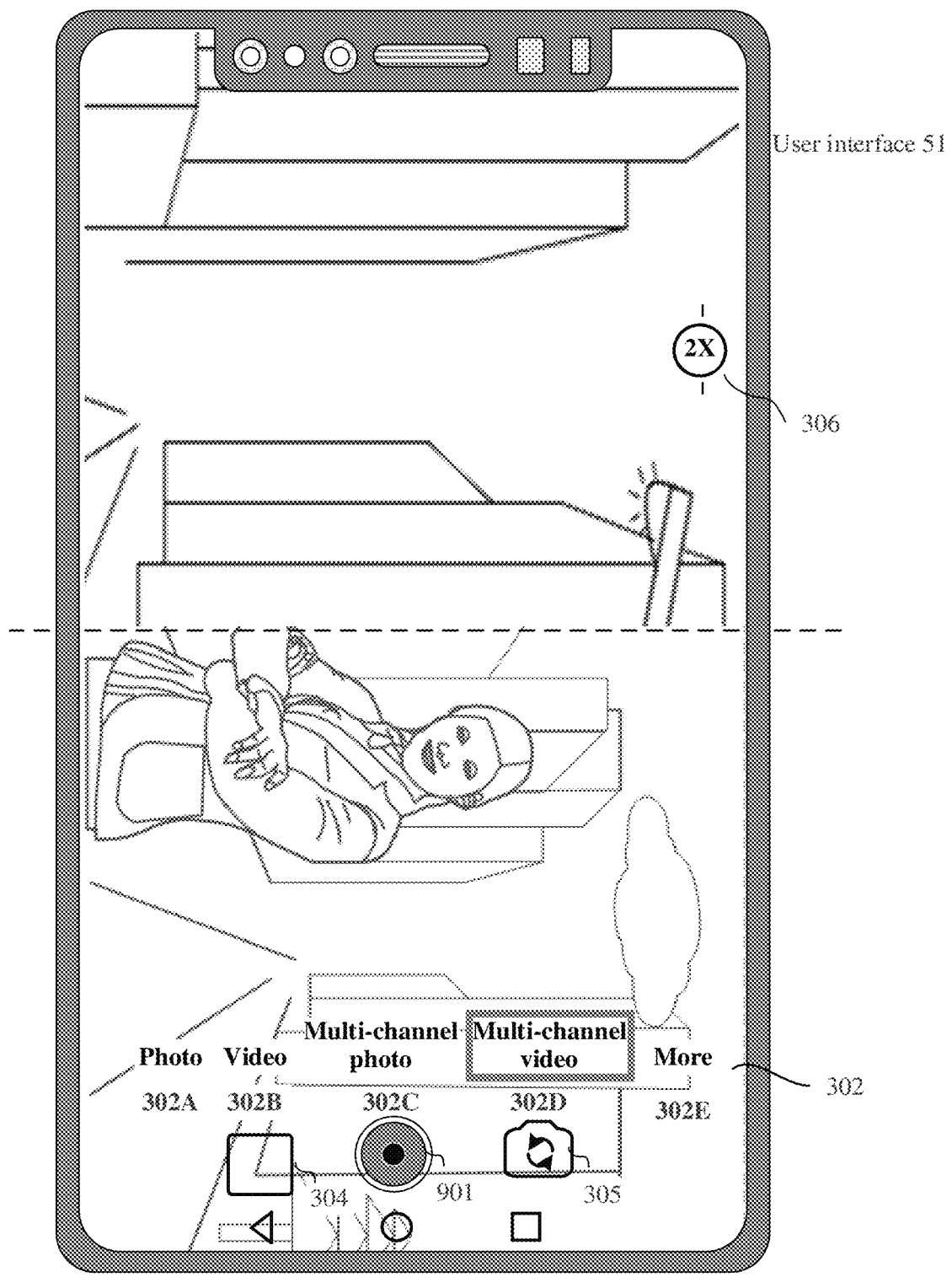

As shown in FIG. 7A and FIG. 7B, the electronic device 100 may detect a two-finger zoom gesture (for example, a gesture of sliding outwards with two fingers shown in the figure) in the area 301A, display, in response to the two-finger zoom gesture, a control 306 used to indicate a zoom ratio of a corresponding camera in the area 301A, and update a cropping area in an image a, to refresh a preview image displayed in the area 301A. The image a is an image captured by the camera corresponding to the area 301A.

The control 306 may be implemented as an icon or a text, and the zoom ratio of the corresponding camera indicated by the control 306 changes with the two-finger zoom gesture. When the two-finger zoom gesture is a two-finger zoom-in gesture, a larger amplitude of the gesture indicates a larger zoom ratio of the corresponding camera. When the two-finger zoom gesture is a two-finger zoom-out gesture, a larger amplitude of the gesture indicates a smaller zoom ratio of the corresponding camera. For example, a text "1×" in FIG. 7A indicates that a zoom ratio of a camera is 1, and a text "2×" in the control 306 in FIG. 7B indicates that the zoom ratio of the camera is 2.

An example in which before the two-finger zoom gesture is detected, the zoom ratio of the camera corresponding to the area 301A is 1, and after the two-finger zoom gesture is received, the zoom ratio of the camera is ×1 is used for description. A center of the cropping area in the updated image a is a point O of the image a, and a size of the cropping area is a third size.

A length of the third size is 1/×1 of a length of a first size, and a width of the third size is 1/×1 of a width of the first size. That is, the first size is 1/×12 of the first size. O is a center of the cropping area before the update, and the first size is a size of the cropping area before the update.

Figure 7C:
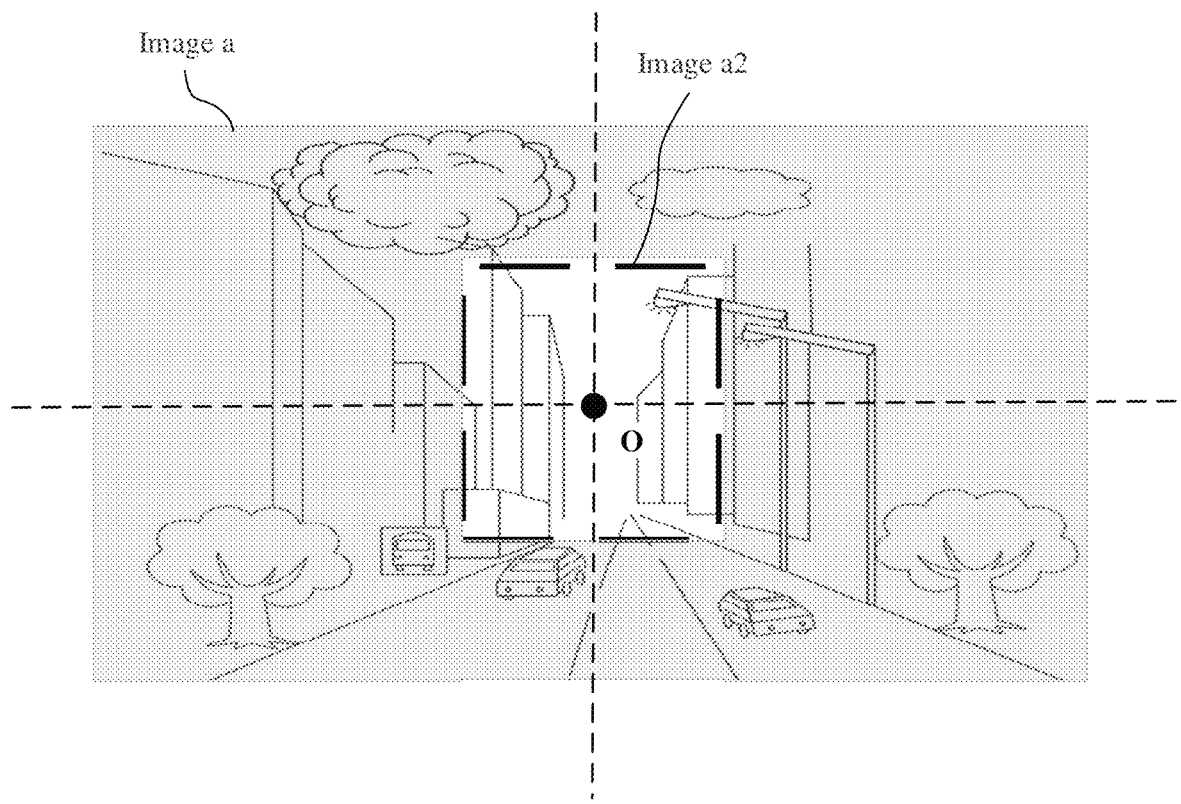
FIG. 7C and FIG. 7F are schematic diagrams of cropping an image when a preview image displayed in each area is adjusted in a multi-channel video recording preview process according to another embodiment.

FIG. 7C shows an example of an updated cropping area of the electronic device 100. The updated cropping area is an area in which a dashed box is located. A preview image displayed in the refreshed area 301A is an image a2.

As shown in FIG. 7B, because sizes of an image a2 and the area 301A are different, the electronic device 100 may zoom in pixels of the image a2 through "interpolation" processing, to zoom in the image a2 to the entire area 301A for display.

In some embodiments, when the two-finger zoom gesture is a two-finger zoom-in gesture, if an amplitude of the two-finger zoom-in gesture exceeds a first preset value, the camera corresponding to the area 301A may be automatically switched to a camera with a larger focal length, for example, switched from a wide-angle camera to a long-focus camera. When the two-finger zoom gesture is a two-finger zoom-out gesture, if an amplitude of the two-finger zoom-out gesture exceeds a second preset value, the camera corresponding to the area 301A may be automatically switched to a camera with a smaller focal length, for example, switched from a wide-angle camera to an ultra-wide-angle camera.

Figure 7D:
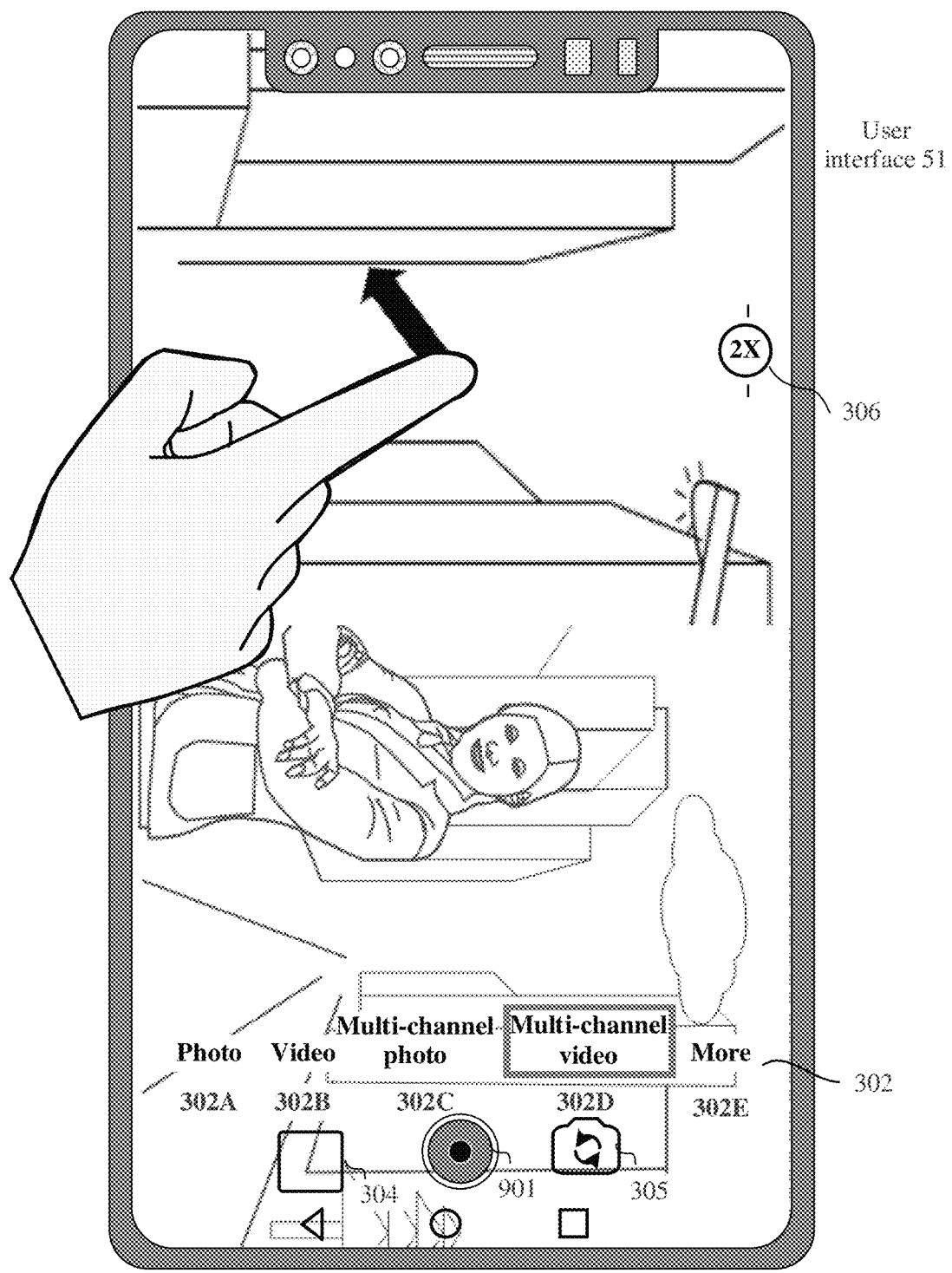
Figure 7E:
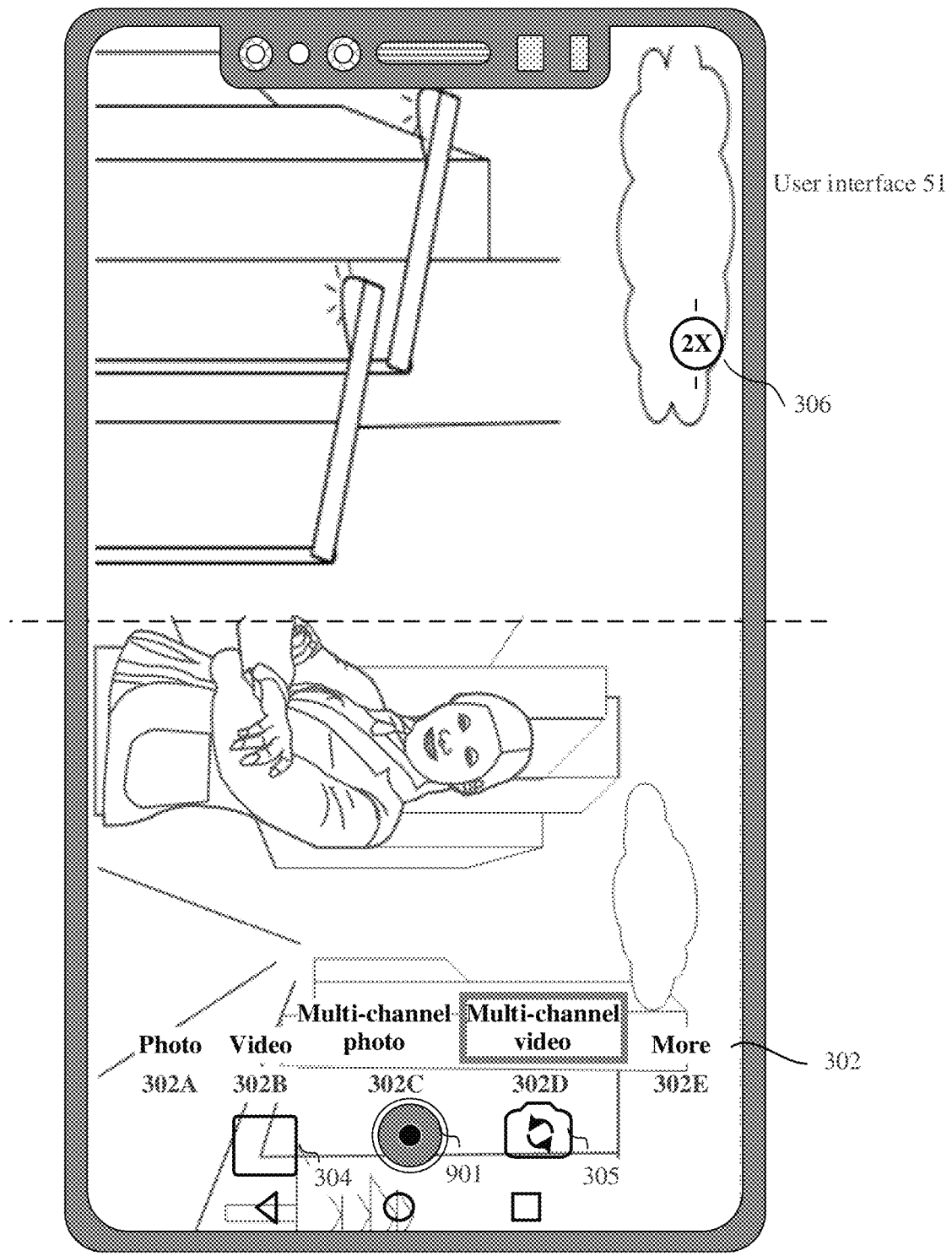
Figure 7F:
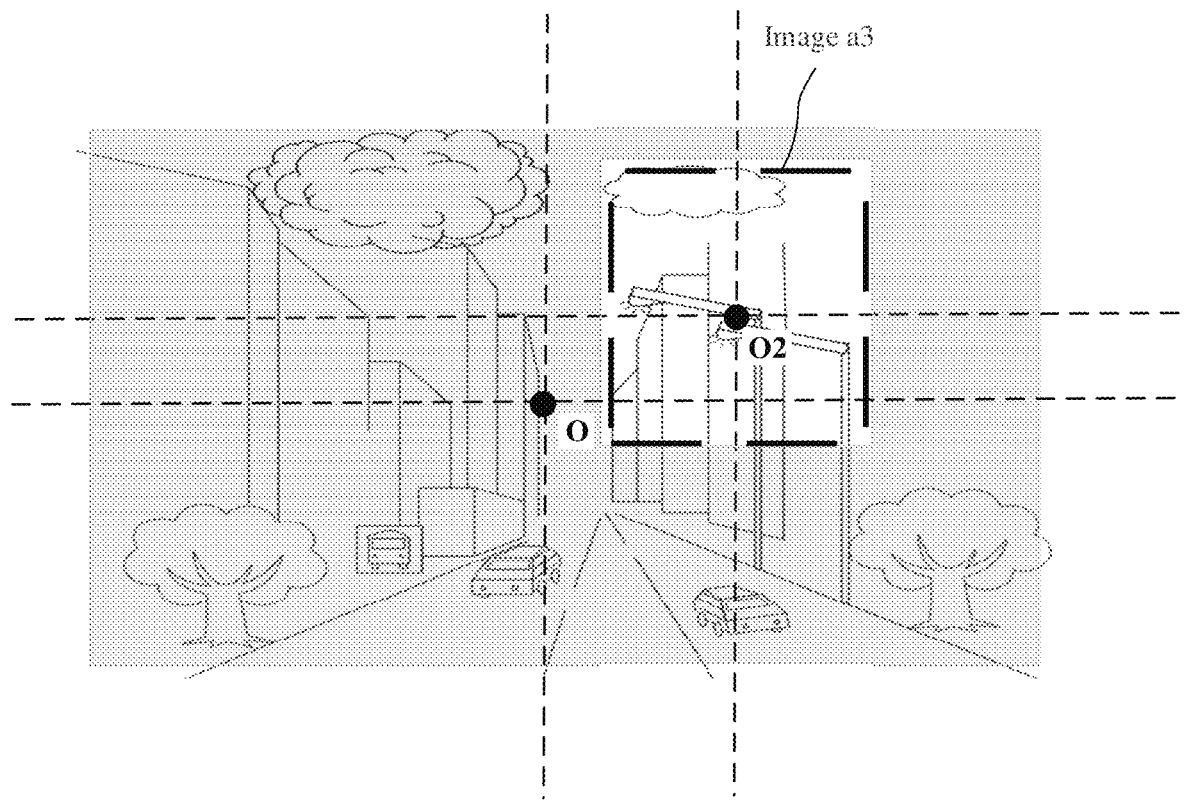

FIG. 7D to FIG. 7F show an example of a manner in which the electronic device 100 adjusts framing of a working camera in a preview area in a zoom scenario.

The user interface 51 shown in FIG. 7D is the same as the user interface 51 shown in FIG. 7B. Refer to related descriptions.

Refer to FIG. 7D. The electronic device 100 may detect a sliding operation (for example, a horizontal leftward sliding operation) performed on the area 301A. A direction and a track of the sliding operation are not limited in this embodiment of this application.

Refer to FIG. 7E. The electronic device 100 may update a cropping area in the image a again in response to the sliding operation, to refresh a preview image displayed in the area 301A. The image a is an image captured by the camera corresponding to the area 301A.

A manner in which the electronic device updates the cropping area in the image a again in response to the sliding operation is the same as a manner in which the electronic device updates the cropping area in the image a in response to the sliding operation shown in FIG. 6A to FIG. 6F. Refer to related descriptions.

For example, a center of the re-updated cropping area in the image a is O2, and a size of the cropping area is the third size.

If an area that uses O2' as a center and that is of the third size does not exceed an edge of the image a, O2 is located at O2'. If the area that uses O2' as a center and that is of the third size exceeds the edge of the image a, O2 is located at a center of an area that coincides with the edge of the image a and that is of the third size.

O2' is determined by the point O of the image a and a sliding track corresponding to the sliding operation. Specifically, O2' is located in a first direction of O, and the first direction is a reverse direction of the sliding track. A distance between O2' and the point O is positively correlated to a length of the sliding track. In some embodiments, the distance between O2' and the point O is the same as the length of the sliding track.

FIG. 7F shows an example of a re-updated cropping area of the electronic device 100. The re-updated cropping area is an area in which a dashed box is located. A preview image displayed in the refreshed area 301A is an image a3.

In some embodiments, if the area that uses O2' as a center and that is of the third size exceeds the edge of the image a, the electronic device 100 may automatically switch the camera corresponding to the area 301A. The electronic device 100 may switch the camera corresponding to the area 301A to a camera with a larger field of view. For example, if an initial camera that is of the electronic device 100 and that is corresponding to the area 301A is a long-focus camera, the electronic device 100 may switch the long-focus camera to a wide-angle camera. This can fully meet a requirement of a user for adjusting framing of each area within a larger field of view.

According to embodiments shown in FIG. 7A to FIG. 7F, after the electronic device 100 enters the "multi-channel video mode", the user may be supported in separately adjusting framing of each working camera in a preview area corresponding to the working camera during multi-channel video recording, so that framing of each working camera in the preview area corresponding to the operating camera does not affect each other, to avoid a problem that a change of framing of a working camera in a corresponding preview area causes a change of framing of another working camera in a corresponding preview area. Such a framing manner during multi-channel video recording is more flexible and convenient, and user experience can be improved.

After adjusting the preview image of each area on the preview interface in the zoom scenario, the electronic device 100 may further zoom again, to increase or decrease a zoom ratio of a camera corresponding to an area. The following provides descriptions by using an example in which after adjusting the framing of the working camera in the preview area in the zoom scenario shown in FIG. 7A to FIG. 7F, the electronic device 100 zooms again for the camera corresponding to the area 301A.

In some embodiments, after adjusting a preview image of each area on a preview interface in a zoom scenario, the electronic device 100 may detect a two-finger zoom gesture (for example, a gesture of sliding outwards with two fingers) acting on the area 301A, and update a cropping area in an image a in response to the two-finger zoom gesture, to refresh a preview image displayed in the area 301A. The image a is an image captured by the camera corresponding to the area 301A. Herein, a manner in which the electronic device 100 updates the cropping area in the image a in response to the two-finger zoom gesture is the same as a manner in which the electronic device updates the cropping area in the image a in response to the two-finger zoom gesture shown in FIG. 7A to FIG. 7C. Refer to related descriptions.

Figure 8A:
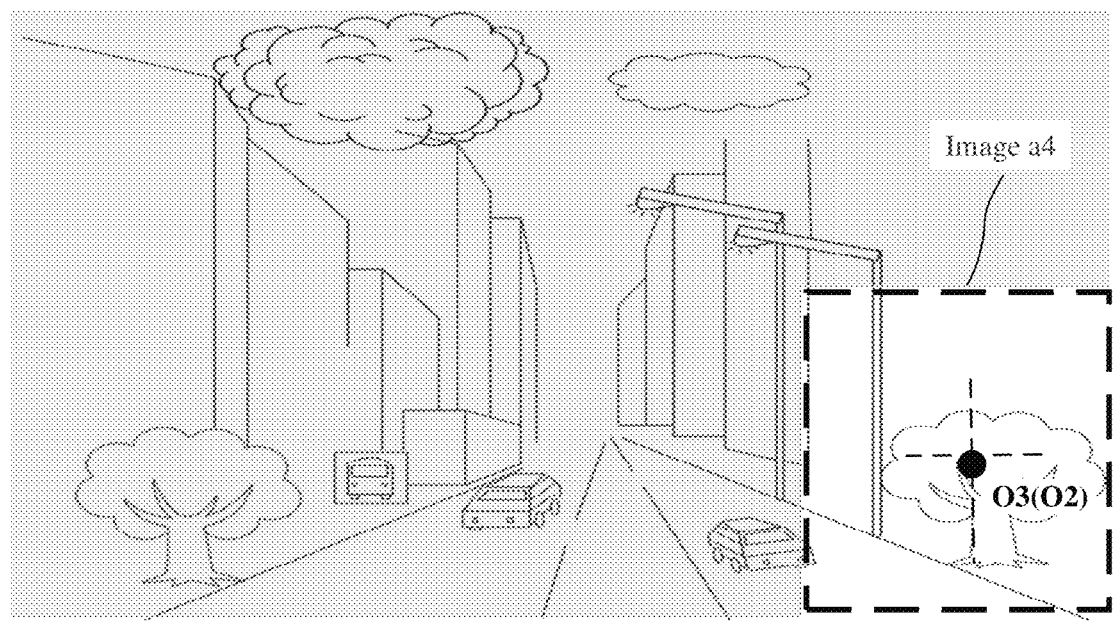
FIG. 8A and FIG. 8B are schematic diagrams of cropping an image when a preview image displayed in each area is adjusted in a multi-channel video recording preview process according to another embodiment.

For example, refer to FIG. 8A. FIG. 8A shows a possible updated cropping area in an image a. As shown in FIG. 8A, a preview image displayed in a refreshed area 301A is an image a4.

Figure 8B:
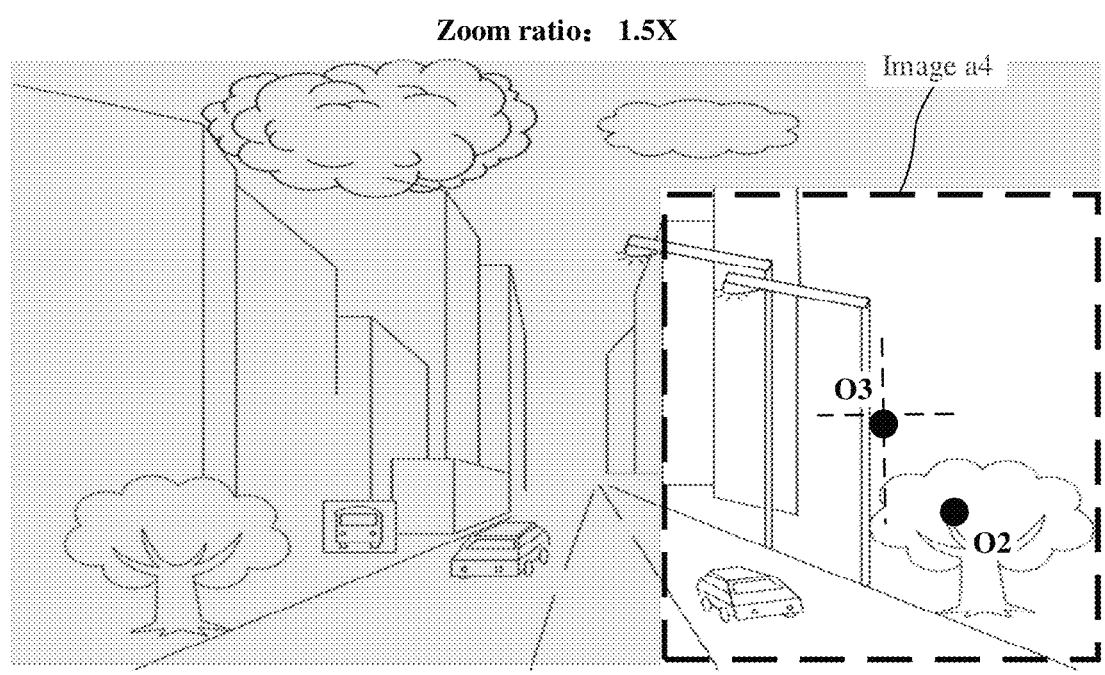

For example, refer to FIG. 8B. FIG. 8B shows another possible updated cropping area in an image a. As shown in FIG. 8B, a preview image displayed in a refreshed area 301A is an image a4.

It can be learned from the foregoing manner in which the electronic device 100 adjusts the framing of the working camera in the preview area in the zoom scenario shown in FIG. 7A to FIG. 7F that, before detecting a sliding operation (for example, the sliding operation in FIG. 7A to FIG. 7F), the electronic device may further detect an operation (for example, the two-finger zoom operation in FIG. 7A to FIG. 7F) used to change a zoom ratio of a camera corresponding to a first area. Then, in response to the operation, the electronic device may zoom in a preview image displayed in the first area before the operation is received, and display the zoomed-in preview image in the first area. It should be noted that, after the zoom ratio of the camera corresponding to the first area is changed, the first area displays a zoomed-in partial image. For details, refer to related descriptions in FIG. 7A to FIG. 7F.

In some embodiments, after entering the "multi-channel video mode", the electronic device 100 may track a target object, and autonomously adjust the framing of the working camera in the preview area based on a location of the target object. In this way, user operations can be reduced, and convenience can be improved.

FIG. 9A to FIG. 9E show an example of a manner in which an electronic device tracks a target object and autonomously adjusts framing of a working camera in a preview area.

Figure 9A:
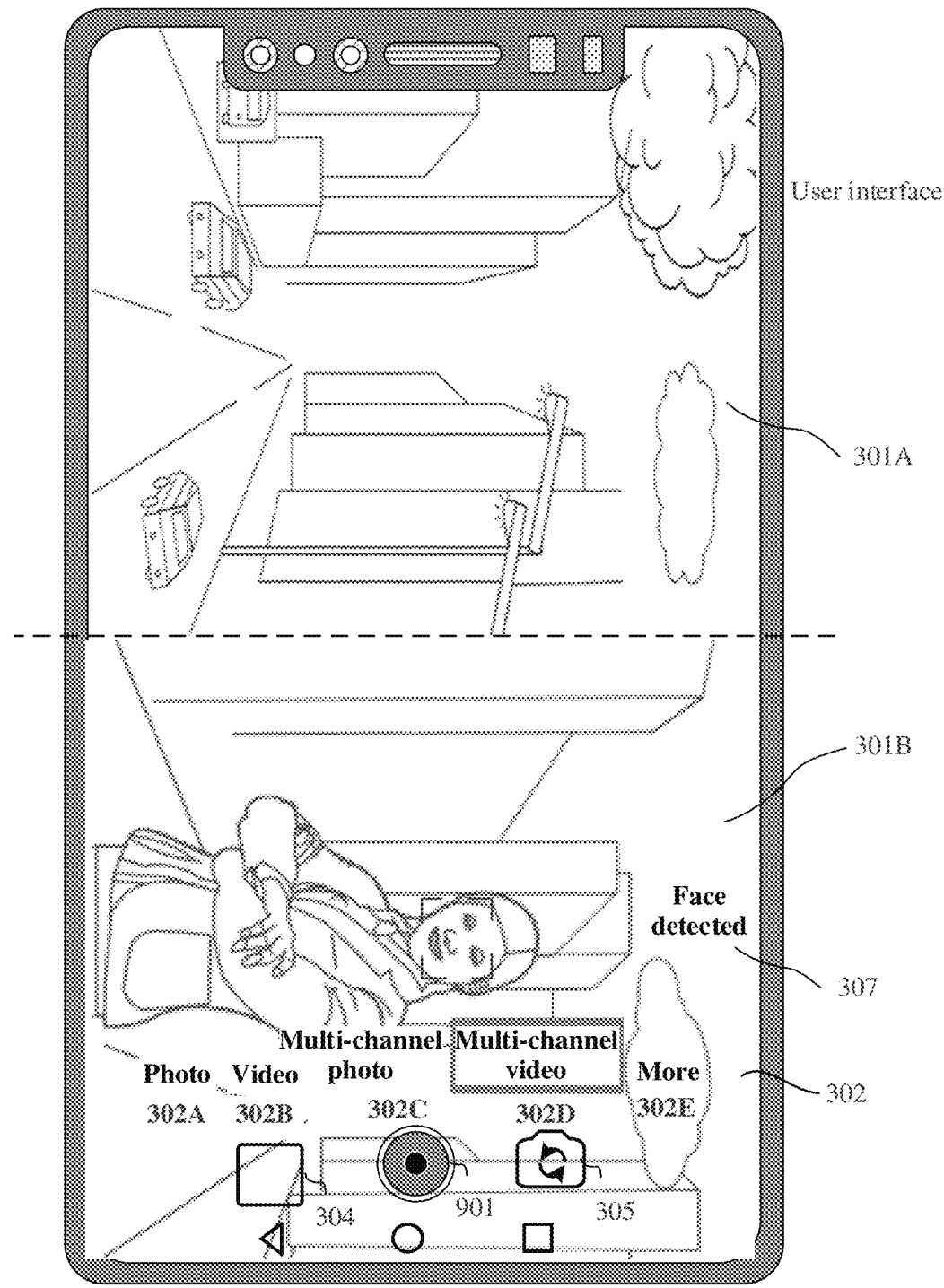
FIG. 9A to FIG. 9C are schematic diagrams of UIs in which a preview image displayed in each area is adjusted in a multi-channel video recording preview process according to another embodiment.

Refer to FIG. 9A. A user interface 71 shown in FIG. 9A is a preview interface displayed after the electronic device 100 enters the "multi-channel video mode". The user interface 71 includes a preview frame 301, an image shooting mode list 302, a control 901, a control 304, and a control 305. The preview frame 301 includes an area 301A and an area 301B. For a function of each control and a preview image displayed in each area on the user interface 71, refer to related descriptions of the user interface 41 shown in FIG. 6A. Details are not described herein again.

In some embodiments, after entering the "multi-channel video mode", the electronic device 100 may automatically identify an object in the preview image displayed in each area in the preview frame 301, and prompt a user when detecting an object of a preset type. The object of the preset type may include a face, an animal, a human body, the sun, the moon, and the like. The object of the preset type may be set by the electronic device 100 by default, or may be autonomously selected by the user.

In some other embodiments, after entering the "multi-channel video mode", the electronic device 100 may start to identify, in response to a received user operation, the object in the preview image displayed in each area in the preview frame 301, and prompt the user when detecting the object of the preset type. The user operation may be a touch-and-hold operation or a double-tap operation in an area, an input voice instruction, or the like. This is not limited in this embodiment of this application.

For example, as shown in FIG. 9A, the electronic device 100 may detect that a face is displayed in the area 301B, and display prompt information 307 in the area 301B. The prompt information 307 is used to prompt the user that a face is detected, and the prompt information 307 may be a text "face detected".

Figure 9B:
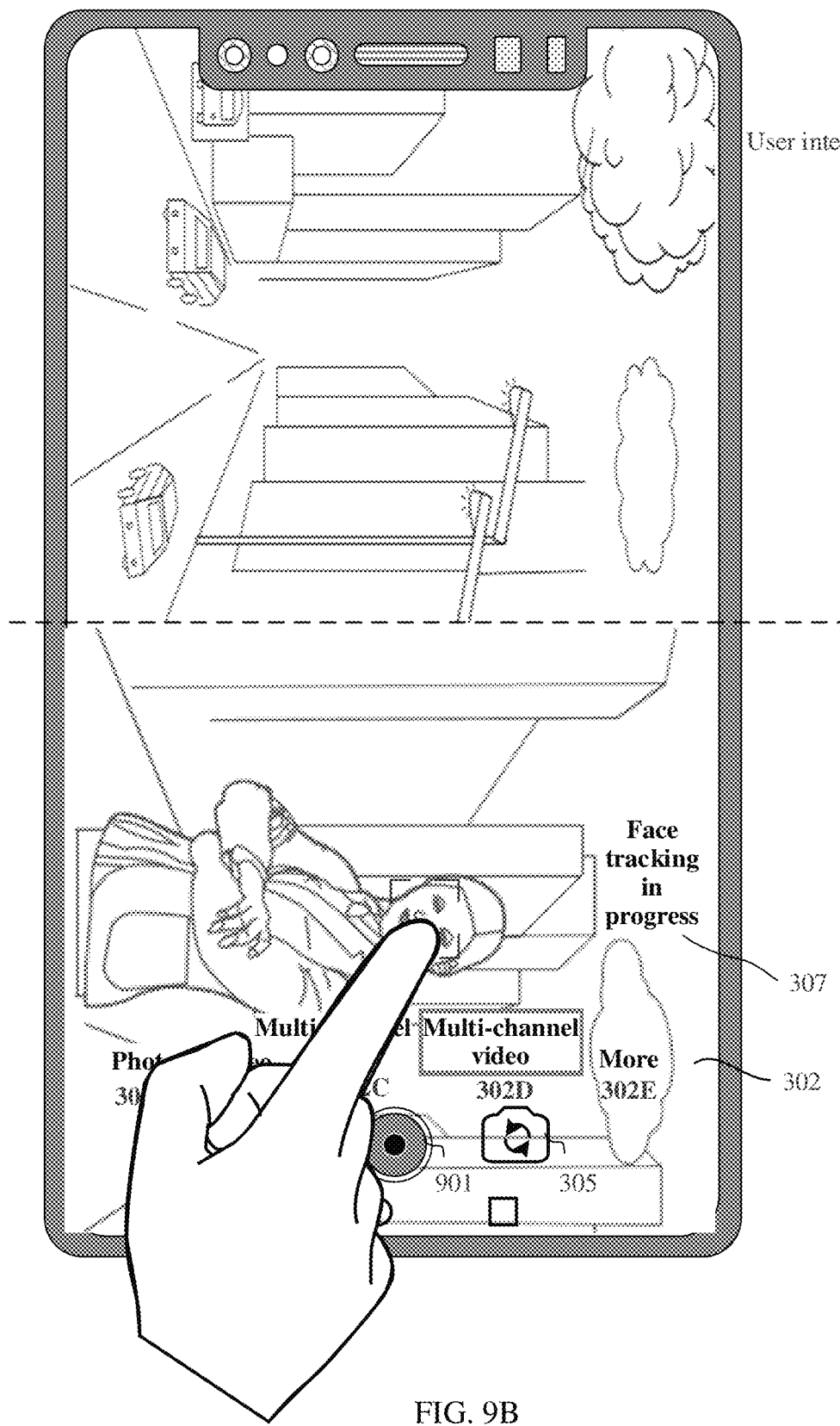

Refer to FIG. 9B. In some embodiments, the electronic device 100 may detect a touch operation (for example, a tap operation) performed on an object (for example, a face in FIG. 9B) in the area 301B, and select an object on which the touch operation is performed as a to-be-tracked target object. In some embodiments, after selecting the to-be-tracked target object, the electronic device 100 may display prompt information in an area for displaying the target object in the area 301B, for example, a dashed box shown in FIG. 9B, to prompt the user that the object has been currently selected as the to-be-tracked target object.

In some other embodiments, after detecting an object of a preset type, the electronic device 100 may further directly select the object as the to-be-tracked target object without a user operation.

After selecting the to-be-tracked target object, the electronic device 100 updates a cropping area in an image b by using the target object as a center, to refresh a preview image displayed in the area 301B. The image b is an image captured by a camera corresponding to the area 301B.

After the electronic device 100 selects the to-be-tracked target object, the prompt information 307 in the area 301B may be used to prompt the user that the target object is currently being tracked. For example, refer to FIG. 9B and FIG. 9C. The prompt information 307 may be changed to a text "Face tracking in progress".

Figure 9C:
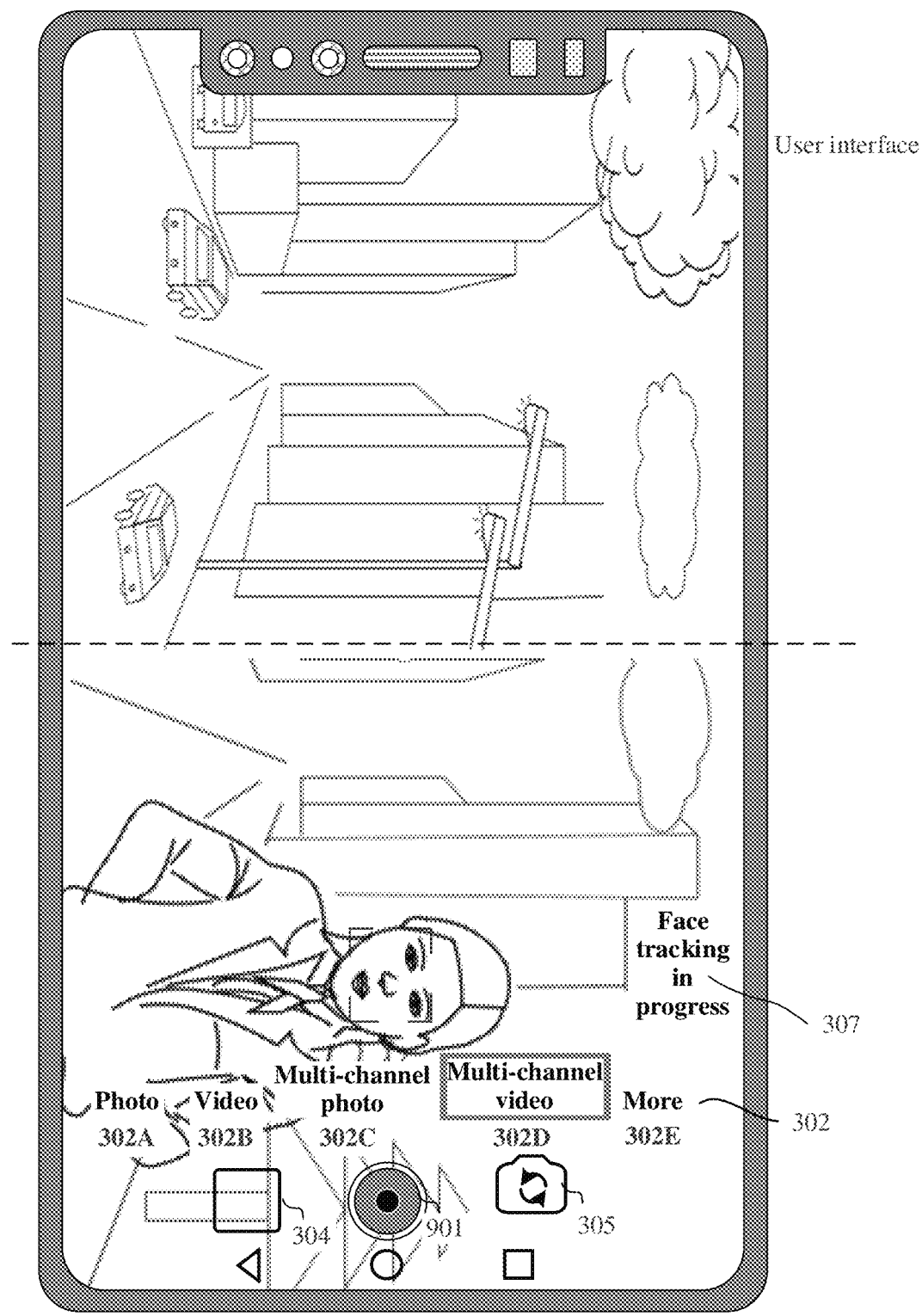
Figure 9D:
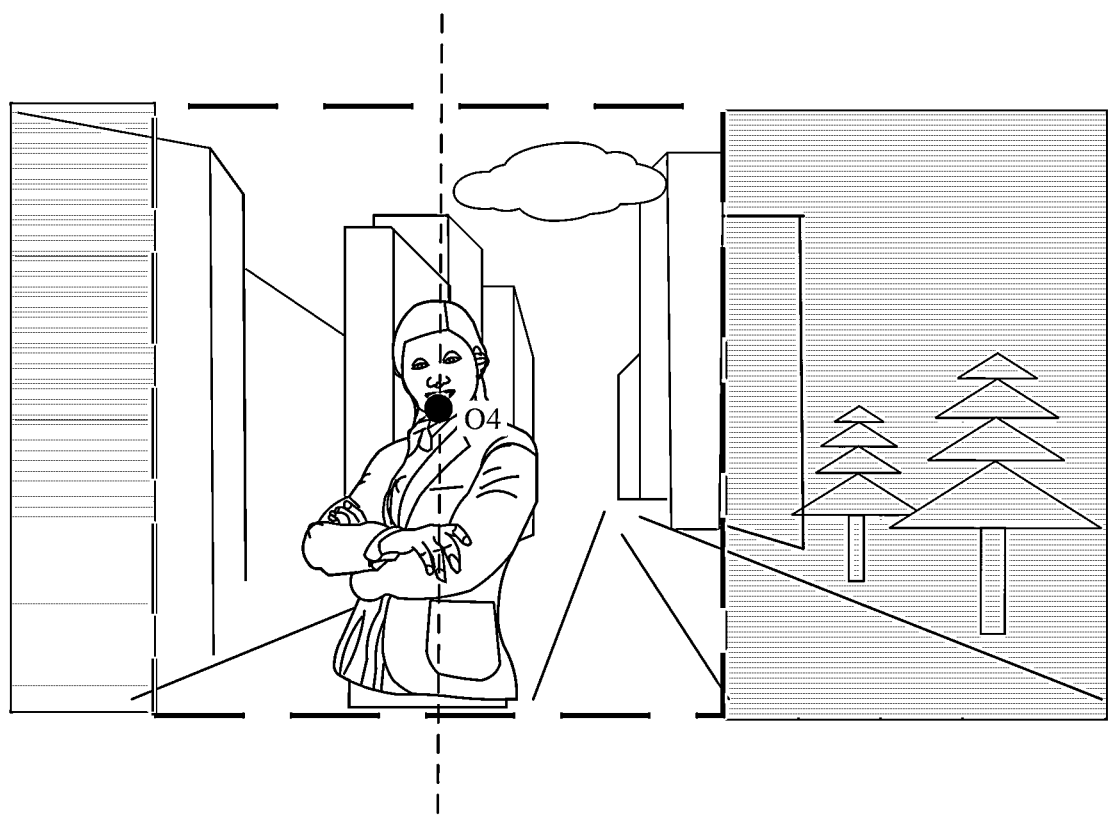
FIG. 9D and FIG. 9E are schematic diagrams of cropping an image when a preview image displayed in each area is adjusted in a multi-channel video recording preview process according to another embodiment.
Figure 9E:
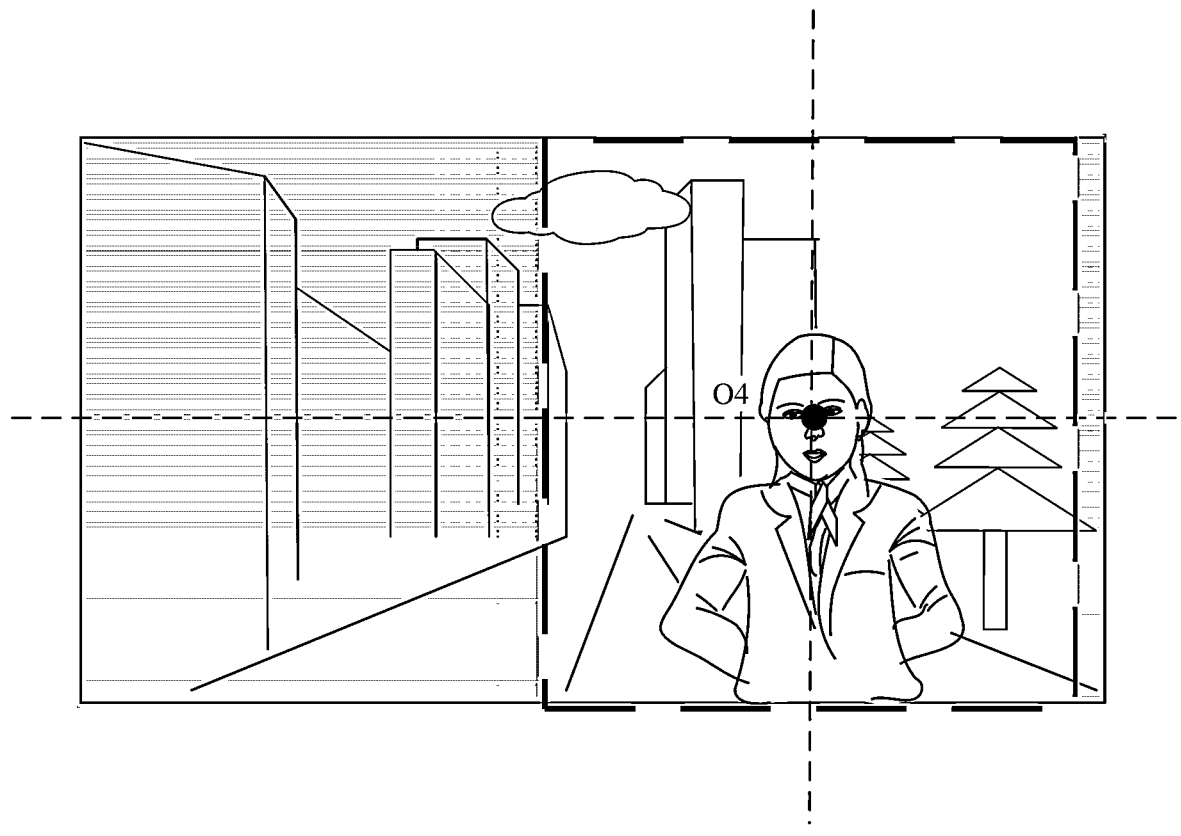

Refer to FIG. 9C and FIG. 9E. If the image b captured by the front-facing camera 193-1 corresponding to the area 301B still includes the target object, a center of the updated cropping area in the image b is O4 in the image b, and a size of the cropping area is a fourth size. O4 a center of the cropping area in the image b before the update, and the fourth size is a size of the cropping area in the image b before the update.

If an area that uses O4' as a center and that is of the fourth size does not exceed an edge of the image b, O4 is located at O4'. If the area that uses O4' as a center and that is of the fourth size exceeds the edge of the image b, O4 is located at a center of an area that coincides with the edge of the image b and that is of the fourth size. O4' is a center of the image b where the target object is located.

FIG. 9D and FIG. 9E show an example of an updated cropping area of the electronic device 100. The updated cropping area is an area in which a dashed box is located. A preview image displayed in the refreshed area 301B is an image in the dashed box.

As shown in FIG. 9D and FIG. 9E, a location of a target face in an image captured by the front-facing camera 193-1 changes, but the electronic device 100 still displays the target face at a central location of the area 301B.

After a period of time, if the image captured by the front-facing camera 193-1 corresponding to the area 301B does not include the target object, the electronic device 100 may stop tracking the target person. In some embodiments, the electronic device 100 may prompt the user that tracking the target person is currently stopped. A prompt manner may include but is not limited to: displaying a text, displaying an icon, playing a voice, or the like.

According to embodiments shown in FIG. 9A to FIG. 9E, the electronic device 100 may track the target object in a multi-channel video recording process, to meet a user requirement and improve user experience.

According to embodiments shown in FIG. 9A to FIG. 9E, after detecting that an entire image captured by a first camera includes an image of a first face (for example, the face image in FIG. 9A to FIG. 9E), the electronic device may display a preview image in a first area (for example, the area 302B in FIG. 9A to FIG. 9C). Then, if the electronic device detects that a location of the image of the first face in the entire image captured by the first camera changes, the electronic device refreshes the preview image in the first area. A preview image displayed in the first area before the refreshing is obtained by cropping the entire image captured by the first camera, and includes the image of the first face. A preview image displayed in the first area after the refreshing is obtained by cropping the entire image captured by the first camera, and includes the image of the first face.

For example, for the preview image displayed in the first area before the refreshing, refer to the preview image displayed in the area 301B in FIG. 9A or FIG. 9B, and for the preview image displayed in the first area after the refreshing, refer to the preview image displayed in the area 301B in FIG. 9C.

In some embodiments, a manner in which the electronic device performs cropping to obtain the preview image displayed in the refreshed first area may be: ensuring that a location of the image of the first face in the refreshed first area is the same as a location of the image of the first face in the first area before the refreshing. In this way, it can be ensured that a location of the face in the first area is fixed.

In some embodiments, the electronic device performs cropping, by using a location of the image of the first face in the entire image captured by the first camera as a center, to obtain the preview image displayed in the refreshed first area, as shown in FIG. 9A. This can keep the face being displayed in the center of the first area during face tracking.

In some other embodiments of this application, when detecting that the entire image captured by the first camera includes the image of the first face, the electronic device may start a second camera. A framing range of the second camera is greater than a framing range of the first camera, and the first face is within the framing range of the second camera. Then, the electronic device may refresh the preview image displayed in the first area. A preview image displayed in the first area after the refreshing is obtained by cropping an entire image captured by the second camera, and includes the image of the first face. In this way, it can be ensured that when an object is tracked, the camera is switched to expand a traceable range.

In some embodiments, the first camera is a front-facing camera or a rear-facing camera. In this way, both the front-facing camera and the rear-facing camera can be used to implement object tracking.

In this embodiment of this application, after the electronic device 100 enters the "multi-channel video mode", when adjusting the framing range of the working camera in the preview area, the electronic device 100 may further prompt, in a picture-in-picture manner, the user of a location of the preview image displayed by the working camera in the preview area in the captured entire image. In this way, the user can learn of the entire picture.

FIG. 10A-1 to FIG. 10B-2 show an example of a scenario in which the electronic device 100 prompts, in a picture-in-picture manner, a user of a location of a preview image displayed by a working camera in a preview area in a captured entire image.

Refer to FIG. 10A-1 to FIG. 10B-2. User interfaces 81 shown in FIG. 10A-1 to FIG. 10B-2 are preview interfaces displayed after the electronic device 100 enters the "multi-channel video mode". For each control in the preview interface, refer to related descriptions of the user interface 41 shown in FIG. 6A. Details are not described herein again.

As shown in FIG. 10A-1 to FIG. 10B-2, a window 308 may be displayed on the user interface 81. The window 308 may be displayed in a floating manner on an image displayed in an area 301A. The window 308 may be used to prompt the user of a location of a preview image displayed in the current area 301A in an entire image captured by the corresponding rear-facing wide-angle camera 193-3.

As shown in FIG. 10A-1 to FIG. 10B-2, an image captured by the rear-facing wide-angle camera 193-3 corresponding to the area 301A may be displayed in the window 308, and a dashed box is used to identify a location of the preview image displayed in the area 301A in an entire image captured by a camera. In the window 308, different display forms may be used for parts inside and outside the dashed box. For example, shadows may be added to parts outside the dashed box, to further distinguish a part that is cropped in an image a captured by the rear-facing wide-angle camera 193-3 and that is displayed in the area 301A.

Figures 1, 10A:
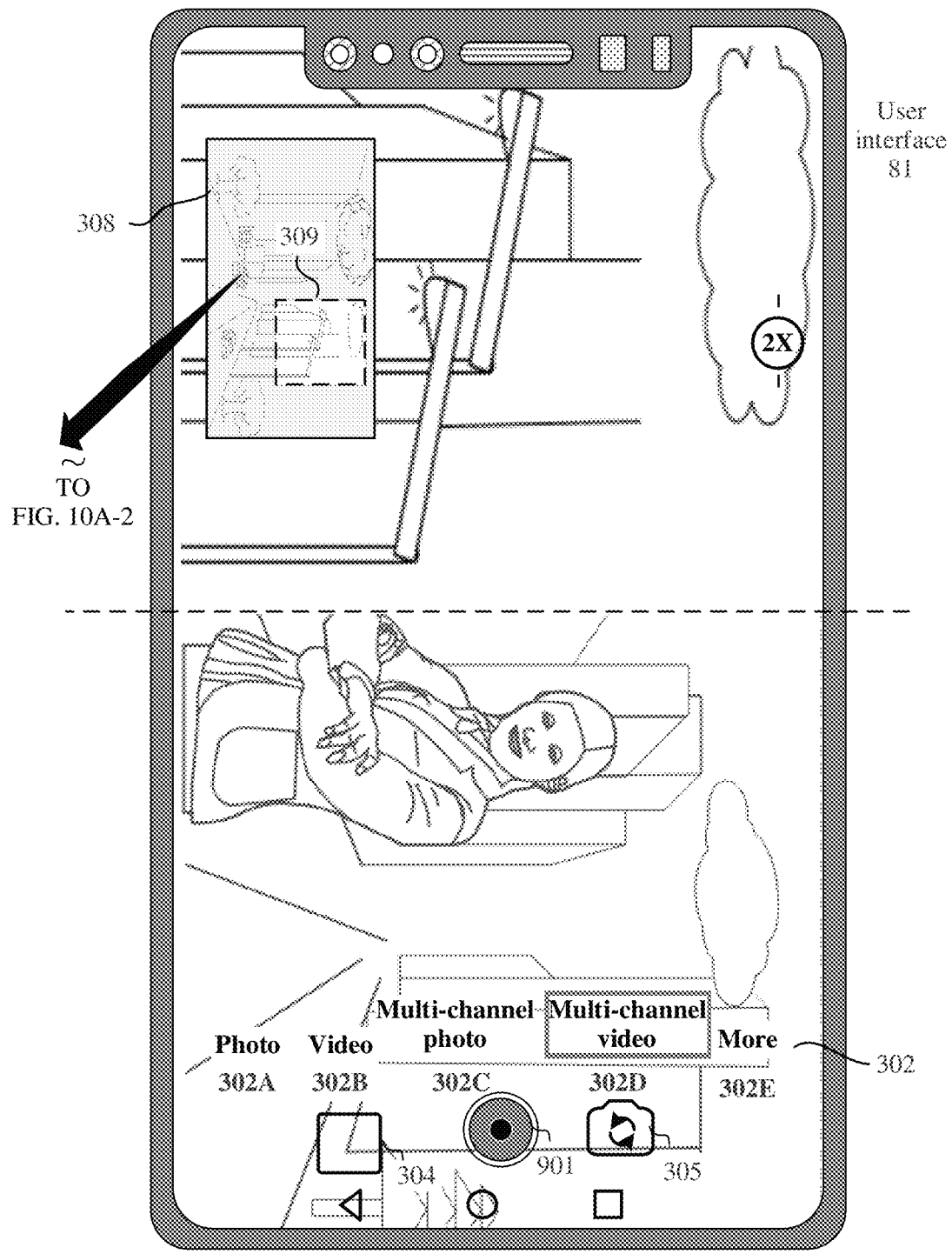
Figures 2, 10A:
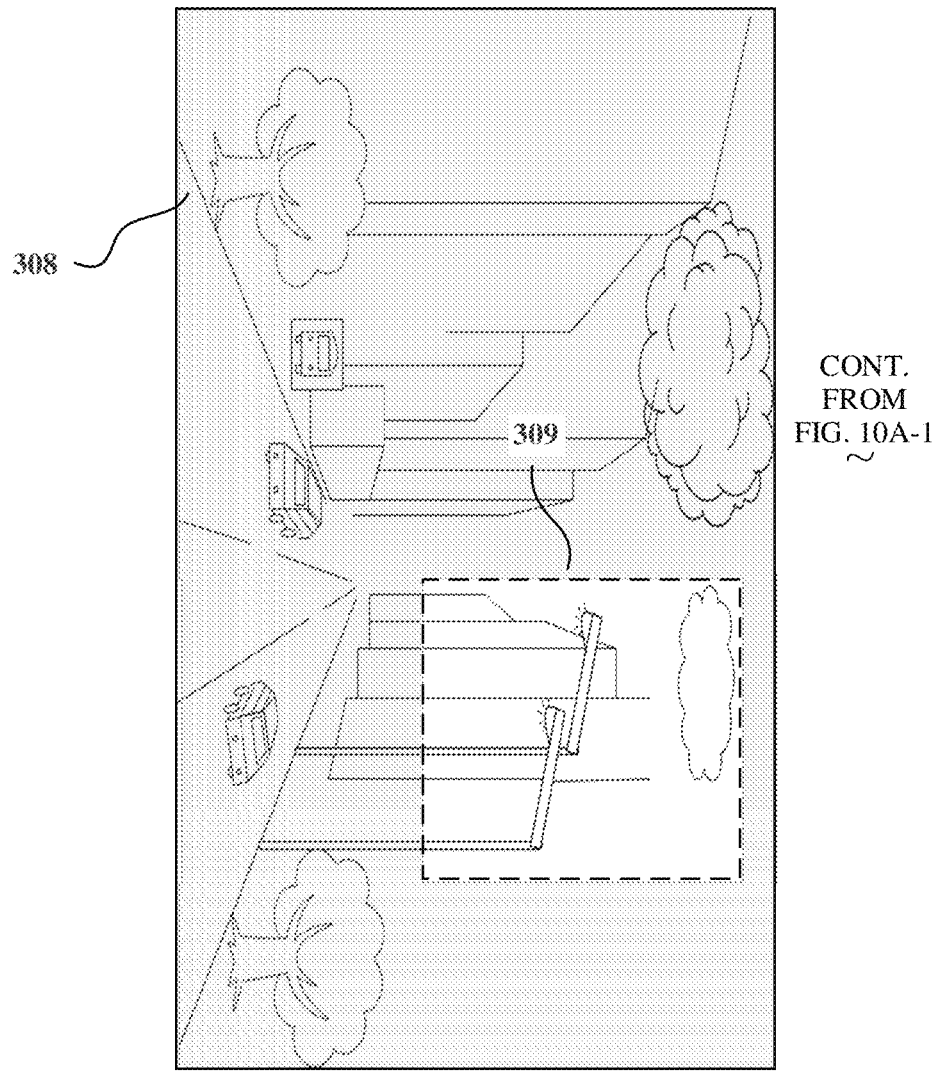
Figures 1, 10B:
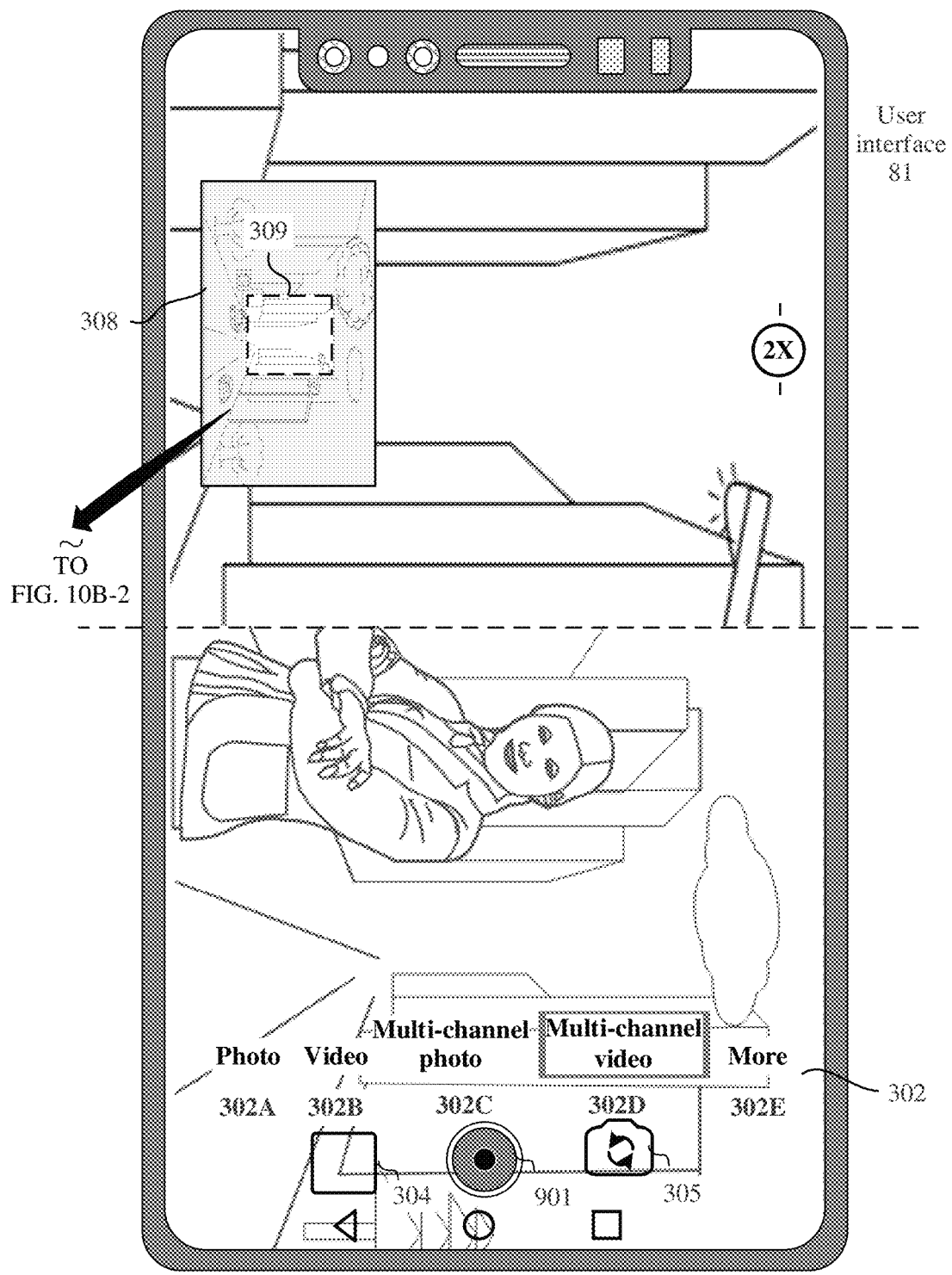
Figures 2, 10B:
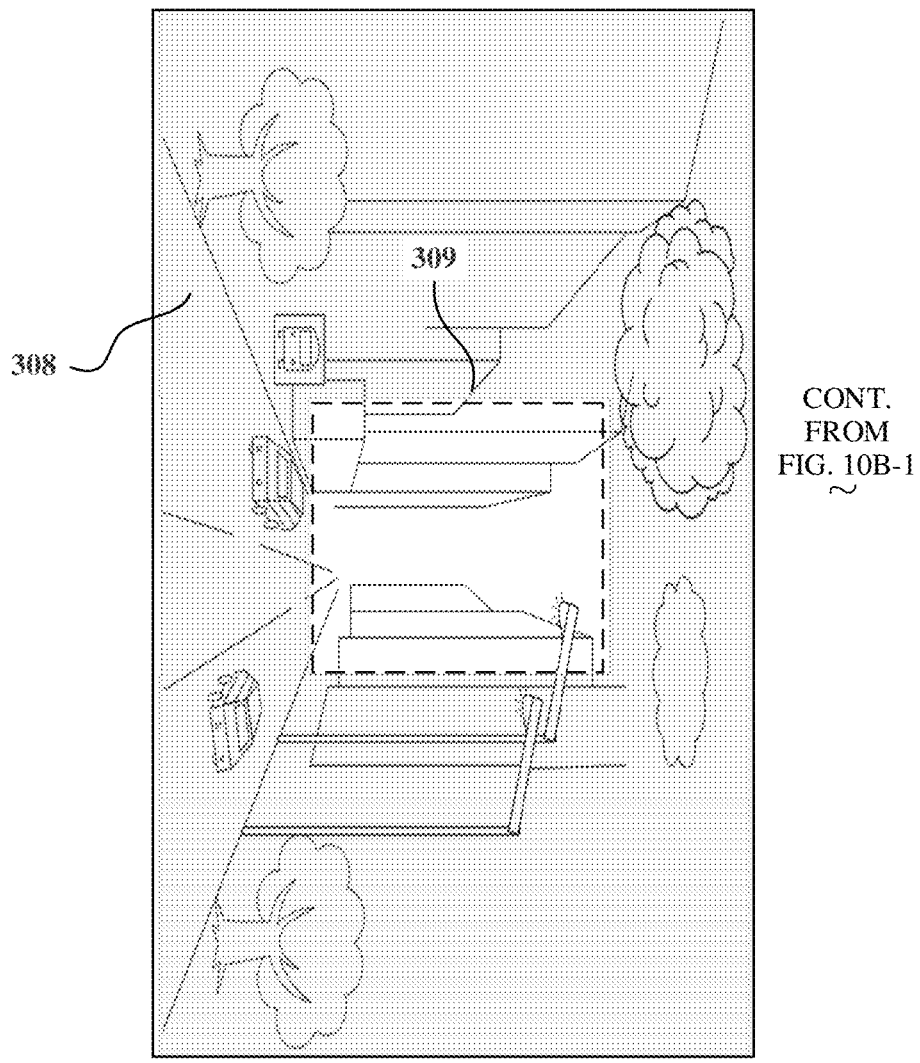

As shown in FIG. 10B-1 and FIG. 10B-2, when a location at which the preview image displayed in the area 301A is located in the image a captured by the rear-facing wide-angle camera 193-3 changes, a location in the dashed box in the window 308 also correspondingly changes.

According to embodiments shown in FIG. 10A-1 to FIG. 10B-2, a user can learn, by using a window displayed in each area, a framing range of each camera in a corresponding area and a location of a preview image currently displayed in each area in the entire picture. In this way, the user can more conveniently adjust the preview image displayed in each area.

It may be understood that the picture-in-picture prompt manner shown in FIG. 10A-1 to FIG. 10B-2 is applicable to any scenario in which the electronic device 100 adjusts the preview image displayed in each area on the preview interface mentioned in the foregoing embodiments.

When adjusting the preview image displayed in each area on the preview interface in the non-zoom scenario shown in FIG. 6A to FIG. 6F, the electronic device 100 may prompt, in a picture-in-picture manner, the user of a location of the preview image displayed in the area 301A in the entire image captured by the camera. In this case, a location of the dashed box in the window 308 changes with a sliding operation input by the user. A moving direction of the dashed box is opposite to a track direction of the sliding operation.

When adjusting the preview image displayed in each area on the preview interface in the zoom scenario shown in FIG. 7A to FIG. 7F, the electronic device 100 may prompt, in a picture-in-picture manner, the user of a location of the preview image displayed in the area 301A in the entire image captured by the camera. In this case, a size of the dashed box is inversely proportional to a zoom ratio. A larger zoom ratio indicates a smaller dashed box. A moving direction of the dashed box is opposite to a track direction of the sliding operation input by the user.

When autonomously adjusting the preview image in each area on the preview interface based on a location of a target object shown in FIG. 9A to FIG. 9E, the electronic device may prompt, in a picture-in-picture manner, the user of a location of the preview image displayed in the area 301A in the entire image captured by the camera. In this case, the location of the dashed box changes with the location of the target object in the image captured by the camera.

According to embodiments shown in FIG. 6A to FIG. 6F, FIG. 7A to FIG. 7F, FIG. 8A and FIG. 8B, and FIG. 9A to FIG. 9E, the user may adjust framing of each working camera by performing a user operation without moving the electronic device 100, that is, when a posture of the electronic device 100 does not change, and adjustment of framing of a single working camera does not affect framing of another working camera.

In some embodiments, if the electronic device 100 detects an operation of adjusting a preview image displayed in each area on the preview interface (for example, the sliding operation, the two-finger zoom operation, or the operation of selecting the target object mentioned in the foregoing embodiments), if the posture of the electronic device changes, the electronic device may not change, in response to the user operation, a manner of cropping the entire image captured by the camera corresponding to each area. That is, if the posture of the electronic device changes, the electronic device does not respond to the user operation used to adjust the framing of each camera in the preview area.

In some embodiments, if the posture of the electronic device greatly changes, that is, the user greatly moves or rotates the mobile phone, the electronic device may obtain, in a center cropping manner, the preview image displayed in each area on the preview interface.

The following describes a UI embodiment in which a preview image displayed in each area on an image shooting interface is adjusted in a video recording process of multi-channel video recording after the electronic device 100 enables the "multi-channel video mode".

FIG. 11A to FIG. 11F show examples of UI embodiments in which the electronic device 100 adjusts, in a multi-channel video recording process, a preview image displayed in each area on an image shooting interface.

Figure 11A:
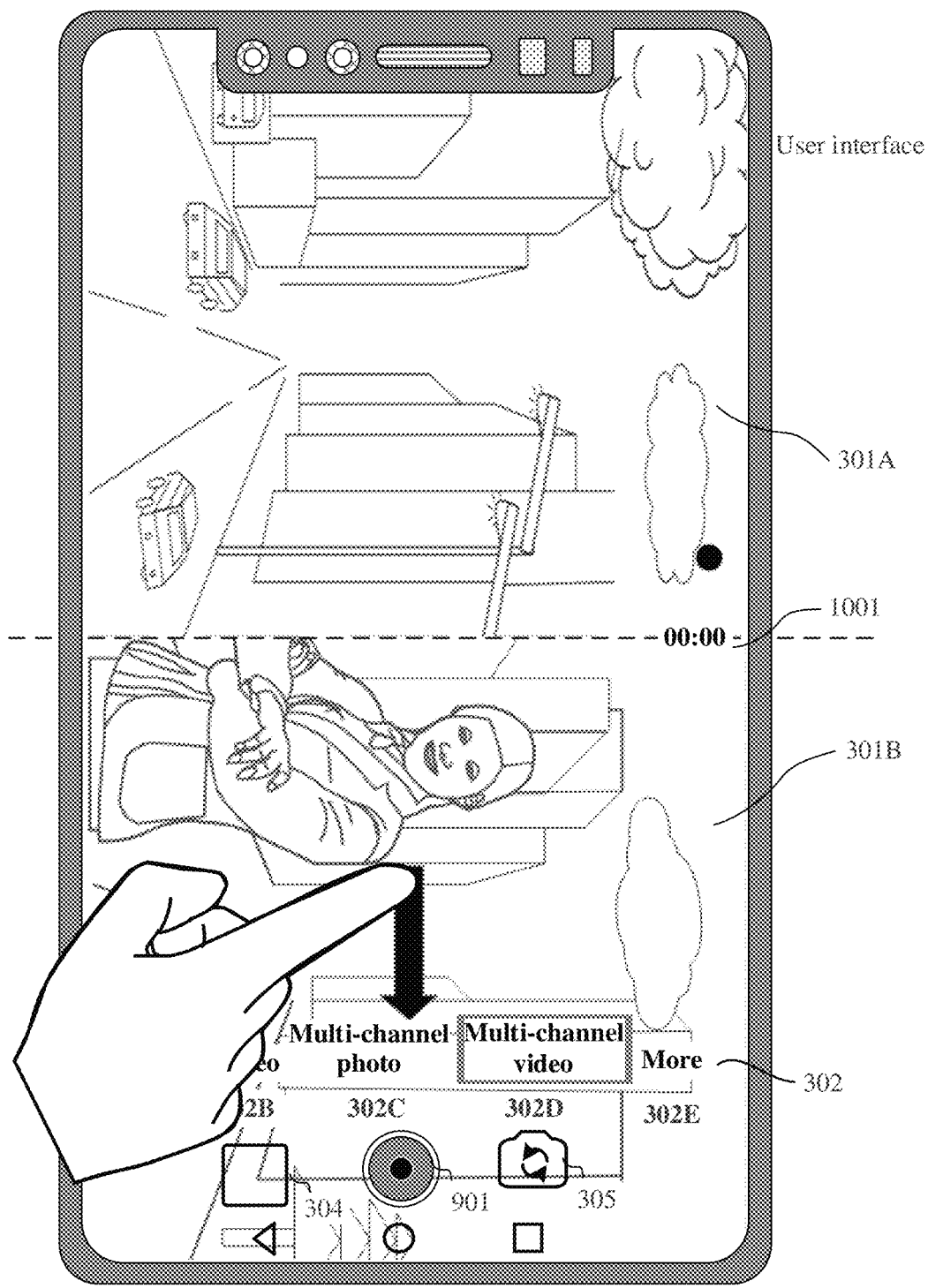
FIG. 11A to FIG. 11F are schematic diagrams of UIs in which a preview image displayed in each area is adjusted in a multi-channel video recording process according to an embodiment.
Figure 11B:
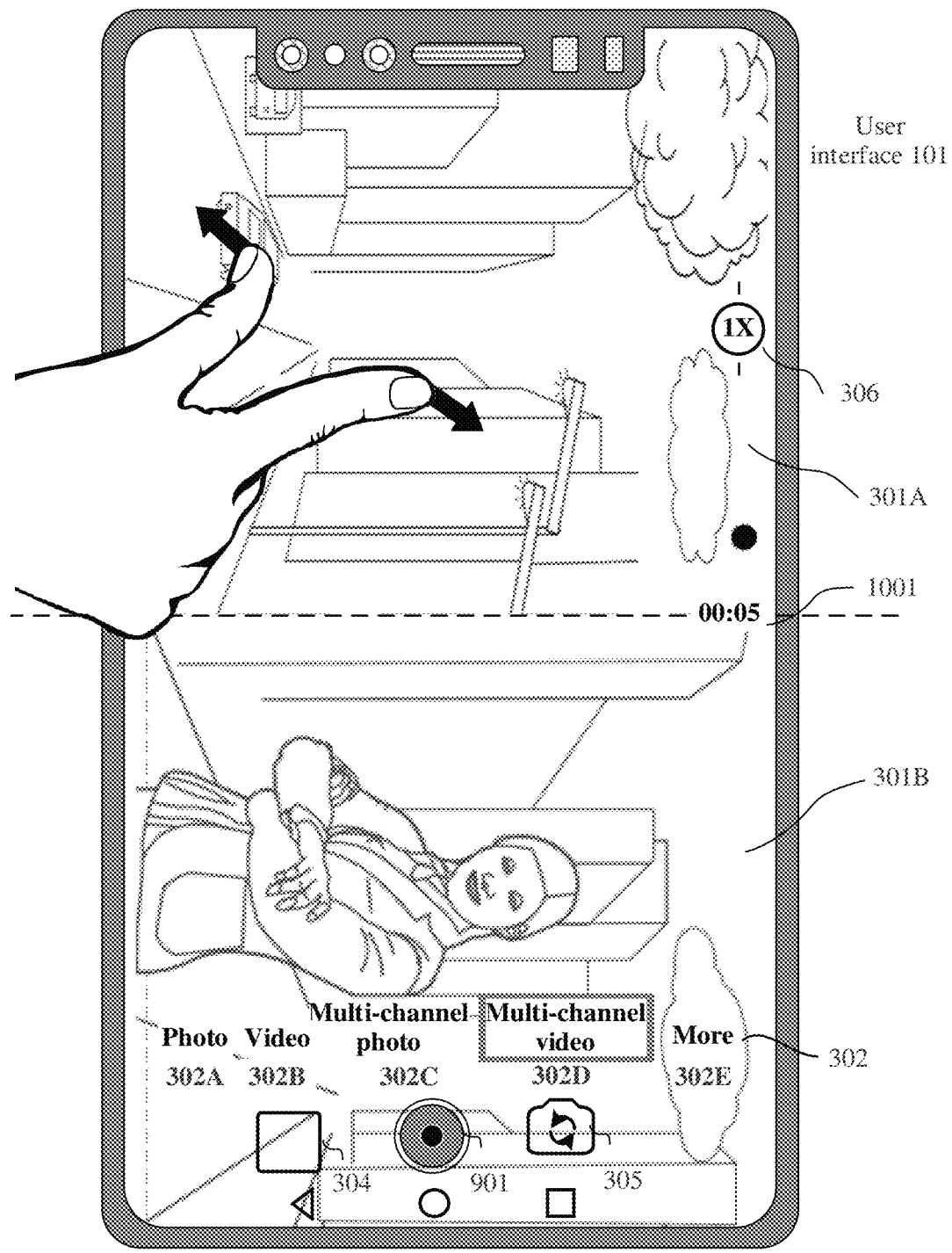
Figure 11C:
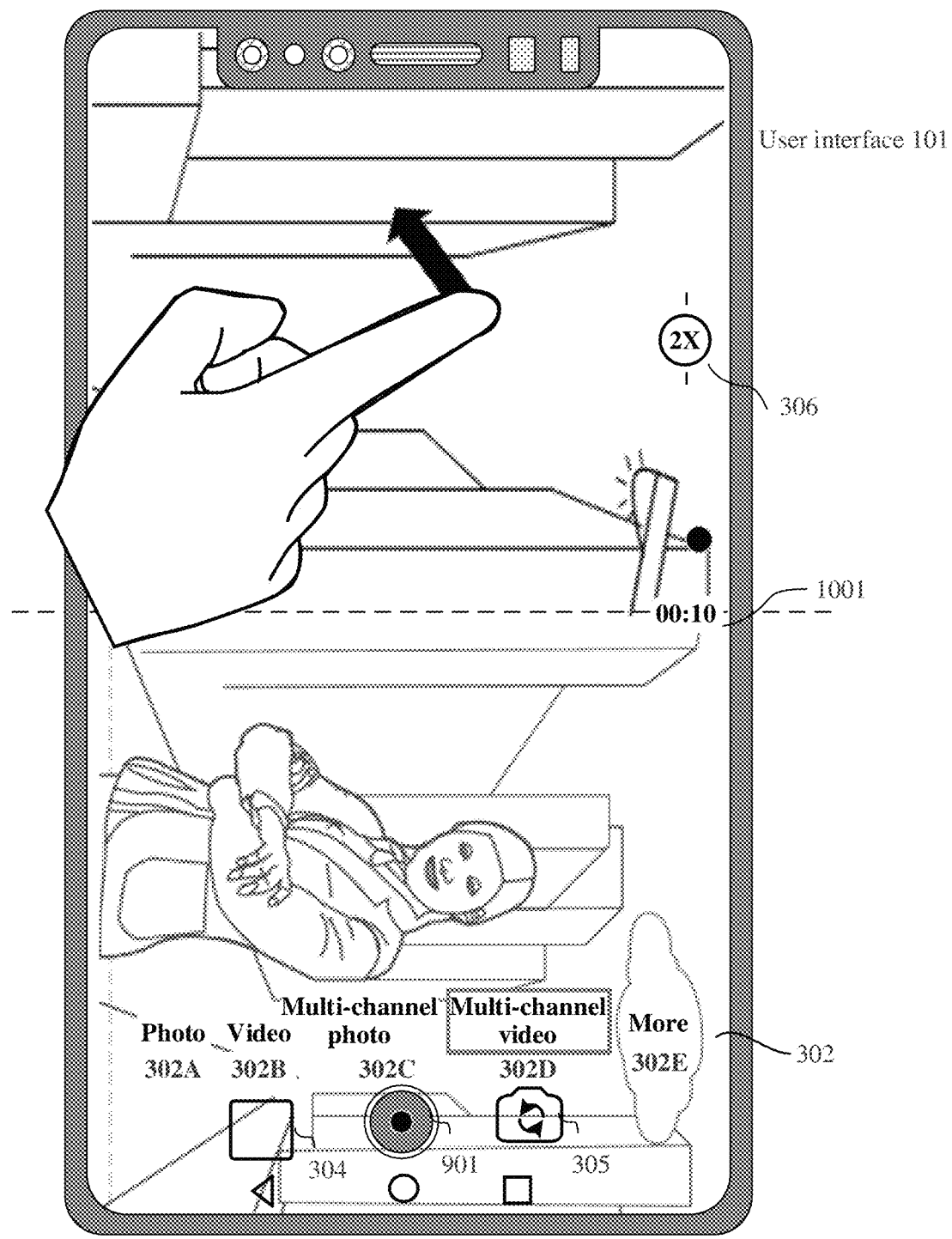
Figure 11D:
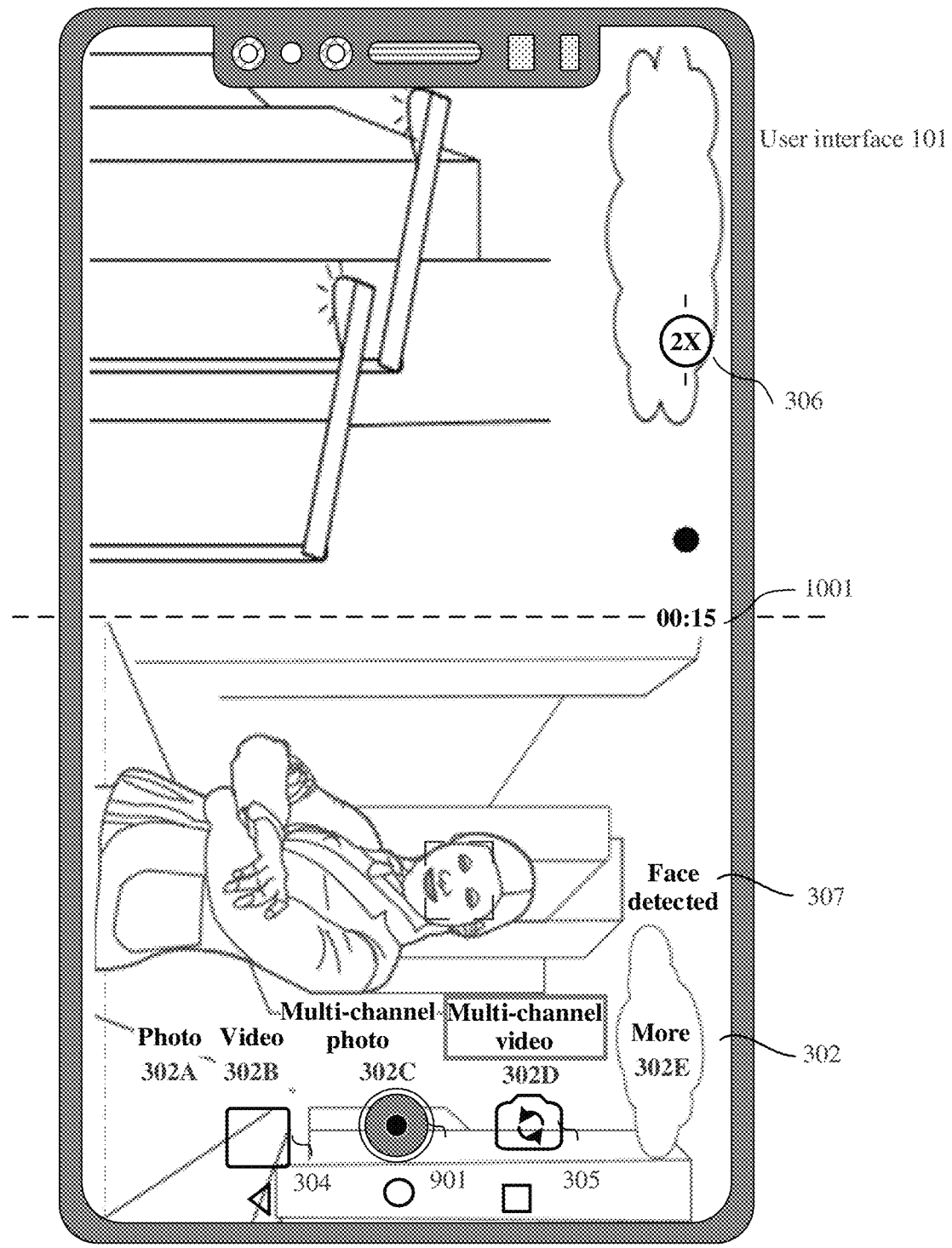
Figure 11E:
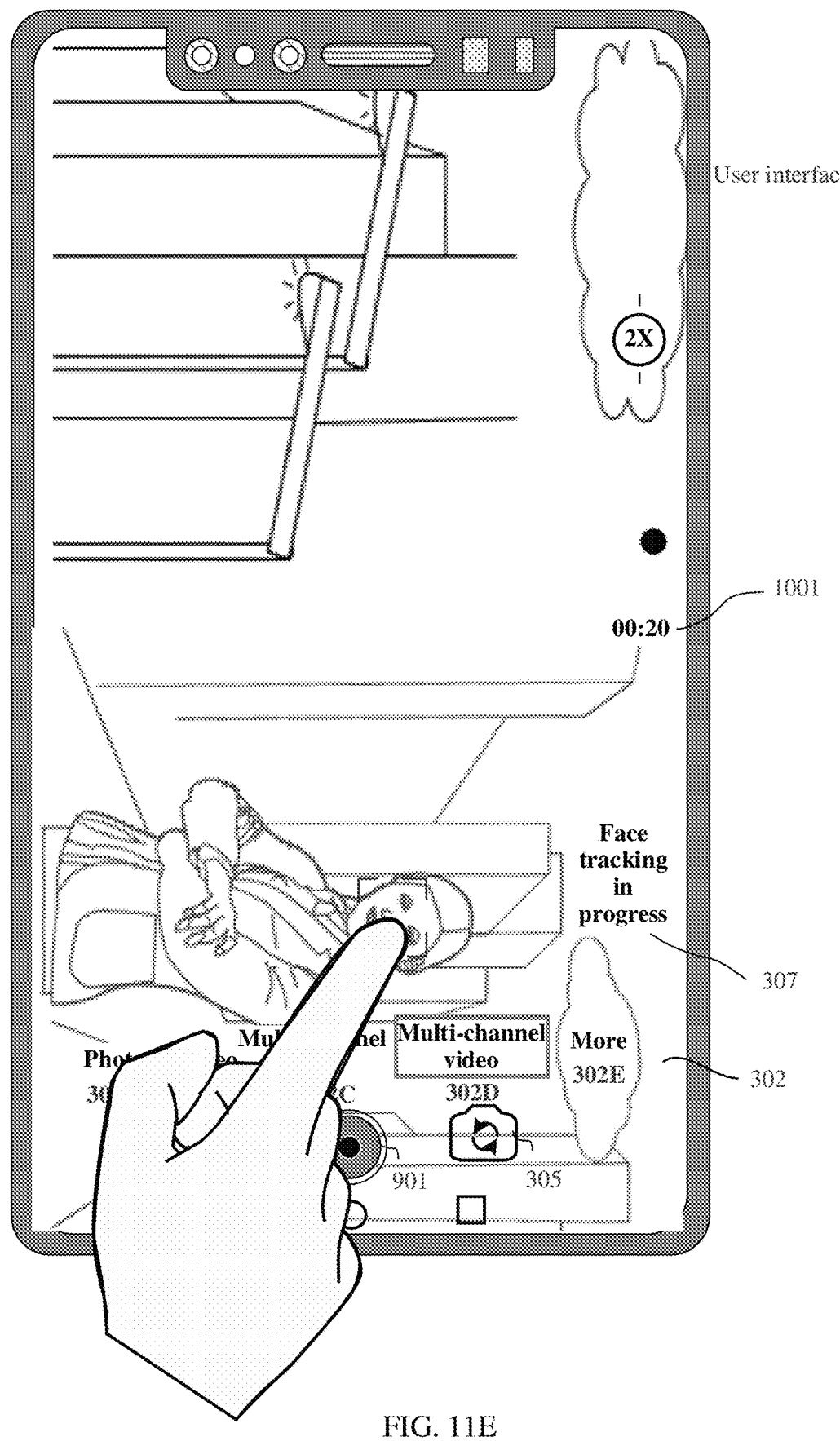
Figure 11F:
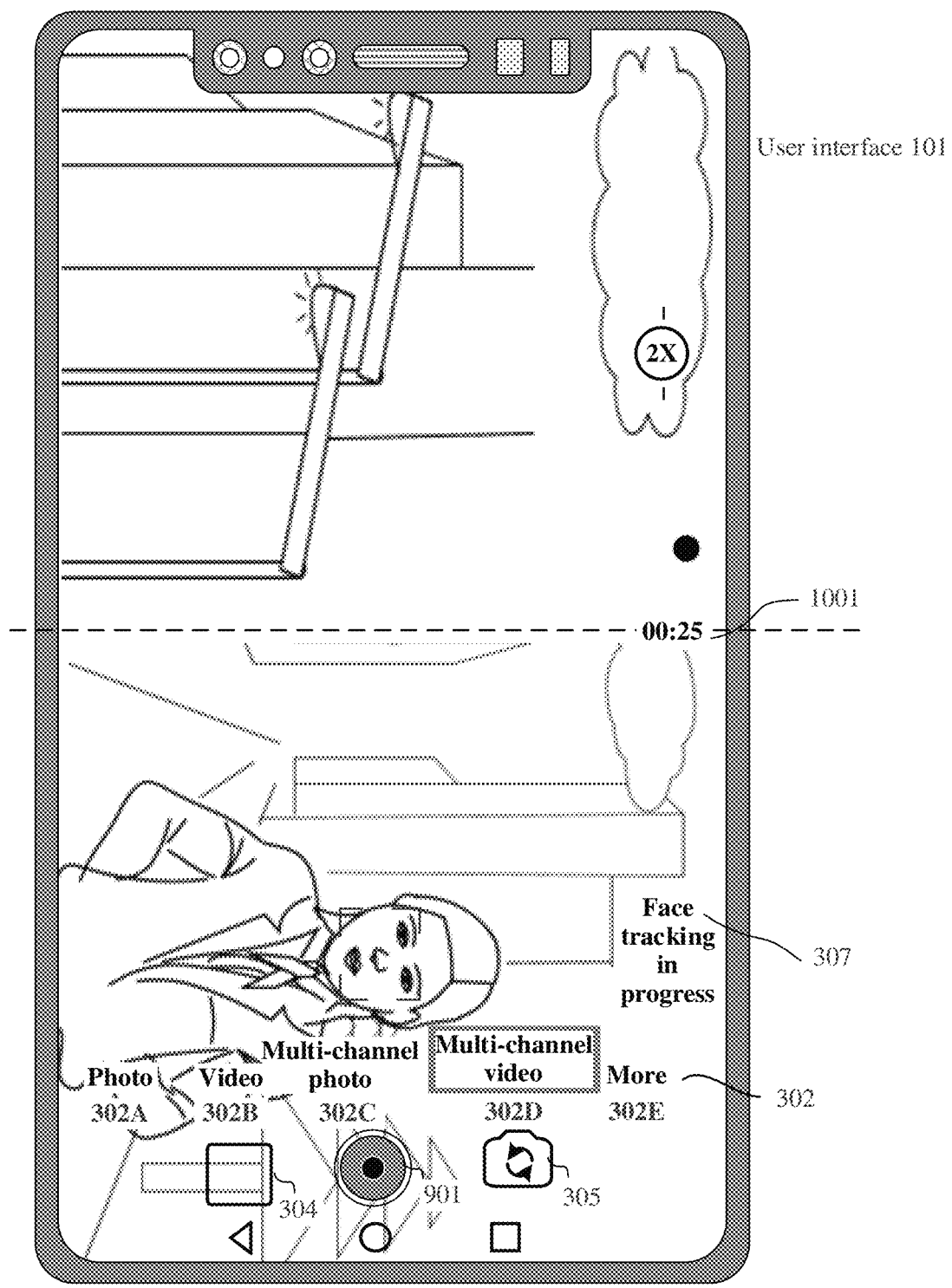

FIG. 11A shows an example of an image shooting interface 101 displayed when an electronic device enters a video recording process after enabling the "multi-channel video mode".

As shown in FIG. 11A, the image shooting interface 101 includes a preview frame 301, an image shooting mode list 302, a control 901, a control 304, and a control 305. For the image shooting mode list 302, the control 304, and the control 305, refer to related descriptions of the user interface 31. Details are not described herein again. As shown in FIG. 11A, a multi-channel video mode option 302D is selected.

The image shooting interface 101 may be displayed by the electronic device 100 in response to a touch operation (for example, a tap operation) received on a control used for video recording. The control used for video recording may be, for example, the control 901 displayed on any user interface in FIG. 11A to FIG. 11F. The control used for video recording may also be referred to as an image shooting control.

As shown in FIG. 11A, the image shooting interface 101 further includes a recording time indicator 1001. The recording time indicator 1001 is used to indicate duration for which a user displays the image shooting interface 101, that is, duration for which the electronic device 100 starts to record a video. The recording time indicator 1001 may be implemented as a text.

After the electronic device 100 enables the "multi-channel video mode", a preview frame 301 on an image shooting interface is the same as a preview frame 301 on a preview interface. For a layout manner of the preview frame 301, refer to related descriptions in the foregoing embodiment in FIG. 6A. Details are not described herein again.

In a video recording process after the electronic device 100 enables the "multi-channel video mode", a preview image displayed in each area on the image shooting interface may also be adjusted based on a user operation. A manner in which the electronic device 100 adjusts, in a video recording process, the preview image displayed in each area on the image shooting interface is the same as a manner in which the electronic device 100 adjusts, in a preview process, the preview image displayed in each area on the preview interface. Refer to the foregoing embodiments shown in FIG. 6A to FIG. 6F, FIG. 7A to FIG. 7F, FIG. 8A and FIG. 8B, and FIG. 9A to FIG. 9E.

In this embodiment of this application, in a video recording process after the electronic device 100 enters the "multi-channel photo mode", an image displayed on the preview interface in the video recording process may be further saved.

Specifically, in the video recording process when the electronic device 100 is in the "multi-channel photo mode", after adjusting the preview image in each area in the preview frame, the user may select to save the preview image in the preview frame in the video recording process, that is, save the video. For a manner in which the user adjusts the preview image of each area in the preview frame, refer to related content described in the foregoing embodiments in FIG. 11A to FIG. 11F.

For example, in the video recording process, the electronic device 100 may record, in response to the touch operation (for example, the tap operation) detected on the control used for video recording, the preview image in the preview frame in the video recording process. The control used for video recording may be, for example, the control 901 displayed on any user interface in FIG. 11A to FIG. 11F. Start time and end time of the video recording process are respectively time points at which two adjacent touch operations on the control 901 are detected after the electronic device 100 enables the "multi-channel video mode".

In some embodiments, the electronic device 100 may synthesize images displayed in all areas in the preview frame in the video recording process into a video file, and store the video file. For example, the electronic device 100 may synthesize a layout manner corresponding to an image displayed in the area 301A and a layout manner corresponding to a preview image displayed in the area 302B in the video recording process into a video file, and store the video file. In this way, after adjusting a preview image of each area based on a requirement of the user, the user can save a desired preview image, so that the user can obtain more flexible and convenient video recording experience.

In some other embodiments, the electronic device 100 may also separately store images displayed in each area in the video recording process, and associate the stored multi-channel images.

It may be understood that the user may change a layout manner of the preview interface in the video recording process. If the electronic device 100 changes the layout manner of the preview interface in the video recording process, layout manners of video files stored in the electronic device 100 in different time periods may be different. This can provide more flexible recording experience for the user.

After the electronic device 100 stores the preview image displayed in the preview frame as a video file, the user may view, on a user interface provided by "Gallery", the video file stored in the electronic device 100.

An embodiment of this application further provides a solution in which an electronic device is supported not to change a framing range of a selected preview area when the electronic device is moved, that is, when a posture of the electronic device changes. In this way, even if the posture of the electronic device changes, the framing range of the selected preview area can be not affected.

After entering the "multi-channel video mode", the electronic device 100 may lock one or more areas in a preview frame in a preview process or a video recording process. Then, even if a physical location of the electronic device 100 changes, for example, the electronic device 100 is translated, a relative location of a static object in an image displayed in the locked area in the area remains unchanged. In this way, when a user moves the electronic device 100 to change an image displayed in another area, it can be ensured that the locked area always displays an image at a physical location in the real world, that is, a framing range of the locked area is not changed.

Figure 12A:
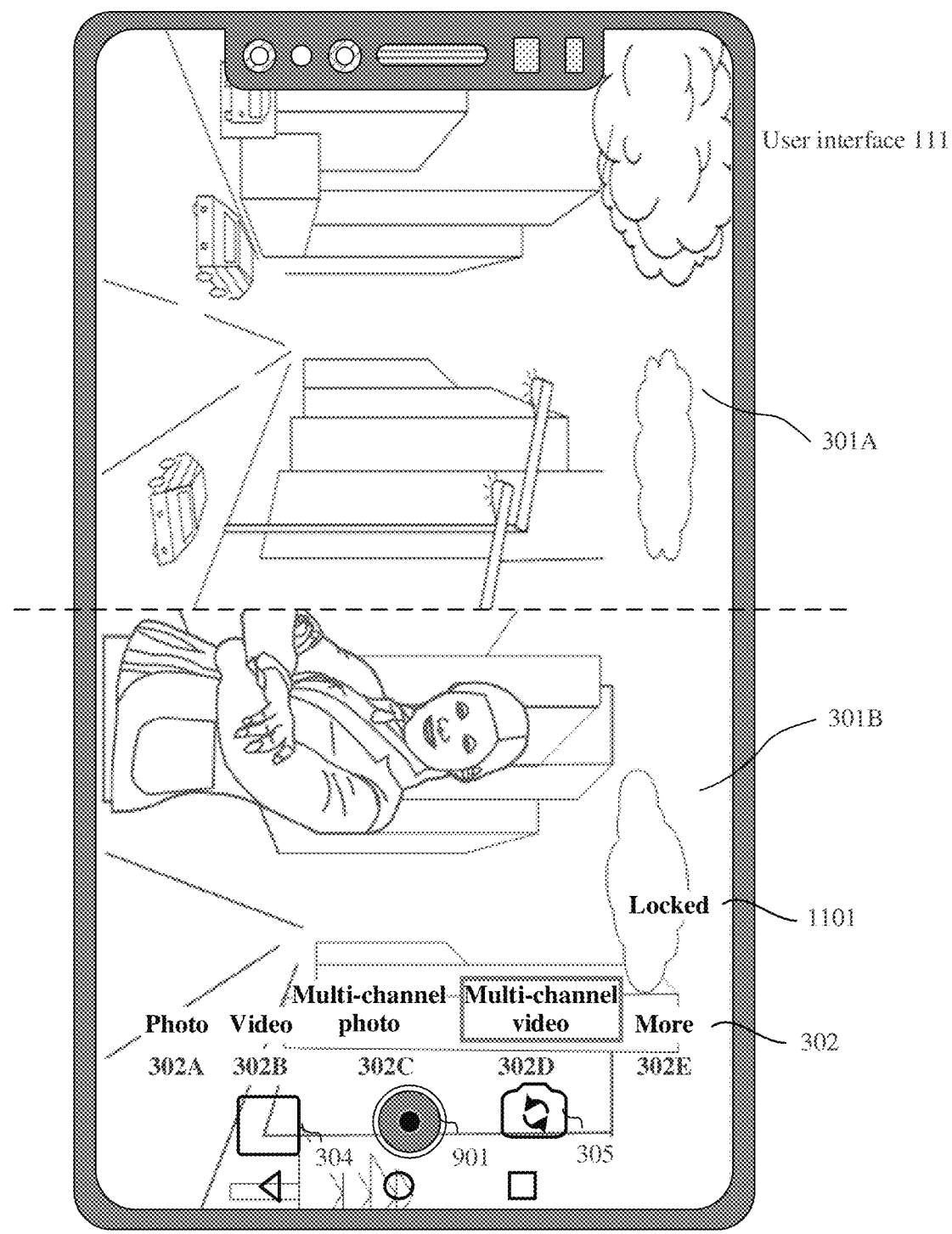
FIG. 12A and FIG. 12B are schematic diagrams of UIs in which a preview image displayed in each area is adjusted by moving an electronic device in a multi-channel video recording preview process according to an embodiment.
Figure 12B:
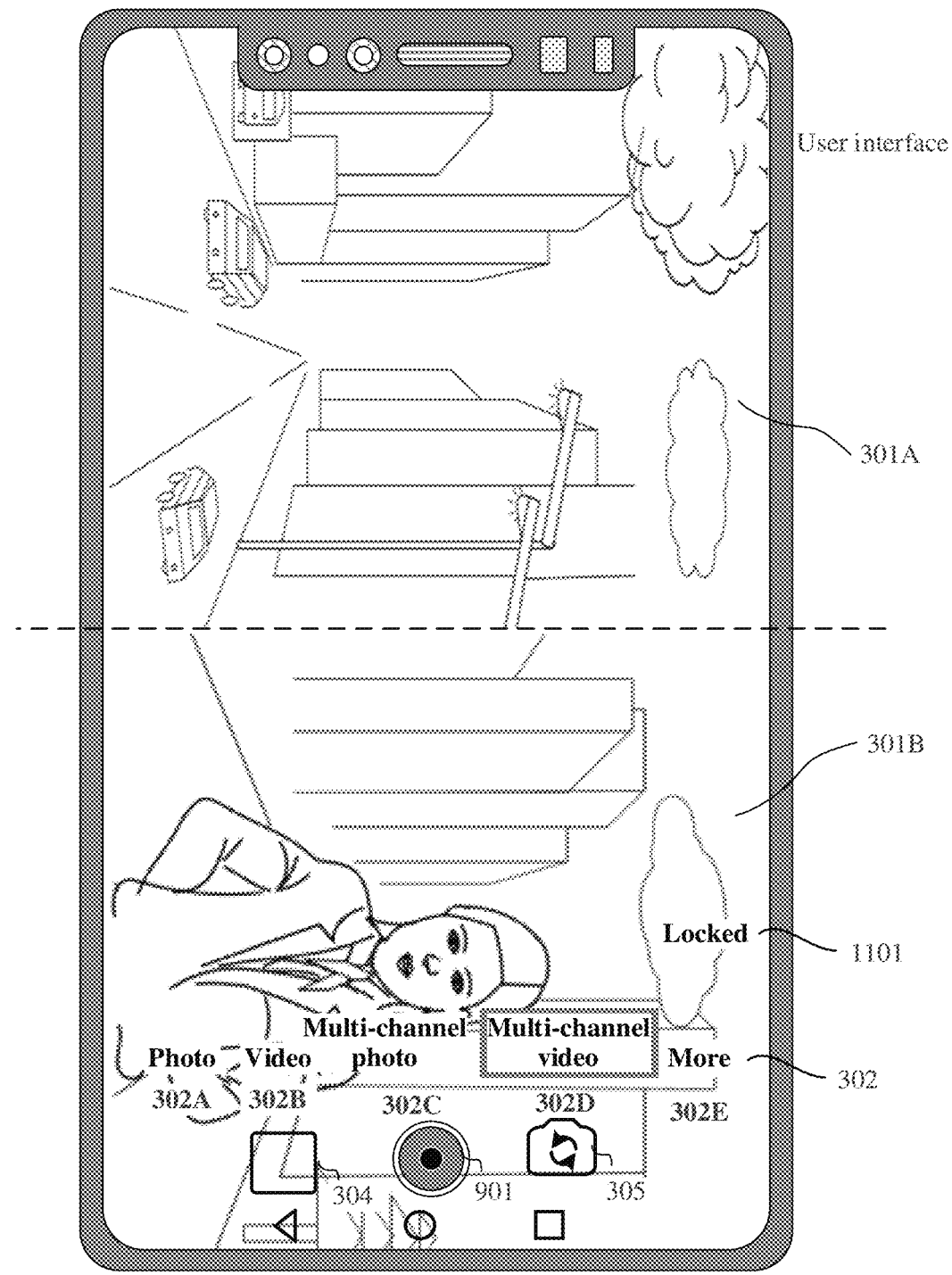

FIG. 12A and FIG. 12B show an example of UI interfaces in which a viewfinder range of a selected preview area is not changed when a posture of the electronic device 100 changes.

FIG. 12A may be a preview interface in displayed in response to an operation used to lock an area 301B after the electronic device 100 enters the "multi-channel video mode".

As shown in FIG. 12A, the preview interface in includes a preview frame 301, an image shooting mode list 302, a control 303, a control 304, a control 305, and a lock indicator 1101. The preview frame 301 includes an area 301A and the area 301B. For a function of each control and a preview image displayed in each area on the user interface 71, refer to related descriptions of the user interface 41 shown in FIG. 6A. Details are not described herein again. The lock indicator 1101 is located in the area 301B and is used to indicate that the area 301B is locked. The lock indicator 1101 may be implemented as a text, an icon, or another form.

An operation used to lock the area 301B may include but is not limited to: a touch-and-hold operation performed on the area 301B, a double-tap operation, a touch operation performed on a specific control (not shown in FIG. 12A), an operation of shaking the electronic device 100, and the like.

Refer to FIG. 12A and FIG. 12B. A user may hold the electronic device 100 to move horizontally to the left. After the electronic device 100 is horizontally moved, images captured by the rear-facing wide-angle camera 193-3 corresponding to the area 301A and the front-facing camera 193-1 corresponding to the area 301B are both refreshed or updated.

In response to the operation of moving horizontally to the left, the electronic device 100 crops, in a cropping manner corresponding to the current area 301A, an entire image captured by the rear-facing wide-angle camera 193-3, and then displays the image in the area 301A. The cropping manner may be center cropping or another cropping manner determined based on a user operation.

In response to the operation of moving horizontally to the left, the electronic device 100 keeps a display manner of displaying, in the locked area 301B, a static object in an image when the area 301B is locked unchanged. A display manner of the static object includes a size of the static object and a relative location of the static object in the area 301B.

In other words, the electronic device 100 ensures that the locked area displays an image at a same physical location in the real world, and the physical location is a physical location corresponding to a preview image displayed in the area when the area is locked. For example, refer to FIG. 12A and FIG. 12B. After the electronic device 100 moves horizontally, the area 301B still displays an image at a same physical location. Display manners of clouds, buildings, and roads in the image remain unchanged, and a person in the image changes a position to stand.

According to an extended embodiment, from the perspective of the user, in a process of moving the electronic device 100, it can be ensured that one or more areas are locked, that is, it can be ensured that preview images displayed in the locked one or more areas always correspond to a same physical location. In this way, the user can consider multi-channel images in a multi-channel image shooting process.

It may be understood that the extended embodiment may be applied to a preview process in the "multi-channel video mode", a preview process in the "multi-channel video mode", and a video recording process in the "multi-channel video mode" mentioned in embodiments of this application. In other words, the electronic device 100 may lock one or more areas in the preview frame in the preview process in the "multi-channel video mode", the preview process in the "multi-channel video mode", and the video recording process in the "multi-channel video mode". Specific implementation may be obtained with reference to the preview process and the video recording process described in the foregoing embodiments. Details are not described herein again.

In this embodiment of this application, the electronic device may further adjust, after entering the "multi-channel photo mode", the preview image displayed in each area on the preview interface. That is, the electronic device may further adjust a manner of framing of a working camera in a preview area in the "multi-channel photo mode".

For a manner in which the electronic device adjusts the framing of the working camera in the preview area in the "multi-channel photo mode", refer to the manner in which the electronic device adjusts the framing of the working camera in the preview area in the "multi-channel video mode". Refer to the foregoing related descriptions. Details are not described.

Figure 13A:
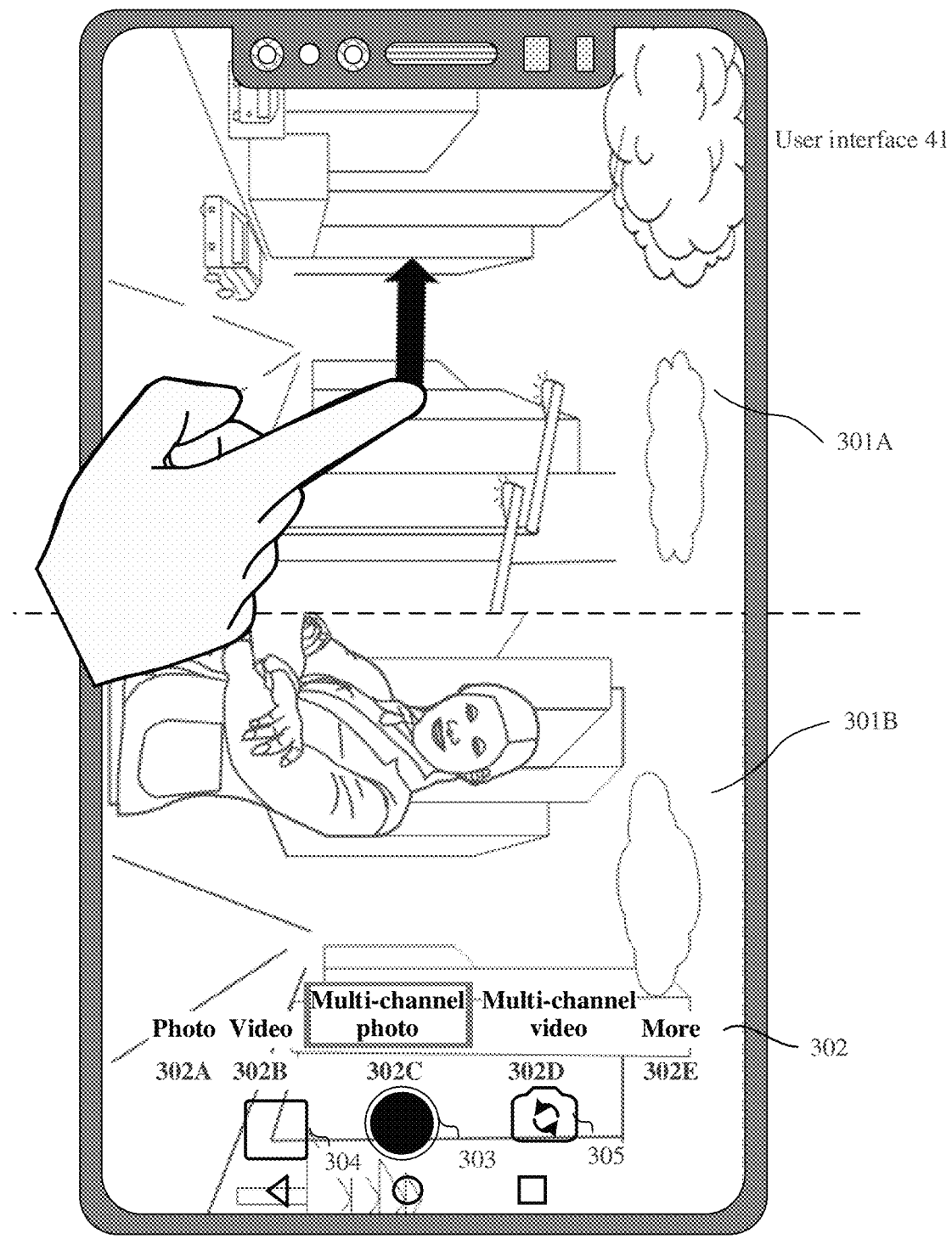
FIG. 13A and FIG. 13B are schematic diagrams of UIs in which a preview image displayed in each area is adjusted in a multi-channel photographing preview process according to an embodiment.
Figure 13B:
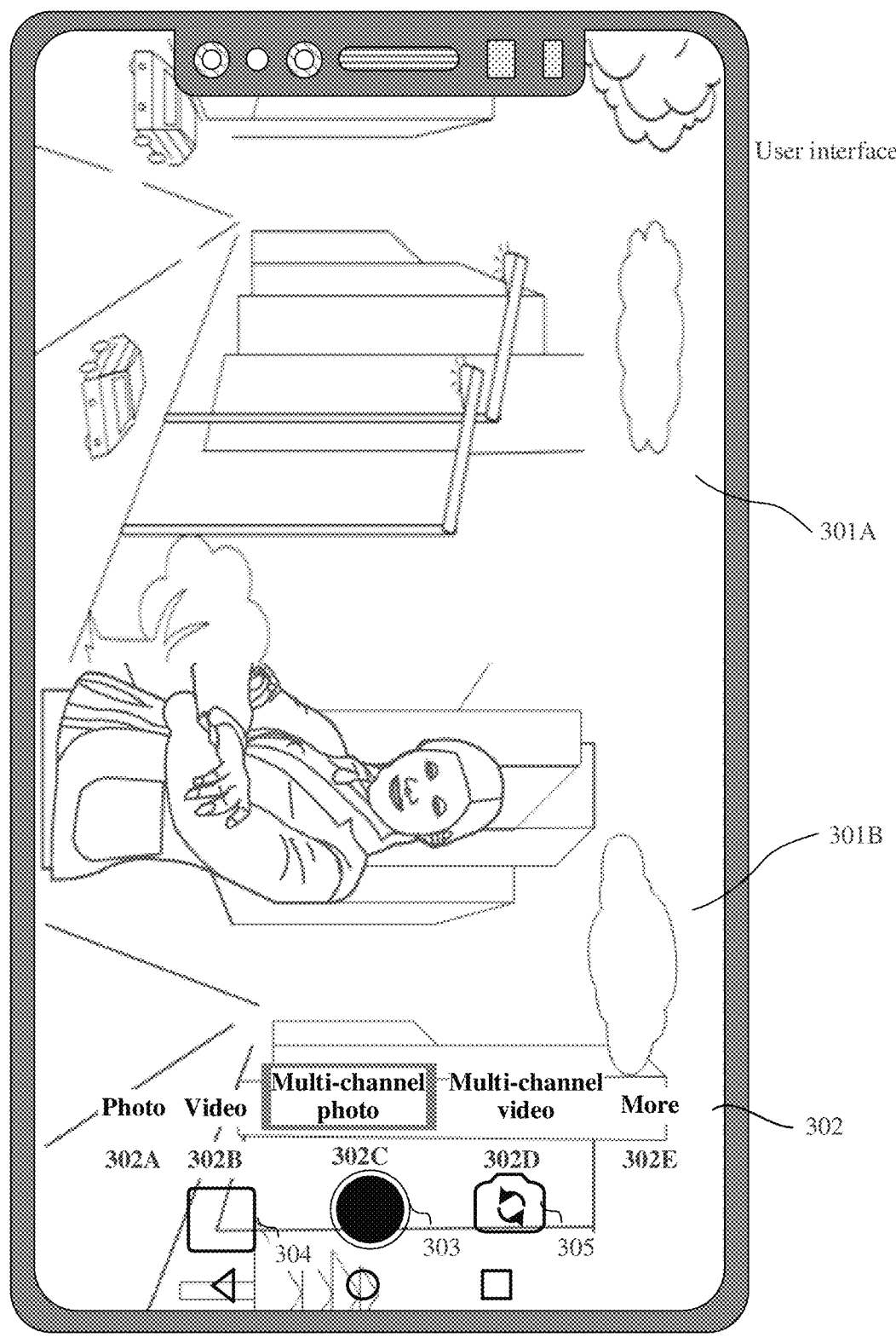

FIG. 13A and FIG. 13B provide an example of a scenario in which after an electronic device enters the "multi-channel photo mode", a preview image displayed in each area on a preview interface is adjusted in response to a sliding operation.

Figure 14:
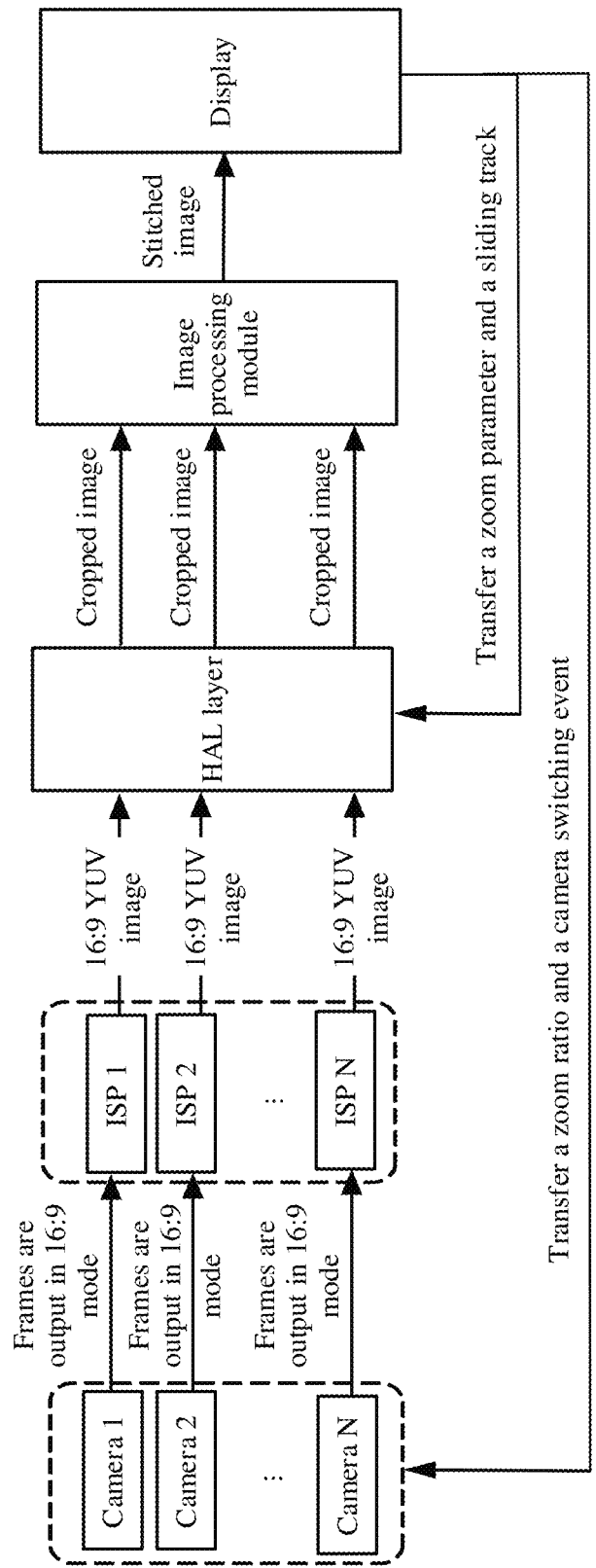
FIG. 14 is a schematic diagram of collaboration between some software and hardware of an electronic device according to an embodiment.

The following describes, with reference to FIG. 14, how software and hardware of the electronic device 100 in embodiments of this application collaborate to perform a framing method for multi-channel photographing and video recording provided in embodiments of this application.

As shown in FIG. 14, after entering the "multi-channel image shooting mode", the electronic device 100 may collect data by using N cameras.

Each of the N cameras outputs a frame according to a default image output ratio, and transfers collected raw data to a corresponding ISP. The default image output ratio of a camera may be, for example, 4:3, 16:9, or 3:2.

The ISP is configured to convert data from a camera into an image in a standard format, for example, YUV.

A display may listen to a user operation used to adjust a preview image in each area on the display, and report the user operation obtained through listening to the camera or a HAL layer. The user operation may include but is not limited to a sliding operation, a two-finger zoom operation and sliding operation, a touch operation acting on a target object, and the like that are detected in each area in a preview frame after the electronic device 100 enters the "multi-channel image shooting mode" mentioned in the foregoing UI embodiments. For example, the display may listen to a zoom event, and transfer a zoom ratio to the HAL layer and a corresponding camera. The display may further listen to a camera switching event, and transfer the event to a corresponding camera. The display may listen to a sliding operation, and transfer a track of the sliding operation to the HAL layer.

The HAL layer is used to crop, based on a user operation, an image output by the ISP.

When the display or another component (for example, a microphone) does not listen to a user operation used to adjust a preview image in each area on the display, the HAL layer crops, in a center cropping manner, the image output by the ISP.

When the display or another component (for example, a microphone) listens to a user operation used to adjust a preview image in each area on the display, the HAL layer crops, according to the user operation, the image output by the ISP. The user operation used to adjust a preview image in each area on the display may include but is not limited to a sliding operation, a two-finger zoom operation and sliding operation, a touch operation acting on a target object, and the like that are detected in each area in a preview frame after the electronic device 100 enters the "multi-channel image shooting mode" mentioned in the foregoing UI embodiments. For a manner in which the HAL layer crops, according to a user operation, an image output by the ISP, refer to related descriptions in the foregoing UI embodiments.

Then, the HAL layer may notify the ISP of the manner in which the HAL layer crops the image output by the ISP. The ISP performs auto exposure, auto white balance, auto focus (auto exposure, auto white balance, auto focus, 3A) processing on the cropped image based on the cropping manner, and may further perform algorithm optimization on noise, brightness, and complexion of the cropped image.

An image obtained after cropping at the HAL layer and 3A and optimization processing of the ISP is transferred to an image processing module, and the image processing module is configured to perform electronic image stabilization (electronic image stabilization) processing on the received image. The HAL layer may further notify the image processing module of the manner in which the HAL layer crops the image output by the ISP, so that the image processing module performs image stabilization processing on the received image based on the cropping manner.

The image processing module may obtain N-channel images after processing each channel of received images. The image processing module may stitch or superimpose the obtained N-channel images into one-channel image according to a current layout style, and output the one-channel image to a preview interface of the display. In other words, the preview interface may display the N-channel images in N areas according to the current layout style.

The image processing module may include the image processor, the video codec, the digital signal processor, and the like in the electronic device 100.

In some embodiments, after the electronic device 100 enters the "multi-channel photo mode", if the display detects a touch operation detected on an image shooting control, the electronic device stores an image that is output by the image processing module to the preview interface of the display when the touch operation is detected.

In some embodiments, after the electronic device 100 enables the "multi-channel video mode", if the display detects two touch operations detected on the image shooting control, the electronic device stores an image that is output by the image processing module to the preview interface of the display in a time period between the two touch operations.

In the foregoing UI embodiments, in a multi-channel video recording scenario, the area 301A or the area 301B in the preview frame 301 may be referred to as a first area, for example, the area 301A or the area 301B in FIG. 6A to FIG. 6F, FIG. 7A to FIG. 7F, FIG. 9A to FIG. 9E, FIG. 10A-1 to FIG. 10B-2, and FIG. 11A to FIG. 11F.

A camera corresponding to the area 301A or the area 301B, for example, a front-facing camera or a rear-facing camera, may be referred to as a first camera.

A sliding operation received in the area 301A or the area 301B on the preview interface may be referred to as a first user operation, for example, sliding operations in FIG. 6A, FIG. 6D, and FIG. 7D.

An operation that is detected by the electronic device on an image shooting interface and that indicates to start recording a video may be referred to as a second user operation. The second user operation may be, for example, an operation performed on the image shooting control 901, for example, an operation performed on the image shooting control 901 in FIG. 11A.

Before the first user operation is detected, a preview image displayed in the area 301A or the area 301B may be referred to as a first preview image, for example, the image displayed in the area 301A or the area 301B in embodiments in FIG. 6A to FIG. 6F, and the image (the image a2) displayed in the area 301A in FIG. 7D.

After the first user operation is detected, a preview image displayed in the area 301A or the area 301B may be referred to as a second preview image, for example, the image (the image a1 or b1) displayed in the area 301A or the area 301B in embodiments in FIG. 6A to FIG. 6F, and the image displayed in the area 301A in FIG. 7E.

A two-finger zoom-in operation received in the area 301 or the area 301B on the preview interface may be referred to as a third user operation, for example, the two-finger zoom-in operation shown in FIG. 7A.

A sliding operation received in the area 301 or the area 301B on the image shooting interface may be referred to as a fourth user operation, for example, the sliding operation in FIG. 11A. After the fourth user operation is detected, a preview image displayed in the area 301A or the area 301B on the image shooting interface may be referred to as a third preview image, for example, the image displayed in the area 301A in FIG. 11A.

When a posture of the electronic device changes, an image displayed by the electronic device in the first area may be referred to as a fourth preview image.

When the electronic device detects a face in an entire image captured by the first camera, the image displayed in the first area may be referred to as a fifth preview image, for example, the image displayed in the area 301B in FIG. 9A. When a location of the face detected by the electronic device changes in the entire image captured by the first camera, the image displayed by the electronic device in the first area may be referred to as a sixth preview image, for example, the image shown in FIG. 9B or FIG. 9C.

When the electronic device tracks the face, if the camera is switched, a switched camera may be referred to as a second camera. In this case, an image that is from the second camera and that is displayed in the first area may be referred to as a seventh preview image. When a location of the face detected by the electronic device changes in an entire image captured by the second camera, the image displayed by the electronic device in the first area may be referred to as an eighth preview image.

An operation that is detected by the electronic device on an image shooting interface and that indicates to stop recording a video may be referred to as a fifth user operation. The fifth user operation may be, for example, an operation performed on the image shooting control 901, for example, an operation performed on the image shooting control 901 in FIG. 11B to FIG. 11F.

An operation for playing a video file that is detected by the electronic device may be referred to as a sixth user operation. An interface that is in the electronic device and that is used to play the video file may be referred to as a playback interface.

In a scenario in which a posture of the electronic device changes and a framing range of a selected preview area is not changed, an operation used to lock the area may be referred to as a seventh user operation. The seventh user operation may be, for example, a touch-and-hold operation or a double-tap operation performed on the area 301B. After the area is locked, an operation that is detected by the electronic device and that indicates to start recording a video may be referred to as an eighth user operation. The eighth user operation may be, for example, a tap operation performed on the image shooting control 901 in FIG. 12B.

After the seventh user operation is detected and before the posture of the electronic device changes, a preview image displayed in the area 301A or the area 301B may be referred to as a ninth preview image, for example, the image displayed in the area 301A in FIG. 12A. After the posture of the electronic device changes, the preview image displayed in the area 301A or the area 301B may be referred to as a tenth preview image, for example, the image displayed in the area 301A in FIG. 12B.

Figure 15:
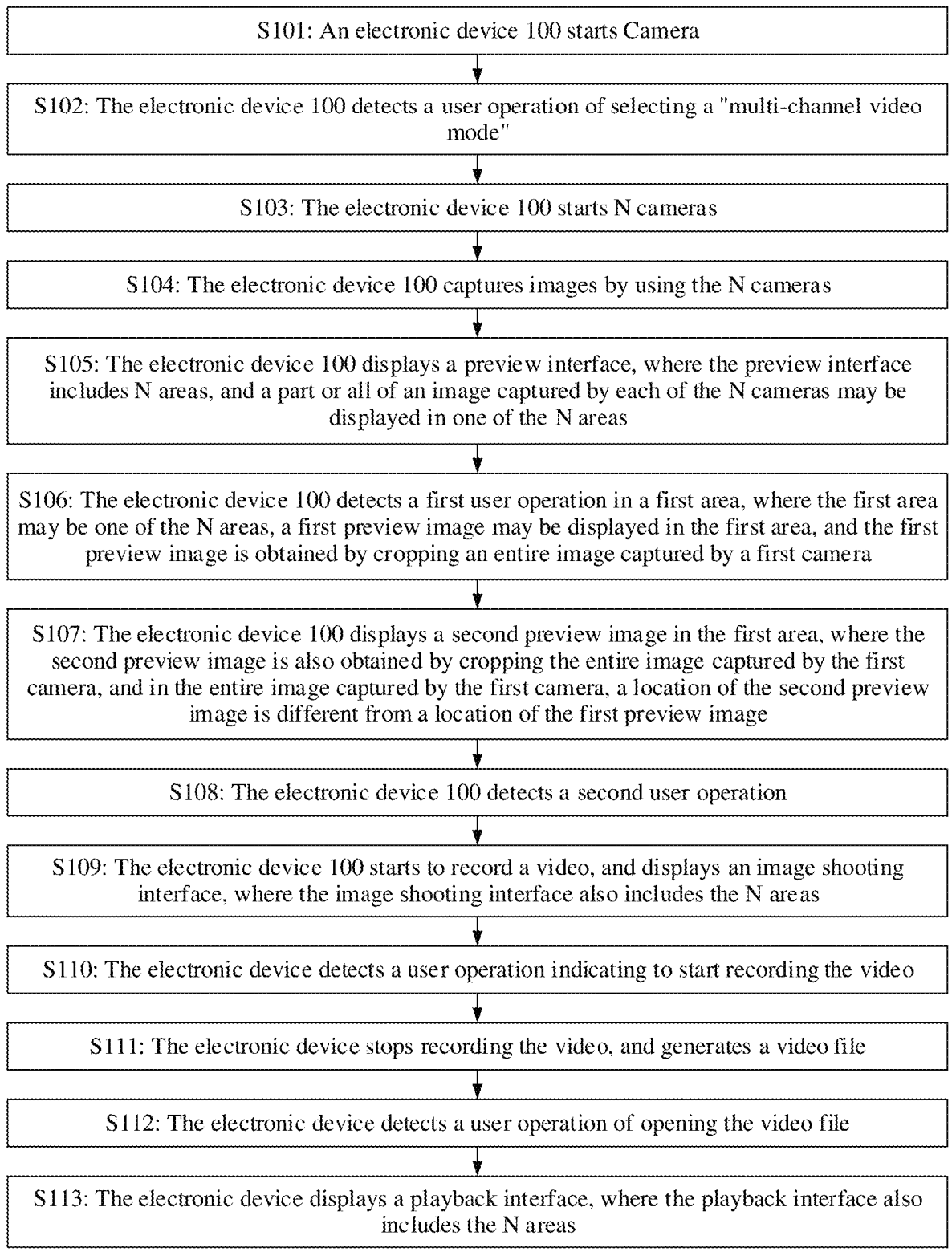
FIG. 15 is a schematic flowchart of a framing method for multi-channel video recording according to an embodiment.

Based on the electronic device 100 and the UI embodiments described in the foregoing content, the following embodiment describes a framing method for multi-channel video recording provided in this application. As shown in FIG. 15, the method may include the following steps.

Phase 1 (S101 to S105): Enable a "multi-channel video mode".

S101: The electronic device 100 starts Camera.

For example, the electronic device 100 may detect a touch operation (for example, a tap operation on the icon 220) performed on the icon 220 of Camera shown in FIG. 3A, and start Camera in response to the operation.

S102: The electronic device 100 detects a user operation of selecting the "multi-channel video mode".

For example, the user operation may be a touch operation (for example, a tap operation) on the multi-channel video mode option 302D shown in FIG. 3B or FIG. 3D. The user operation may also be another type of user operation such as a voice instruction.

This is not limited to a user selection. The electronic device 100 may select the "multi-channel video mode" by default after starting Camera.

S103: The electronic device 100 starts N cameras, where N is a positive integer.

Specifically, the electronic device may have M cameras. M≥2, M≥N, and M is a positive integer. The N cameras may be a combination of a front-facing camera and a rear-facing camera. Alternatively, the N cameras may be any combination of a plurality of cameras of a wide-angle camera, an ultra-wide-angle camera, a long-focus camera, or a front-facing camera. A camera combination manner of the N cameras is not limited in this application.

The N cameras may be selected by the electronic device by default. For example, the electronic device enables the front-facing camera and the rear-facing camera by default. Alternatively, the N cameras may be selected by a user. For example, the user may select, from a "More" mode option, which cameras are to be enabled.

S104: The electronic device 100 captures images by using the N cameras.

S105: The electronic device 100 displays a preview interface, where the preview interface includes N areas, and a part or all of an image captured by each of the N cameras may be displayed in one of the N areas.

As shown in FIG. 6A, the preview interface includes the area 301A and the area 301B. The area 301A displays a partial image captured by the rear-facing camera, and the area 301B displays a partial image captured by the front-facing camera. In this case, N=2, and the N cameras are the rear-facing camera and the front-facing camera.

Images respectively displayed in the N areas may be referred to as preview images. A preview image displayed in an area may be obtained by cropping an entire image captured by a camera corresponding to the area.

The preview interface shown in FIG. 6A is used as an example. The preview image displayed in the area 301A may be obtained by the electronic device by cropping an entire image captured by the rear-facing camera, and the preview image displayed in the area 301B is obtained by the electronic device by cropping an entire image captured by the front-facing camera. Specifically, a central location of the preview image displayed in the area 301A may coincide with a central location of the entire image captured by the rear-facing camera, and a central location of the preview image displayed in the area 301B may coincide with a central location of the entire image captured by the front-facing camera. In this case, the preview images displayed in the area 301A and the area 301B are obtained in a center cropping manner.

At a 1×rate, a size of a cropping area of the preview image that is displayed in the area 301A and that is cropped from the entire image captured by the rear-facing camera may be the same as a size of the area 301A. Similarly, at the 1×rate, a size of a cropping area of the preview image that is displayed in the area 301B and that is cropped from the entire image captured by the front-facing camera may be the same as a size of the area 301B.

Possibly, when a zoom ratio of a camera in the N cameras is reduced, for example, reduced to 0.7×, a preview image displayed by the camera in an area corresponding to the camera may be an entire image captured by the camera. For example, the user may reduce a zoom ratio by performing an operation of pinching two fingers in the area 301A, to view, in the area 301A, the entire image captured by the rear-facing camera. The operation of pinching two fingers may also be referred to as a two-finger zoom-out operation.

This is not limited to a horizontal screen splitting manner shown in FIG. 6A. There may be a plurality of layout manners of the area 301A and the area 301B on the preview interface, for example, a picture-in-picture manner. This is not limited in this application.

Phase 2 (S106 and S107): Adjust a framing range of a camera on the preview interface.

S106: The electronic device 100 detects a first user operation in a first area. The first area may be one of the N areas, a first preview image may be displayed in the first area, and the first preview image is obtained by cropping an entire image captured by a first camera.

The preview interfaces shown in FIG. 6A and FIG. 6B are used as examples. The first area may be the area 301A, the first preview image may be the preview image displayed in the area 301A, and the first camera may be the rear-facing camera. In this case, the first user operation may be a sliding operation in the area 301A, for example, a leftward sliding operation or a rightward sliding operation. The first user operation may also be another type of user operation such as a voice instruction for the area 301A.

S107: The electronic device 100 displays a second preview image in the first area. The second preview image is also obtained by cropping the entire image captured by the first camera. In the entire image captured by the first camera, a location of the second preview image is different from a location of the first preview image.

The preview interfaces shown in FIG. 6A to FIG. 6F are used as examples. When a leftward sliding operation in the area 301A is detected, compared with the first preview image, a central location of the second preview image displayed in the area 301A deviates from a central location of the first preview image, and is no longer a central location of the entire image captured by the rear-facing camera. In this way, the user may change, by using a sliding operation, a framing range presented by the rear-facing camera in the area 301A.

Specifically, if the first user operation is a leftward sliding operation, the second preview image is closer to a right boundary of the entire image captured by the first camera than the first preview image. As shown in FIG. 6A to FIG. 6C, the preview image displayed in the area 301A shown in FIG. 6B is closer to a right boundary of the entire image captured by the rear-facing camera than the preview image displayed in the area 301A shown in FIG. 6A. In this way, the user may view, by performing a leftward sliding operation in the area 301A, an image closer to the right boundary of the entire image captured by the rear-facing camera, for example, enable a right-side object in the entire image captured by the rear-facing camera to appear in the area 301A.

Specifically, if the first user operation is a rightward sliding operation, the second preview image is closer to a left boundary of the entire image captured by the first camera than the first preview image. As shown in FIG. 6D to FIG. 6F, the preview image displayed in the area 301B shown in FIG. 6F is closer to a left boundary of the entire image captured by the front-facing camera than the preview image displayed in the area 301B shown in FIG. 6D. In this way, the user may view, by performing a rightward sliding operation in the area 301B, an image closer to the left boundary of the entire image captured by the front-facing camera, for example, enable a left-side object in the entire image captured by the rear-facing camera to appear in the area 301A.

The second preview image may be the same size as the first preview image. A central location of the first preview image may coincide with a central location of the entire image captured by the first camera.

When the first user operation in the first area occurs, the preview image in the first area changes from the first preview image to the second preview image, but a framing range of a preview image in another area on the preview interface does not change. In other words, when the first user operation is detected, in an entire image captured by another camera (which may be referred to as a second camera) in the N cameras, a location of a preview image B is the same as a location of a preview image A. The preview image A is a preview image displayed in another area (which may be referred to as a second area) before the first user operation occurs, and the preview image B is a preview image displayed in the second area after the first user operation occurs. In this way, the user may separately adjust a framing range presented by a camera on the preview interface, without affecting a framing range presented by another camera on the preview interface.

After the first user operation in the first area occurs, that is, after the user adjusts the framing range of the first camera on the preview interface, the user may further adjust a framing range of another camera on the preview interface. For example, the electronic device may detect a user operation such as leftward sliding or rightward sliding in another area (which may be referred to as the second area), and change the preview image displayed in the second area from a preview image C to a preview image D. In the entire image captured by the second camera, a location of the preview image D is different from a location of the preview image C. In this way, the user may change, by using the user operation such as leftward sliding or rightward sliding in the second area, a framing range presented by the second camera in the second area.

Phase 3 (S108 and S109): Record a video.

S108: The electronic device 100 detects a second user operation. The second user operation is a user operation indicating to start to record a video, for example, a tap operation on the control 303 shown in FIG. 6A.

S109: The electronic device 100 starts to record a video, and displays an image shooting interface, where the image shooting interface also includes the N areas.

In a video recording process, the user may also adjust, by performing a user operation such as leftward sliding or rightward sliding, a framing range presented by a camera on the image shooting interface. A specific process is the same as that in which the user adjusts the framing range of the camera on the preview interface. Similarly, when the electronic device detects a user operation (for example, a leftward sliding operation or a rightward sliding operation) performed in the first area, in the entire image captured by the first camera, a location of a preview image displayed in the first area is different from a location of a preview image previously displayed in the first area. Herein, the previous means that before the electronic device detects the user operation (for example, the leftward sliding operation or the rightward sliding operation) in the first area.

After adjusting framing of a camera on the preview interface, the user may further adjust, by using the leftward sliding operation or the rightward sliding operation, a framing range presented by the camera on the image shooting interface. Specifically, the electronic device may detect the leftward sliding operation or the rightward sliding operation (which may be referred to as a fourth user operation) in the first area on the image shooting interface, and display a third preview image of the first camera in the first area. The third preview image is obtained by cropping the entire image captured by the first camera. In the entire image captured by the first camera, a location of the third preview image is different from a location of the second preview image.

Phase 4 (S110 to S113): Complete video recording and play a video file.

S110: The electronic device detects a user operation indicating to stop recording a video, for example, a tap operation on the control 303 shown in FIG. 6A. The user operation may be referred to as a fifth user operation.

S111: The electronic device stops recording a video, and generates a video file.

Specifically, each frame of image in the video file includes a preview image displayed in each area. Specifically, stitching processing may be first performed on the preview image displayed in each area.

S112: The electronic device detects a user operation (which may be referred to as a sixth user operation) of opening the video file.

S113: The electronic device displays a playback interface, where the playback interface also includes the N areas.

It can be learned that, according to the framing method for multi-channel video recording provided in this embodiment of this application, the user can separately adjust, during multi-channel image shooting, framing presented by each working camera in a preview frame, so that framing of each working camera does not affect each other, to avoid a problem that a change of framing of a working camera causes a change of framing of another working camera.

Further, the framing method for multi-channel video recording provided in this embodiment of this application may further provide a face tracking function. Specifically, when the electronic device detects that the entire image captured by the first camera includes an image of a first face, the electronic device may display a fifth preview image in the first area. The fifth preview image is obtained by cropping the entire image captured by the first camera, and the fifth preview image may include the image of the first face. When the electronic device detects that a location of the image of the first face in the entire image captured by the first camera changes, the electronic device displays a sixth preview image in the first area. The sixth preview image is obtained by cropping the entire image captured by the first camera, and the sixth preview image also includes the image of the first face.

A location of the image of the first face in the sixth preview image may be the same as a location of the image of the first face in the fifth preview image. The image of the first face may be in a central area of the fifth preview image.

To further expand a traceable range of the face, when the electronic device detects that the entire image captured by the first camera includes the image of the first face, the electronic device may start the second camera. The second camera may be a wide-angle camera or an ultra-wide-angle camera, and a framing range of the second camera is greater than a framing range of the first camera. The first face is within the framing range of the second camera. In this case, the electronic device may display a seventh preview image in the first area. When the electronic device detects that a location of the image of the first face in an entire image captured by the second camera changes, the electronic device displays an eighth preview image in the first area. The seventh preview image is obtained by cropping the entire image captured by the second camera, and the seventh preview image includes the image of the first face. The eighth preview image is obtained by cropping the entire image captured by the second camera, and the eighth preview image includes the image of the first face.

A location of the image of the first face in the seventh preview image may be the same as a location of the image of the first face in the eighth preview image. The image of the first face may be in a central area of the seventh preview image.

The face tracking function is applicable to a front-facing image shooting scenario, or is applicable to a rear-facing image shooting scenario. That is, the first camera may be a front-facing camera, or may be a rear-facing camera.

Further, the framing method for multi-channel video recording provided in this embodiment of this application may further provide a function of adjusting framing under zoom. Specifically, the electronic device may further detect a third user operation before detecting the first user operation. The third user operation may be used to magnify a zoom ratio, for example, a user operation in which two fingers change from pinching to stretching. In response to the third user operation, the electronic device may zoom in the first preview image, and displays a zoomed-in first preview image in the first area. It may be understood that, if a size of the first preview image is the same as that of the first area at the 1×rate, the zoomed-in first preview images cannot be fully displayed in the first area. The electronic device may display a partial image of the first preview image in the first area, and the partial image may be in the central area of the first preview image.

In the framing method for multi-channel video recording provided in this embodiment of this application, when the electronic device detects the first user operation, if a posture of the electronic device does not change, the electronic device displays the second preview image of the first camera in the first area. In other words, the electronic device adjusts the framing range of the camera on the preview interface based on the first user operation only when the posture of the electronic device does not change. When detecting the first user operation, if the posture of the electronic device changes, the electronic device may display a fourth preview image of the first camera in the first area. The fourth preview image may be obtained by cropping the entire image captured by the first camera, and a central location of the fourth preview image coincides with a central location of the entire framed image of the first camera. In other words, when the posture of the electronic device changes, the electronic device may not adjust the framing range of the camera on the preview interface based on the first user operation detected at this time, so that the user changes optical framing by adjusting the posture of the electronic device.

For content that is not mentioned in the method embodiment in FIG. 15, refer to the foregoing UI embodiment. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A framing method for multi-channel video recording comprising:
   enabling, by an electronic device, N cameras, wherein the electronic device has M cameras, M≥2, N≤M, and M and N are positive integers;
   capturing, by the electronic device, images with the N cameras;
   displaying, by the electronic device, a preview interface and a part or all of an image captured by each of the N cameras, wherein the preview interface comprises N areas, and the part or all of the image captured by each of the N cameras is displayed in one of the N areas;
   detecting, by the electronic device, a first user operation in a first area, wherein the first area is one of the N areas, a first preview image is displayed in the first area, and the first preview image is obtained by cropping an entire image captured by a first camera;
   displaying, by the electronic device, a second preview image in the first area, wherein the second preview image is also obtained by cropping the entire image captured by the first camera, wherein, in the entire image captured by the first camera, a location of the second preview image is different from a location of the first preview image;
   detecting, by the electronic device, a second user operation;
   starting, by the electronic device, to record a video;
   displaying an image shooting interface, wherein the image shooting interface comprises the N areas; and
   displaying, by the electronic device, based on detecting the first user operation, and based on a posture of the electronic device changing, a fourth preview image of the first camera in the first area, wherein the fourth preview image is obtained by cropping the entire image captured by the first camera, and a central location of the fourth preview image coincides with a central location of an entire framed image of the first camera;
   wherein the displaying, by the electronic device, a second preview image of the first camera in the first area comprises displaying, by the electronic device, based on detecting the first user operation, and based on the posture of the electronic device not changing, the second preview image of the first camera in the first area.

2. The method according to claim 1, wherein the first user operation comprises a sliding operation, and wherein, in the entire image captured by the first camera, a direction in which a central location of the first preview image points to a central location of the second preview image is opposite to a sliding direction of the sliding operation.

3. The method according to claim 2, wherein the second preview image is closer to a right boundary of the entire image captured by the first camera than the first preview image based on the first user operation being a leftward sliding operation.

4. The method according to claim 2, wherein the second preview image is closer to a left boundary of the entire image captured by the first camera than the first preview image based on the first user operation being a rightward sliding operation.

5. The method according to claim 1, wherein a central location of the first preview image coincides with a central location of the entire image captured by the first camera.

6. The method according to claim 1, wherein the first preview image has a same size as the second preview image.

7. The method according to claim 1, further comprising:
   detecting, by the electronic device, a third user operation before detecting the first user operation;
   zooming in, by the electronic device, the first preview image; and
   displaying a zoomed-in first preview image in the first area.

8. The method according to claim 1, further comprising:
   detecting, by the electronic device, a fourth user operation in the first area on the image shooting interface; and
   displaying, by the electronic device, a third preview image of the first camera in the first area on the image shooting interface, wherein the third preview image is obtained by cropping the entire image captured by the first camera, and wherein, in the entire image captured by the first camera, a location of the third preview image is different from the location of the second preview image.

9. The method according to claim 1, further comprising:
detecting, by the electronic device, that the entire image captured by the first camera comprises an image of a first face;
displaying, by the electronic device, a fifth preview image in the first area, wherein the fifth preview image is obtained by cropping the entire image captured by the first camera, and the fifth preview image comprises the image of the first face;
detecting, by the electronic device, that a location of the image of the first face in the entire image captured by the first camera changes; and
displaying, by the electronic device, a sixth preview image in the first area, wherein the sixth preview image is obtained by cropping the entire image captured by the first camera, and the sixth preview image comprises the image of the first face.

10. The method according to claim 9, wherein a location of the image of the first face in the sixth preview image is the same as a location of the image of the first face in the fifth preview image.

11. The method according to claim 9, wherein the image of the first face is in a central area of the fifth preview image.

12. The method according to claim 1, further comprising:
detecting, by the electronic device, that the entire image captured by the first camera comprises an image of a first face;
enabling, by the electronic device, a second camera, wherein a framing range of the second camera is greater than a framing range of the first camera, and the first face is within the framing range of the second camera;
displaying, by the electronic device, a seventh preview image in the first area, wherein the seventh preview image is obtained by cropping an entire image captured by the second camera, and the seventh preview image comprises the image of the first face;
detecting, by the electronic device, that a location of the image of the first face in the entire image captured by the second camera changes; and
displaying, by the electronic device, an eighth preview image in the first area, wherein the eighth preview image is obtained by cropping the entire image captured by the second camera, and the eighth preview image comprises the image of the first face.

13. The method according to claim 12, wherein a location of the image of the first face in the seventh preview image is the same as a location of the image of the first face in the eighth preview image.

14. The method according to claim 12, wherein the image of the first face is in a central area of the seventh preview image.

15. The method according to claim 9, wherein the first camera is a front-facing camera or a rear-facing camera.

16. The method according to claim 1, wherein the method further comprises:
detecting, by the electronic device, a fifth user operation;
stopping, by the electronic device, recording a video;
generating a video file;
detecting, by the electronic device, a sixth user operation for the video file; and
displaying, by the electronic device, a playback interface, wherein the playback interface comprises the N areas.

17. A framing method for multi-channel video recording, applied to an electronic device having a display and M cameras, wherein M≥2, and M is a positive integer, wherein the method comprises:
enabling, by an electronic device, N cameras, wherein the electronic device has M cameras, M≥2, N≤M, and M and N are positive integers;
capturing, by the electronic device, images with the N cameras;
displaying, by the electronic device, a preview interface and a part or all of an image captured by each of the N cameras, wherein the preview interface comprises N areas, and the part or all of the image captured by each of the N cameras is displayed in one of the N areas;
detecting, by the electronic device, a seventh user operation in a first area;
detecting, by the electronic device, that a posture of the electronic device changes;
displaying, by the electronic device, a ninth preview image in the first area, wherein a framing range of the ninth preview image is the same as a framing range of a tenth preview image, the tenth preview image is an image displayed in the first area before the posture of the electronic device changes, the ninth preview image is obtained by cropping an entire image captured by a first camera after the posture of the electronic device changes, and the tenth preview image is obtained by cropping the entire image captured by the first camera before the posture of the electronic device changes;
detecting, by the electronic device, an eighth user operation;
starting, by the electronic device, to record a video based on detecting the eighth user operation; and
displaying an image shooting interface, wherein the image shooting interface comprises the N areas.

18. An electronic device comprising:
a display;
M cameras, wherein M≥2, M is a positive integer;
a touch sensor;
one or more processors; and
a non-transitory computer-readable storage medium storing a program to be executed by the one or more processors, the program including instructions to:
enable, by the electronic device, N cameras, wherein N≤M, and N is a positive integer;
capture, by the electronic device, images with the N cameras;
display, by the electronic device, a preview interface and a part or all of an image captured by each of the N cameras, wherein the preview interface comprises N areas, and the part or all of the image captured by each of the N cameras is displayed in one of the N areas;
detect, by the electronic device, a first user operation in a first area, wherein the first area is one of the N areas, a first preview image is displayed in the first area, and the first preview image is obtained by cropping an entire image captured by a first camera;
display, by the electronic device, a second preview image in the first area, wherein the second preview image is also obtained by cropping the entire image captured by the first camera, and wherein, in the entire image captured by the first camera, a location of the second preview image is different from a location of the first preview image;
detect, by the electronic device, a second user operation;
start, by the electronic device, to record a video; display an image shooting interface, wherein the image shooting interface comprises the N areas; and displaying, by the electronic device, based on detecting the first user operation, and based on a posture of the electronic device changing, a fourth preview image of the first camera in the first area, wherein the fourth preview image is obtained by cropping the entire image captured by the first camera, and a central location of the fourth preview image coincides with a central location of an entire framed image of the first camera;

wherein the displaying, by the electronic device, a second preview image of the first camera in the first area comprises displaying, by the electronic device, based on detecting the first user operation, and based on the posture of the electronic device not changing, the second preview image of the first camera in the first area.

19. The electronic device according to claim 18, wherein the first user operation comprises a sliding operation, and wherein, in the entire image captured by the first camera, a direction in which a central location of the first preview image points to a central location of the second preview image is opposite to a sliding direction of the sliding operation.

20. The electronic device according to claim 18, wherein the first preview image has a same size as the second preview image.

* * * * *